(12) United States Patent
Rauschenbach et al.

(10) Patent No.: US 10,579,238 B2
(45) Date of Patent: Mar. 3, 2020

(54) FLEXIBLE SCREEN LAYOUT ACROSS MULTIPLE PLATFORMS

(71) Applicant: SAP SE, Walldorf (DE)

(72) Inventors: Tina Rauschenbach, Mannheim (DE); Annette Jann, Heidelberg (DE); Kai Richter, Muehltal (DE); Jan-Michel Blinn, Osthofen (DE); Denis Timur, Mannheim (DE); Roman Rommel, Neustadt an der Weinstrasse (DE); Carlos Martinez Gomez, Heidelberg (DE); Janos Varadi, Ludwigshafen (DE)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 15/461,319

(22) Filed: Mar. 16, 2017

(65) Prior Publication Data
US 2017/0329499 A1 Nov. 16, 2017

Related U.S. Application Data

(60) Provisional application No. 62/335,760, filed on May 13, 2016, provisional application No. 62/335,762, (Continued)

(51) Int. Cl.
*G06F 3/14* (2006.01)
*G06F 3/0484* (2013.01)
*G06F 9/451* (2018.01)

(52) U.S. Cl.
CPC .......... *G06F 3/04845* (2013.01); *G06F 9/451* (2018.02); *G06F 2203/04803* (2013.01)

(58) Field of Classification Search
CPC ....................................................... G06F 3/14
(Continued)

(56) References Cited

U.S. PATENT DOCUMENTS 5,097,533 A 3/1992 Burger et al.
5,517,663 A 5/1996 Kahn
(Continued)

OTHER PUBLICATIONS

Final Office Action issued in U.S. Appl. No. 15/461,296 dated Apr. 2, 2019, 34 pages.
(Continued)

*Primary Examiner* — Ruay Ho
(74) *Attorney, Agent, or Firm* — Fish & Richardson P.C.

(57) ABSTRACT

In one general aspect, a method can include generating a user interface for an enterprise application executing on a computing device using a flexible screen layout. The generating can include displaying, on a display device included in the computing device, a first user interface for the enterprise application including a first column that occupies an available screen area of the display device and that presents first content, receiving, in the first user interface, a selection for forward navigation, and displaying, on the display device, a second user interface for the enterprise application. The second user interface can include a second column presenting the first content and a third column presenting the second content that can occupy the available screen area of the display device. The flexible screen layout can adjust a size of the second column and the third column based on the available screen area of the display device.

17 Claims, 32 Drawing Sheets

Related U.S. Application Data filed on May 13, 2016, provisional application No. 62/335,765, filed on May 13, 2016, provisional application No. 62/335,767, filed on May 13, 2016, provisional application No. 62/335,888, filed on May 13, 2016, provisional application No. 62/335,892, filed on May 13, 2016, provisional application No. 62/335,895, filed on May 13, 2016, provisional application No. 62/335,897, filed on May 13, 2016, provisional application No. 62/335,899, filed on May 13, 2016, provisional application No. 62/335,873, filed on May 13, 2016, provisional application No. 62/335,875, filed on May 13, 2016.

(58) Field of Classification Search
USPC ........ 715/744, 716, 719, 762, 781; 762/781; 386/224
See application file for complete search history.

(56) References Cited

U.S. PATENT DOCUMENTS

| | | |
|---|---|---|
| 5,657,462 A | 8/1997 | Brouwer |
| 5,682,469 A | 10/1997 | Linnett |
| 5,727,950 A | 3/1998 | Cook |
| 5,754,174 A | 5/1998 | Carpenter |
| 5,877,759 A | 3/1999 | Bauer |
| 6,025,841 A | 2/2000 | Finkelstein |
| 6,085,184 A | 7/2000 | Bertrand |
| 6,262,730 B1 | 7/2001 | Horvitz |
| 6,393,495 B1 | 5/2002 | Flory et al. |
| 6,735,632 B1 | 5/2004 | Kiraly |
| 6,750,885 B1 | 6/2004 | Finch et al. |
| 6,751,606 B1 | 6/2004 | Fries |
| 6,788,313 B1 | 9/2004 | Heil |
| 6,845,486 B2 | 1/2005 | Yamada |
| 6,892,349 B2 | 5/2005 | Shizuka |
| 7,024,417 B1 | 4/2006 | Russakovsky et al. |
| 7,127,723 B2 | 10/2006 | Endo et al. |
| 7,275,246 B1 | 9/2007 | Yates et al. |
| 7,441,190 B2 | 10/2008 | Asami |
| 7,603,375 B2 | 10/2009 | Ng |
| 7,636,045 B2 | 12/2009 | Sugiyama |
| 7,739,310 B1 | 6/2010 | Shmulevich et al. |
| 7,739,695 B2 | 6/2010 | Wood et al. |
| 7,797,146 B2 | 9/2010 | Harless |
| 7,797,338 B2 | 9/2010 | Feng |
| 7,849,175 B2 | 12/2010 | Beringer et al. |
| 7,913,183 B2 | 3/2011 | Czerwinski et al. |
| 7,930,681 B2 | 4/2011 | Kloeffer et al. |
| 7,933,399 B2 | 4/2011 | Knott |
| 7,966,269 B2 | 6/2011 | Bauer |
| 8,225,231 B2 | 7/2012 | Zielinski |
| 8,978,010 B1 | 3/2015 | Thumfart et al. |
| 9,032,045 B1 | 5/2015 | Leblang |
| 9,088,634 B1 | 7/2015 | Corley et al. |
| 9,164,776 B2 | 10/2015 | Rauh et al. |
| 9,176,801 B2 | 11/2015 | Baeuerle et al. |
| 9,202,171 B2 | 12/2015 | Kuhn |
| 9,223,549 B1 | 12/2015 | Hermanns et al. |
| 9,225,515 B2 | 12/2015 | Volchok et al. |
| 9,552,123 B1 | 1/2017 | Johnston |
| 9,632,985 B1 | 4/2017 | MacInnis et al. |
| 9,703,458 B2 | 7/2017 | Sasaki |
| 9,720,889 B1 | 8/2017 | Kobyakov |
| 9,740,462 B2 | 8/2017 | Rao et al. |
| 9,807,145 B2 | 10/2017 | Koon |
| 10,007,936 B1 | 6/2018 | Ghoshal et al. |
| 10,230,812 B1 | 3/2019 | Ram |
| 2001/0054066 A1 | 12/2001 | Spitzer |
| 2002/0005865 A1 | 1/2002 | Hayes-Roth |
| 2002/0038335 A1 | 3/2002 | Dong et al. |
| 2002/0046294 A1 | 4/2002 | Brodsky et al. |
| 2002/0149611 A1 | 10/2002 | May |
| 2003/0020671 A1 | 1/2003 | Santoro |
| 2003/0023752 A1 | 1/2003 | Williamson et al. |
| 2003/0028498 A1 | 2/2003 | Hayes-Roth |
| 2003/0093508 A1 | 5/2003 | Li et al. |
| 2003/0154232 A1 | 8/2003 | Beringer et al. |
| 2003/0163585 A1 | 8/2003 | Elderon et al. |
| 2004/0056878 A1 | 3/2004 | Lau |
| 2004/0075677 A1 | 4/2004 | Loyall |
| 2004/0111701 A1 | 6/2004 | Beust |
| 2004/0131050 A1 | 7/2004 | Beringer et al. |
| 2004/0133606 A1 | 7/2004 | Miloushev et al. |
| 2004/0179659 A1 | 9/2004 | Byrne |
| 2005/0039127 A1 | 2/2005 | Davis |
| 2005/0065883 A1 | 3/2005 | Dent et al. |
| 2005/0065913 A1 | 3/2005 | Lillie et al. |
| 2006/0010196 A1 | 1/2006 | Laird et al. |
| 2006/0041848 A1 | 2/2006 | Lira |
| 2006/0053088 A1 | 3/2006 | Ali et al. |
| 2006/0053121 A1 | 3/2006 | Zizys et al. |
| 2006/0074850 A1 | 4/2006 | Bouchet |
| 2006/0136223 A1 | 6/2006 | Brun |
| 2006/0235942 A1 | 10/2006 | Gale et al. |
| 2006/0253791 A1 | 11/2006 | Kuiken |
| 2006/0271398 A1 | 11/2006 | Belcastro |
| 2006/0271862 A1* | 11/2006 | Carey ............... G06F 9/451 715/762 |
| 2007/0067373 A1 | 3/2007 | Higgins et al. |
| 2007/0083821 A1 | 4/2007 | Garbow |
| 2007/0168874 A1 | 7/2007 | Kloeffer et al. |
| 2007/0226241 A1 | 9/2007 | Ng |
| 2008/0034314 A1 | 2/2008 | Louch et al. |
| 2008/0096533 A1 | 4/2008 | Manfredi |
| 2008/0127220 A1 | 5/2008 | Morris |
| 2008/0155409 A1 | 6/2008 | Santana |
| 2008/0163099 A1 | 7/2008 | Gu et al. |
| 2008/0229239 A1 | 9/2008 | Elumalai et al. |
| 2009/0044116 A1* | 2/2009 | Kitabayashi ........... G06F 3/048 715/716 |
| 2009/0153335 A1 | 6/2009 | Birtcher |
| 2009/0171679 A1 | 7/2009 | Salgado et al. |
| 2009/0248695 A1 | 10/2009 | Ozzie |
| 2009/0327911 A1 | 12/2009 | Ningune et al. |
| 2010/0199195 A1 | 8/2010 | Carounanidy |
| 2011/0072349 A1* | 3/2011 | Catanese ............... H04N 5/445 715/719 |
| 2011/0161843 A1 | 6/2011 | Bennett et al. |
| 2011/0283215 A1 | 11/2011 | Dunn |
| 2012/0066699 A1 | 3/2012 | Kinkade et al. |
| 2012/0117507 A1 | 5/2012 | Tseng et al. |
| 2012/0144210 A1 | 6/2012 | Yacobi |
| 2012/0158521 A1 | 6/2012 | McCullen |
| 2012/0167016 A1 | 6/2012 | Rauh et al. |
| 2012/0216125 A1 | 8/2012 | Pierce |
| 2012/0253788 A1 | 10/2012 | Heck |
| 2012/0254227 A1 | 10/2012 | Heck |
| 2012/0260318 A1 | 10/2012 | Fromentoux et al. |
| 2012/0265528 A1 | 10/2012 | Gruber |
| 2013/0024760 A1 | 1/2013 | Vogel et al. |
| 2013/0067365 A1 | 3/2013 | Shrufi et al. |
| 2013/0086473 A1 | 4/2013 | Faust et al. |
| 2013/0152017 A1 | 6/2013 | Song |
| 2013/0152072 A1 | 6/2013 | Fernandez-Ruiz et al. |
| 2013/0174034 A1 | 7/2013 | Brown |
| 2013/0204813 A1 | 8/2013 | Master |
| 2013/0219333 A1 | 8/2013 | Palwe et al. |
| 2014/0040748 A1 | 2/2014 | Lemay |
| 2014/0050455 A1* | 2/2014 | Ni ............... H04N 9/8227 386/224 |
| 2014/0068459 A1 | 3/2014 | Graham |
| 2014/0068549 A1 | 3/2014 | Friedman et al. |
| 2014/0068593 A1 | 3/2014 | McErlane et al. |
| 2014/0074483 A1 | 3/2014 | Van Os |
| 2014/0123072 A1 | 5/2014 | Bhowmick et al. |
| 2014/0215381 A1* | 7/2014 | Huang ............... G06F 3/0481 715/781 |
| 2014/0244488 A1 | 8/2014 | Kim et al. |
| 2014/0337770 A1 | 11/2014 | Sasaki |
| 2014/0344024 A1 | 11/2014 | Kempf |
| 2014/0351744 A1 | 11/2014 | Jeon et al. |

(56) References Cited

U.S. PATENT DOCUMENTS

| | | |
|---|---|---|
| 2014/0379664 A1 | 12/2014 | Wiegenstein et al. |
| 2015/0006135 A1 | 1/2015 | Deb et al. |
| 2015/0026477 A1 | 1/2015 | Malatack et al. |
| 2015/0040104 A1 | 2/2015 | Mall |
| 2015/0074069 A1 | 3/2015 | Baeuerle et al. |
| 2015/0089373 A1 | 3/2015 | Dwivedi et al. |
| 2015/0089403 A1 | 3/2015 | Zhu et al. |
| 2015/0123993 A1 | 5/2015 | Ohba |
| 2015/0161180 A1 | 6/2015 | Hermanns et al. |
| 2015/0178769 A1 | 6/2015 | Mirisola et al. |
| 2015/0186156 A1 | 7/2015 | Brown |
| 2015/0195406 A1 | 7/2015 | Dwyer |
| 2015/0206169 A1 | 7/2015 | Ye et al. |
| 2015/0278868 A1 | 10/2015 | O'Connor et al. |
| 2015/0278876 A1 | 10/2015 | Xiong et al. |
| 2015/0319143 A1 | 11/2015 | Kim et al. |
| 2015/0339036 A1 | 11/2015 | Hwang |
| 2015/0382047 A1 | 12/2015 | Van Os |
| 2016/0062745 A1 | 3/2016 | Rao |
| 2016/0070580 A1 | 3/2016 | Johnson |
| 2016/0092883 A1 | 3/2016 | Weber et al. |
| 2016/0094497 A1 | 3/2016 | Javed |
| 2016/0337426 A1 | 11/2016 | Shribman et al. |
| 2016/0378326 A1 | 12/2016 | Svinth |
| 2017/0123397 A1 | 5/2017 | Billi et al. |
| 2017/0177650 A1 | 6/2017 | Devine |
| 2017/0302686 A1 | 10/2017 | Medvedovsky |
| 2017/0329466 A1 | 11/2017 | Krenkler et al. |
| 2017/0329468 A1 | 11/2017 | Schon et al. |
| 2017/0329479 A1 | 11/2017 | Rauschenbach et al. |
| 2017/0329483 A1 | 11/2017 | Jann et al. |
| 2017/0329500 A1 | 11/2017 | Grammaikakis et al. |
| 2017/0329505 A1 | 11/2017 | Richter et al. |
| 2017/0329580 A1 | 11/2017 | Jann et al. |
| 2017/0329581 A1 | 11/2017 | Jann et al. |
| 2017/0329614 A1 | 11/2017 | Schon et al. |
| 2017/0331915 A1 | 11/2017 | Jann et al. |
| 2017/0344218 A1 | 11/2017 | Jann et al. |
| 2017/0346949 A1 | 11/2017 | Sanghavi |
| 2019/0004774 A1 | 1/2019 | Mount |
| 2019/0057161 A1 | 2/2019 | Ackerman et al. |

OTHER PUBLICATIONS

Final Office Action issued in U.S. Appl. No. 15/462,072 dated May 8, 2019, 29 pages.
Final Office Action issued in U.S. Appl. No. 15/462,084 dated Apr. 5, 2019, 21 pages.
Non-Final Office Action issued in U.S. Appl. No. 15/461,236 dated Apr. 1, 2019, 28 pages.
Non-Final Office Action issued in U.S. Appl. No. 15/591,995 dated May 3, 2019, 42 pages.
"SAP Blog Part 3", Ferriero, S. (May 9, 2016), How to create smart Templates annotations within CDS views—Part 3. [Retrieved Mar. 27, 2018] https://blogs.sap.com/2016/05/09/how-to-create-smart-templates-annotations-within-cds-views-part-3 (22 pages).
EP Extended European Search Report for European Appln. No. 17000813.0, dated Aug. 23, 2017, 7 pages.
U.S. Non-Final Office Action in U.S. Appl. No. 15/390,262, dated Nov. 30, 2018, 18 pages.
U.S. Non-Final Office Action in U.S. Appl. No. 15/461,290, dated Jun. 22, 2018, 18 pages.
U.S. Non-Final Office Action in U.S. Appl. No. 15/461,296, dated Dec. 11, 2018, 26 pages.
U.S. Non-Final Office Action in U.S. Appl. No. 15/461,313, dated Apr. 5, 2018, 10 pages.
U.S. Non-Final Office Action in U.S. Appl. No. 15/461,330, dated Aug. 10, 2018, 14 pages.
U.S. Non-Final Office Action in U.S. Appl. No. 15/462,084, dated Nov. 21, 2018, 15 pages.
U.S. Non-Final Office Action in U.S. Appl. No. 15/591,989, dated Nov. 14, 2018, 15 pages.
U.S. Non-Final Office Action in U.S. Appl. No. 15/462,072, dated Jan. 9, 2019, 15 pages.
"SAP Blog Part 1", Ferriero, S. (May 9, 2016), How to create smart Templates annotations within CDS views—Part 1. [Retrieved Oct. 8, 2018] https://blogs.sap.com/2016/05/09/how-to-create-smart-templates-annotations-within-cds-views-part-1 (17 pages).
"SAP Blog Part 2", Ferriero, S. (May 9, 2016), How to create smart Templates annotations within CDS views—Part 2. [Retrieved Oct. 8, 2018] https://blogs.sap.com/2016/05/09/how-to-create-smart-templates-annotations-within-cds-views-part-2 (15 pages).
Office Action issued in U.S. Appl. No. 15/462,072, dated Aug. 6, 2019, 27 pages.
Final office action issued in U.S. Appl. No. 15/461,236, dated Sep. 24, 2019, 41 pages.
Final office action issued in U.S. Appl. No. 15/591,999, dated Sep. 30, 2019, 37 pages.

* cited by examiner

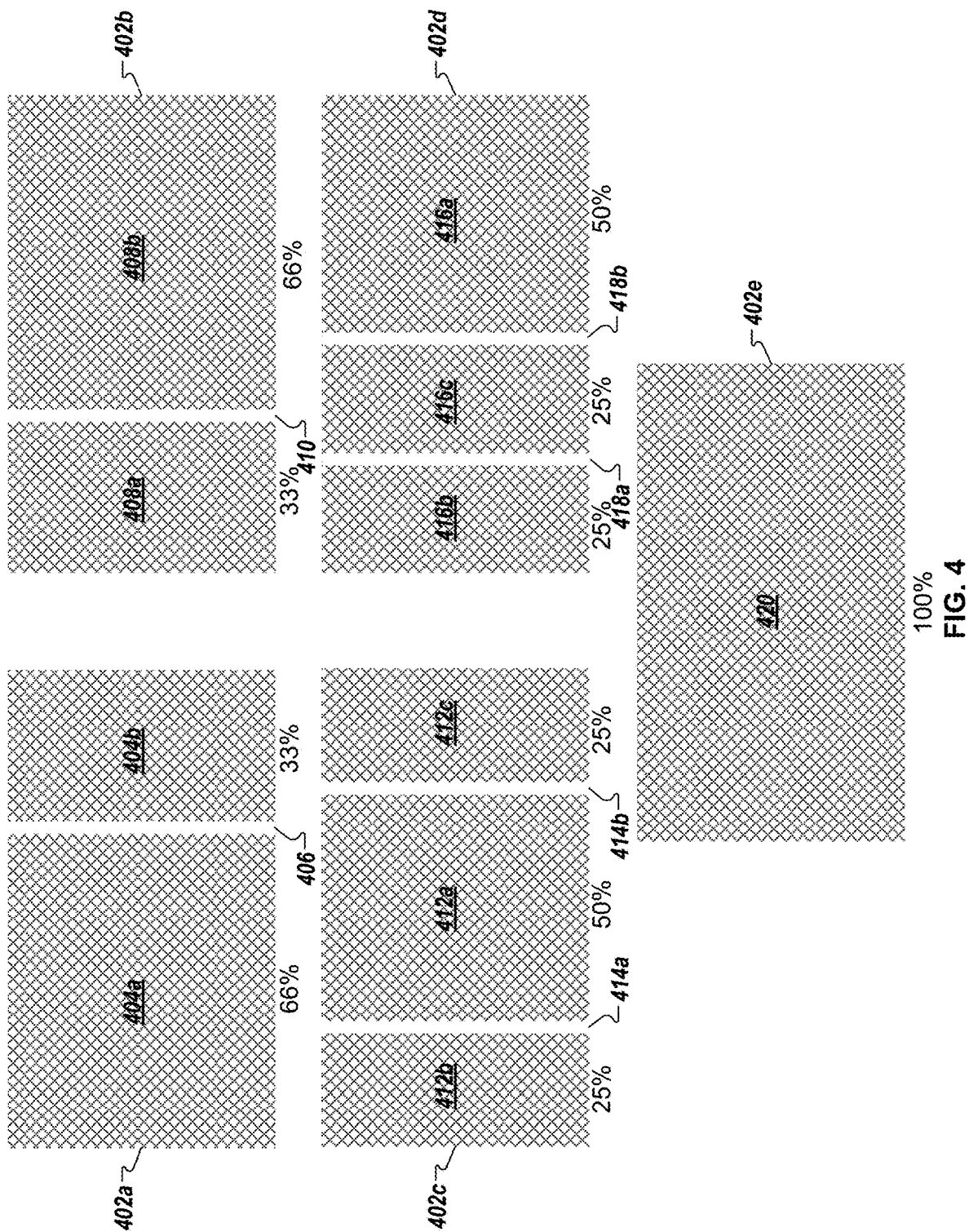

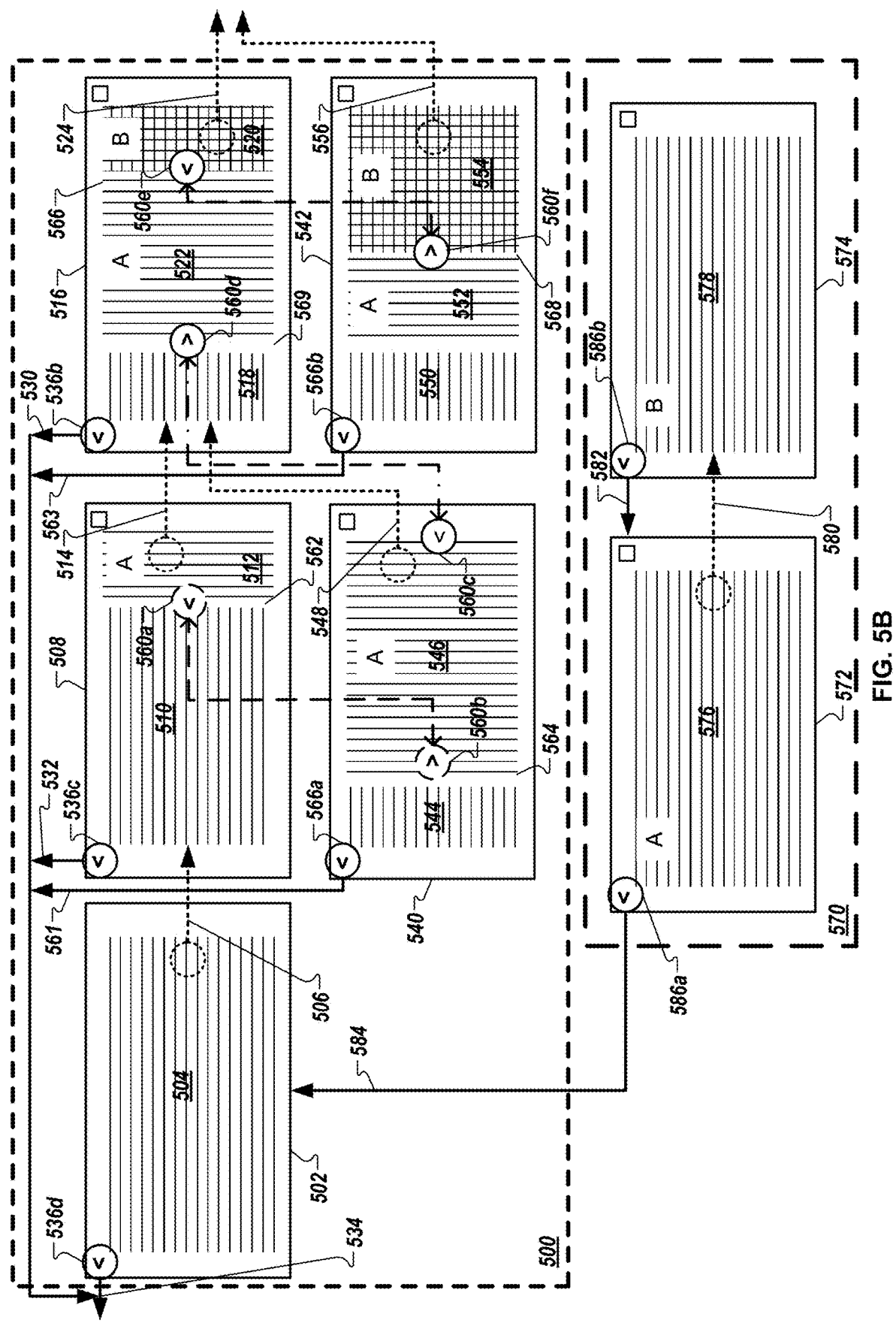

FLEXIBLE SCREEN LAYOUT ACROSS MULTIPLE PLATFORMS

CROSS REFERENCE TO RELATED APPLICATIONS

This application claims priority to and the benefit of U.S. Provisional Application No. 62/335,760, filed May 13, 2016, U.S. Provisional Application No. 62/335,762, filed May 13, 2016, U.S. Provisional Application No. 62/335,765, filed May 13, 2016, U.S. Provisional Application No. 62/335,767, filed May 13, 2016, U.S. Provisional Application No. 62/335,888, filed May 13, 2016, U.S. Provisional Application No. 62/335,892, filed May 13, 2016, U.S. Provisional Application No. 62/335,895, filed May 13, 2016, U.S. Provisional Application No. 62/335,897, filed May 13, 2016, U.S. Provisional Application No. 62/335,899, filed May 13, 2016, U.S. Provisional Application No. 62/335,873 filed May 13, 2016, U.S. Provisional Application No. 62/335,875, filed May 13, 2016, each of which is incorporated by reference in its entirety.

TECHNICAL FIELD

This description generally relates to user interfaces. The description, in particular, relates to systems and techniques for providing a user interface experience for viewing data and information related to multiple software applications.

BACKGROUND

A user of software applications designed to support processes used by an enterprise often needs to navigate back and forth between multiple (and in many cases different) user interfaces and application instances in order to carry out transactional tasks when making a viable decision for the enterprise. In many cases, the navigation can include viewing data and information related to multiple applications. While navigating between the various user interfaces and application instances, the user may become lost and confused, losing a context of a current transactional task. This can create major usability issues, resulting in the inability of the user to effectively carryout the transactional tasks. In general, the user has a poor user experience using and interacting with the software applications.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method can include generating, by a computing device, a user interface for an enterprise application executing on the computing device using a flexible screen layout. The generating can include displaying, on a display device included in the computing device, a first user interface for the enterprise application, the first user interface including a first column that occupies an available screen area of the display device and that presents first content, receiving, in the first user interface, a selection for forward navigation, and responsive to the received forward navigation selection, displaying, on the display device, a second user interface for the enterprise application. The second user interface can include a second column and a third column. The second column and the third column can occupy the available screen area of the display device. The second column can present the first content. The third column can present second content. The flexible screen layout can automatically adjust a size of the second column and a size of the third column based on the available screen area of the display device.

Implementations may include one or more of the following features. For example, the second content can be related to the first content. The enterprise application can be a web application executing in a web browser. The first content can be presented in the second column included in the second user interface in a more compact manner than when presented in the first column of the first user interface. The size of the second column can be greater than the size of the third column. The method can further include receiving, in the second user interface, a toggle selection, and responsive to the received toggle selection, displaying, on the display device, a third user interface including a fourth column and a fifth column. The fourth column and the fifth column can occupy the available screen area of the display device. The fourth column can present the first content. The fifth column can present second content. The flexible screen layout can automatically adjust a size of the fourth column and a size of the fifth column based on the available screen area of the display device. The size of the fourth column can be less than the size of the second column. The size of the fifth column can be greater than the size of the third column. The method can further include receiving, in the second user interface, another selection for forward navigation, responsive to the received forward navigation selection, displaying, on the display device, a third user interface including a fourth column, a fifth column, and a sixth column. The fourth column, the fifth column, and the sixth column can occupy the available screen area of the display device. The fourth column can present the first content. The fifth column can present the second content. The sixth column can present third content. The flexible screen layout can automatically adjust a size of the fourth column, a size of the fifth column, and a size of the sixth column based on the available screen area of the display device. The method can further include receiving, in the second user interface, a layout selection, and responsive to the received layout selection, displaying, on the display device, a fourth user interface for the enterprise application. The fourth user interface can be displayed in a full screen layout including a single column occupying the available screen area of the display device. The single column can present the second content.

In another general aspect, a non-transitory, machine-readable medium has instructions stored thereon. The instructions, when executed by a processor, cause a computing device to generate a user interface for an enterprise application executing on the computing device using a flexible screen layout. The generating can include displaying, on a display device included in the computing device, a first user interface for the enterprise application, the first user interface including a first column that occupies an available screen area of the display device and that presents first content, receiving, in the first user interface, a selection for forward navigation, and responsive to the received forward navigation selection, displaying, on the display device, a second user interface for the enterprise application. The second user interface can include a second column and a third column. The second column and the third column can occupy the available screen area of the display device. The second column can present the first content. The third column can present second content. The flexible screen layout can automatically adjust a size of the second column and a size of the third column based on the available screen area of the display device.

Implementations may include one or more of the following features. For example, the second content can be related to the first content. The enterprise application can be a web application executing in a web browser. The first content can be presented in the second column included in the second user interface in a more compact manner than when presented in the first column of the first user interface. The size of the second column can be greater than the size of the third column. The generating can further include receiving, in the second user interface, a toggle selection, and responsive to the received toggle selection, displaying, on the display device, a third user interface including a fourth column and a fifth column. The fourth column and the fifth column can occupy the available screen area of the display device. The fourth column can present the first content. The fifth column can present second content. The flexible screen layout can automatically adjust a size of the fourth column and a size of the fifth column based on the available screen area of the display device. The size of the fourth column can be less than the size of the second column. The size of the fifth column can be greater than the size of the third column. The generating can further include receiving, in the second user interface, another selection for forward navigation, and responsive to the received forward navigation selection, displaying, on the display device, a third user interface including a fourth column, a fifth column, and a sixth column. The fourth column, the fifth column, and the sixth column can occupy the available screen area of the display device. The fourth column can present the first content. The fifth column can present the second content. The sixth column can present third content. The flexible screen layout can automatically adjust a size of the fourth column, a size of the fifth column, and a size of the sixth column based on the available screen area of the display device. The generating can further include receiving, in the second user interface, a layout selection, and responsive to the received layout selection, displaying, on the display device, a fourth user interface for the enterprise application. The fourth user interface can be displayed in a full screen layout including a single column occupying the available screen area of the display device. The single column can present the second content.

In yet another general aspect, a system can include at least one memory including instructions on a computing device, and at least one processor on the computing device. The processor can be operably coupled to the at least one memory and can be arranged and configured to execute the instructions that, when executed, cause the processor to implement generating, by a computing device, a user interface for an enterprise application executing on the computing device using a flexible screen layout. The generating can include displaying, on a display device included in the computing device, a first user interface for the enterprise application, the first user interface including a first column that occupies an available screen area of the display device and that presents first content, receiving, in the first user interface, a selection for forward navigation, and responsive to the received forward navigation selection, displaying, on the display device, a second user interface for the enterprise application. The second user interface can include a second column and a third column. The second column and the third column can occupy the available screen area of the display device. The second column can present the first content. The third column can present second content. The flexible screen layout can automatically adjust a size of the second column and a size of the third column based on the available screen area of the display device.

Implementations may include one or more of the following features. For example, the enterprise application can be a web application executing in a web browser. The first content can be presented in the second column included in the second user interface in a more compact manner than when presented in the first column of the first user interface. The second content can be related to the first content. The size of the second column can be greater than the size of the third column. The instructions, when executed, can further cause the processor to implement receiving, in the second user interface, a toggle selection, and responsive to the received toggle selection, displaying, on the display device, a third user interface including a fourth column and a fifth column. The fourth column and the fifth column can occupy the available screen area of the display device. The fourth column can present the first content. The fifth column can present second content. The flexible screen layout can automatically adjust a size of the fourth column and a size of the fifth column based on the available screen area of the display device. The size of the fourth column can be less than the size of the second column. The size of the fifth column can be greater than the size of the third column. The instructions, when executed, can further cause the processor to implement receiving, in the second user interface, another selection for forward navigation, and responsive to the received forward navigation selection, displaying, on the display device, a third user interface including a fourth column, a fifth column, and a sixth column. The fourth column, the fifth column, and the sixth column can occupy the available screen area of the display device. The fourth column can present the first content. The fifth column can present the second content. The sixth column can present third content. The flexible screen layout can automatically adjust a size of the fourth column, a size of the fifth column, and a size of the sixth column based on the available screen area of the display device. The instructions, when executed, can further cause the processor to implement receiving, in the second user interface, a layout selection, and responsive to the received layout selection, displaying, on the display device, a fourth user interface for the enterprise application. The fourth user interface can be displayed in a full screen layout including a single column occupying the available screen area of the display device. The single column can present the second content.

The details of one or more implementations are set forth in the accompanying drawings and the description below. Other features will be apparent from the description and drawings, and from the claims.

BRIEF DESCRIPTION OF THE DRAWINGS

FIG. 4 is a block diagram showing multiple example user interface layouts for a display device of a computing device.

FIG. 5B includes a block diagram of the example flexible screen layout as shown in FIG. 5A with the addition of two flexible screen layouts.

Like reference symbols in the various drawings indicate like elements.

DETAILED DESCRIPTION

Figure 1A:
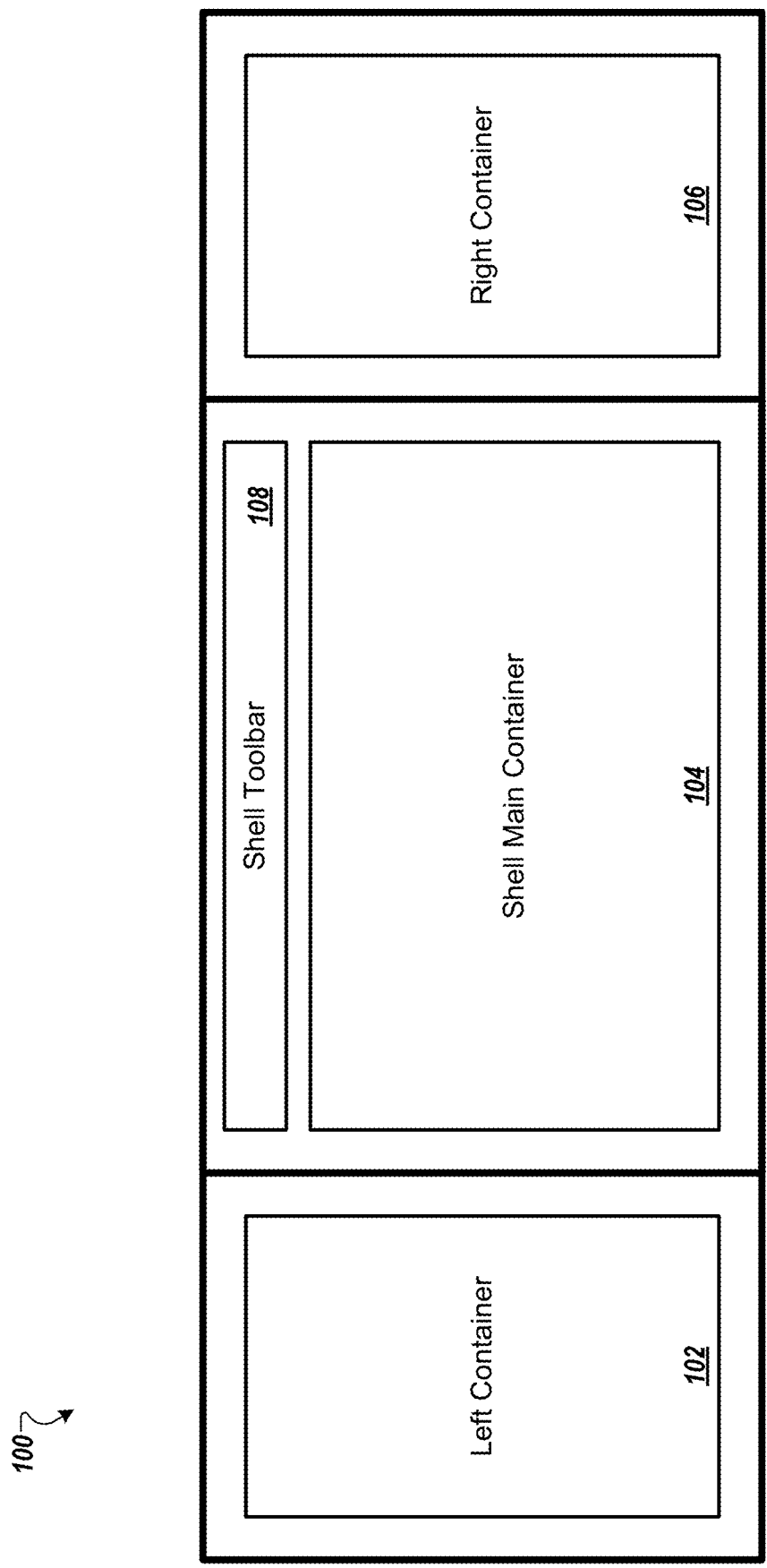
FIG. 1A is an illustration of a user interface entry point (a viewport) for a particular user experience.

Enterprise transactional applications can evolve from large monolithic on-premise software deployments into multiple (e.g., hundreds of, thousands of) small, componentized applications that can execute (run) on various types of computing devices and network platforms. For example, the fifth version of Hypertext Markup Language (HTML5) can be used as a basis for structuring and presenting an application platform that includes a grid matrix-style home screen or dashboard-like user interface. The use of HTML5 can provide an improved user experience, can reduce a user interface complexity, and may increase user productivity across multiple types of computing devices. The computing devices can include, but are not limited to, desktop computers and mobile computing devices such as laptop computers, tablet computers, notebook computers, personal digital assistants (PDAs), smartphones, mobile phones, smart watches, etc.).

In some cases, the grid matrix-style home screen or dashboard-like user interface allows a user to open and access a selected application. In some cases, the grid matrix-style home screen or dashboard-like user interface allows a user to access content within an application. These user interfaces can present user experience (UX) and user interface (UI) shortcomings while attempting to provide optimized usability and user-centric business functionalities related to transactional tasks.

For example, users may need to navigate back and forth between multiple screens that can include home screens, application instances, and drill downs, in order to perform various transactional tasks to make viable business decisions. The user may need to navigate back and forth between multiple screens when viewing related data between various applications.

For example, applications and application instances may not interoperate with each other. Because of this, user navigation and operations may not be minimized. Applications may not readily access relative content without first needing to open an application instance and then perform numerous navigations.

In order to improve a user experience (UX), a user interface can be implemented to intuitively propose relative context or intent to a user. A user interface can be implemented to conform to, recognize, and facilitate ways in which a user may personally work. A user interface can be implemented to help a user remember important tasks. The use of such a "smart" user interface can help a user easily manage and keep track of the context of current tasks and activities when carrying out transactional tasks.

A shortcoming of a UX and a UI can be a lack of relative business contexts related to user roles and expertise that can empower employees to do their job better, faster, and in a more deliberate way. Providing a user with a way to personalize an experience of the user based on a role requirement of the user can result in a better overall user experience. For example, the personalization can result in a UI automatically providing proposals for transactional tasks that the user may need to see. The proposals can be provided at a time when the user wants to see the proposal and on a computing device chosen by the user. The proposals can be provided to the user as a result of a single click or gesture input to the user interface by the user. The UI can be considered a central interface that can provide a user with the ability to communicate, collaborate, initiate, and/or respond to colleagues, managers, and customers without leaving the context of their current activity or application.

Alternatively, a user may have to navigate through multiple applications and user interfaces. A user may easily lose a context of a current task or activity while having to navigate through user interfaces provided in a multiple application environment for an enterprise. The loss of context can affect the ability of the user to effectively carryout a transactional task. In addition, navigating through user interfaces provided in a multiple application environment may not allow a user to readily view, at a glance, live data that may be relevant to personal and professional daily activities, responsibilities, and organizational accountabilities of the user. The user may not be provided with a way to efficiently manage hundreds (or thousands) of applications associated with transactional workflows in the enterprise.

Enterprise applications that are associated with transactional workflows in an enterprise can be implemented using a software development technology or foundation (e.g., HTML5/CSS/JS technology) in a particular UI framework (e.g., SAPUI5) in order to provide a beneficial UX and UI. The enterprise applications can be implemented to execute or run on multiple different types of computing devices such as desktop computers and mobile computing devices (e.g., laptop computers, tablet computers, notebook computers, personal digital assistants (PDAs), smartphones, mobile phones, smart watches, etc.).

For example, the UI may use elements of a particular UX (e.g., an SAP Fiori® UX) to provide a user with a personalized, responsive, seamless, and simple user experience across enterprise applications (including legacy and new), across different types of computing devices such as desktop computers and mobile computing devices (e.g., laptop computers, tablet computers, notebook computers, personal digital assistants (PDAs), smartphones, mobile phones, smart watches, etc.), and across all possible deployment options (e.g., on-premise, cloud, as-a-service, etc.).

The particular UX can deploy an array of interactive features and process tools that can be integrated with a suite or set of enterprise applications that have specific functionalities. The particular UX can provide intelligent, contextual-based support for users across an enterprise. The particular UX can use a "push" model that can anticipate tasks (e.g., transactional tasks) for a user based on a role of the user in the enterprise. The particular UX can import real-time data that can be tailored to specific tasks. The software for the UI for the particular UX can be implemented to easily and transparently scale the UI accordingly for display on each display device included in each of the different possible computing devices that can execute (run) the enterprise applications.

FIG. 1A is an illustration of a UI entry point (a viewport 100) for a particular UX. The viewport 100 can be a single-screen view partitioned into multiple (e.g., three) multifunctional screen areas (e.g., a left screen area (left container 102, a center screen area (shell main container 104), and a right screen area (right container 106) for display in a display area (on a display device) included in a computing device. The viewport 100 can include a shell toolbar 108. The shell toolbar 108 can include a global search and other services, which are available to a user across all enterprise applications.

The shell main container 104 can display information for use as a main workspace for the UX. In some implementations, multiple different screens can be displayed in the shell main container 104. For example, a login screen, a launchpad screen, and an overview page can alternatively be displayed in the shell main container 104. The viewport 100 can provide a user with a screen orientation that can allow the user access to application information. The viewport 100 can provide the user with a UX and UI the includes the business functionalities and enterprise application-to-application navigations needed by the user without disrupting a context of a current task of the user.

Figure 1B:
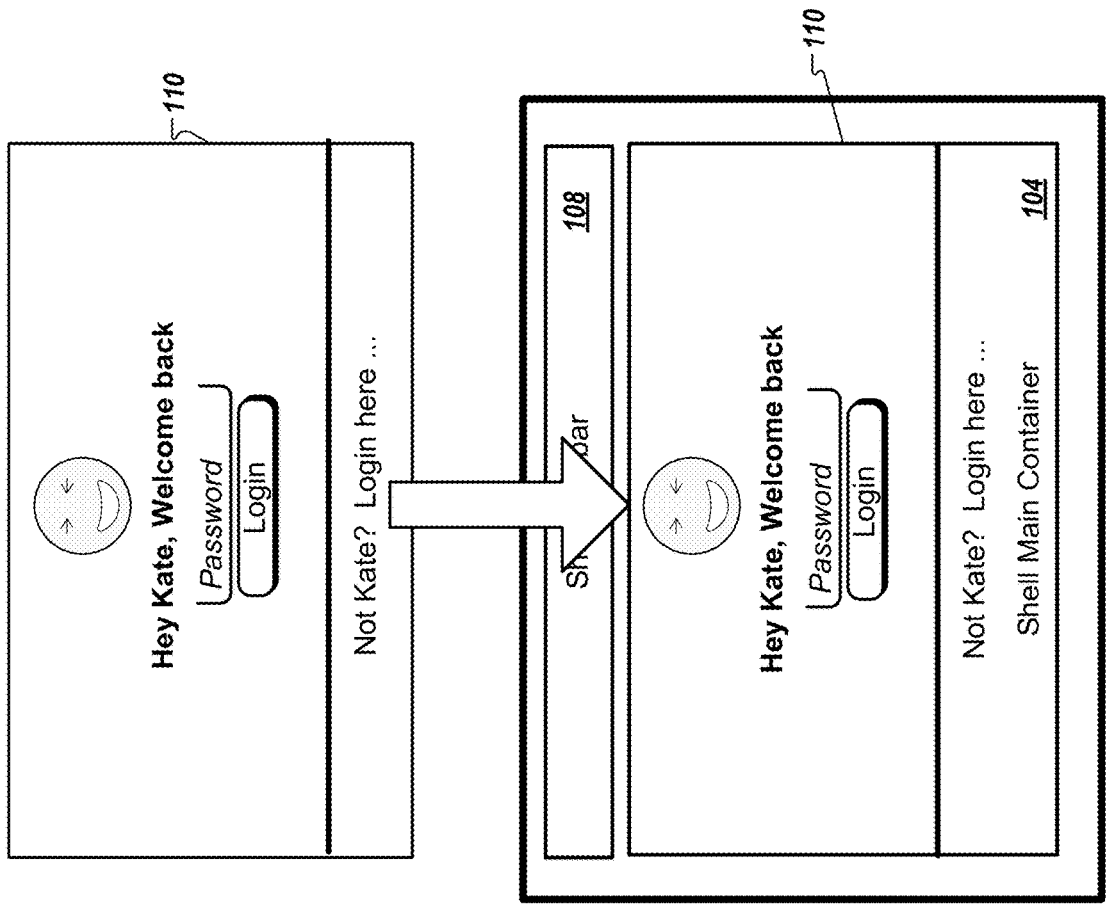
FIG. 1B is an illustration showing an example login screen displayed in a shell main container.

FIG. 1B is an illustration showing an example login screen 110 displayed in the shell main container 104. The login screen 110 provides a UI that allows a user to enter credentials in order to log into and begin a personalized and customized UX. In the example shown in FIG. 1B, the login screen 110 appears to drop into the shell main container 104 from a virtual extension area located along a top of a display area. In some implementations, the virtual extension area can be placed along the bottom of the display area. In some implementations, the virtual extension area can be placed to the left and/or the right of the display area.

Figure 1C:
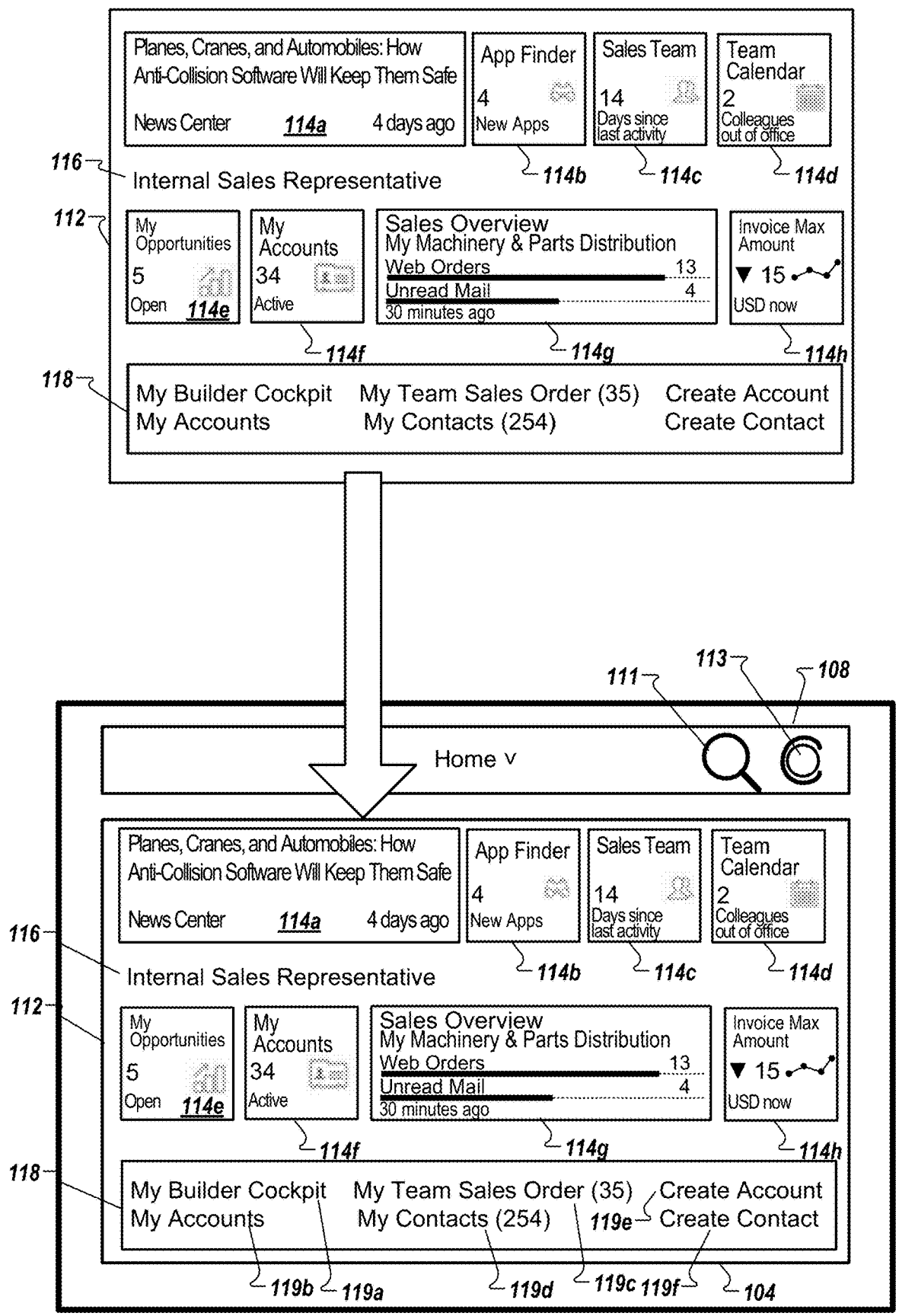
FIG. 1C is an illustration showing an example launchpad displayed in a shell main container.

FIG. 1C is an illustration showing an example launchpad 112 displayed in the shell main container 104. The launchpad 112 can be a web-based entry point (or homepage) for enterprise applications that can execute (run) across multiple platforms and computing devices. In the example shown in FIG. 1C, the launchpad 112 appears to drop into the shell main container 104 from the top of a display area. In some implementations, the virtual extension area can be placed along the bottom of the display area. In some implementations, the virtual extension area can be placed to the left and/or the right of the display area.

The launchpad 112 can serve as a bracket around (or a base for) a set (or group) of enterprise applications, providing a single point of entry for the set of enterprise applications. In the example shown in FIG. 1C, the launchpad 112 presents (displays on a screen of a computing device of a user) each application represented by a tile. A tile can be a container that represents the application. Each tile can display different types of content. A user can interact with each tile to navigate to the specific enterprise application associated with the tile. In addition, when designing a tile to represent a specific application, a programmer can assign a tile to a specific user or group of users. The launchpad 112 can provide one or more services. The one or more services can include, but are not limited to, application-to-application navigation, personalization, role-based application assignments, search, and incident creation.

The launchpad 112 can be a role based, personalized, real-time and contextual aggregation point for business applications and analytics. The launchpad 112 can run (execute) on multiple computing devices including, but not limited to, desktop computers and mobile computing devices such as laptop computers, tablet computers, notebook computers, personal digital assistants (PDAs), smartphones, mobile phones, smart watches, etc.). In addition, the launchpad 112 can be deployed on multiple platforms (e.g., Linux, Windows, Windows Phone, MAC®, iOS®, OS X®, Android®, etc.).

The launchpad 112 includes tiles 114a-h. Each tile can display different types of content. For example, tile 114a can be a news and feeds tile that can enhance collaboration by providing a user with information about the enterprise. The tiles 114a-h can be individually color-coded. A color can represent a particular role (e.g., finance, human resources, supply chain management (SCM), customer relationship management (CRM), etc.). The tiles 114a-h can be associated with a group 116. Tile 114f can be a key performance indicator (KPI) tile. Tile 114b can be a basic launch tile. Tile 114d can be a monitoring tile. Tile 114g can display a comparison chart for specific content.

The launchpad 112 includes a link list area 118 that includes links 119a-f. The link list area 118 is an area on the launchpad 112 that can provide links to enterprise applications represented by the tiles 114a-h. For example, a user can select and drag a tile from the tile area on the launchpad 112 into the link list area 118 to create a link to the application associated with (represented by) the tile. In some implementations, the launchpad 112 can include a footer toolbar (e.g., footer toolbar 132 as shown in FIG. 1F). In some implementations, the footer toolbar can appear to float over the content displayed in the launchpad 112.

In some implementations, the shell toolbar 108 can display a search icon 111 and a copilot launch icon 113. A user can select (click on) the copilot launch icon 113 to launch a copilot UI. A copilot UI will be described in more detail with reference to FIG. 1I.

Figure 1D:
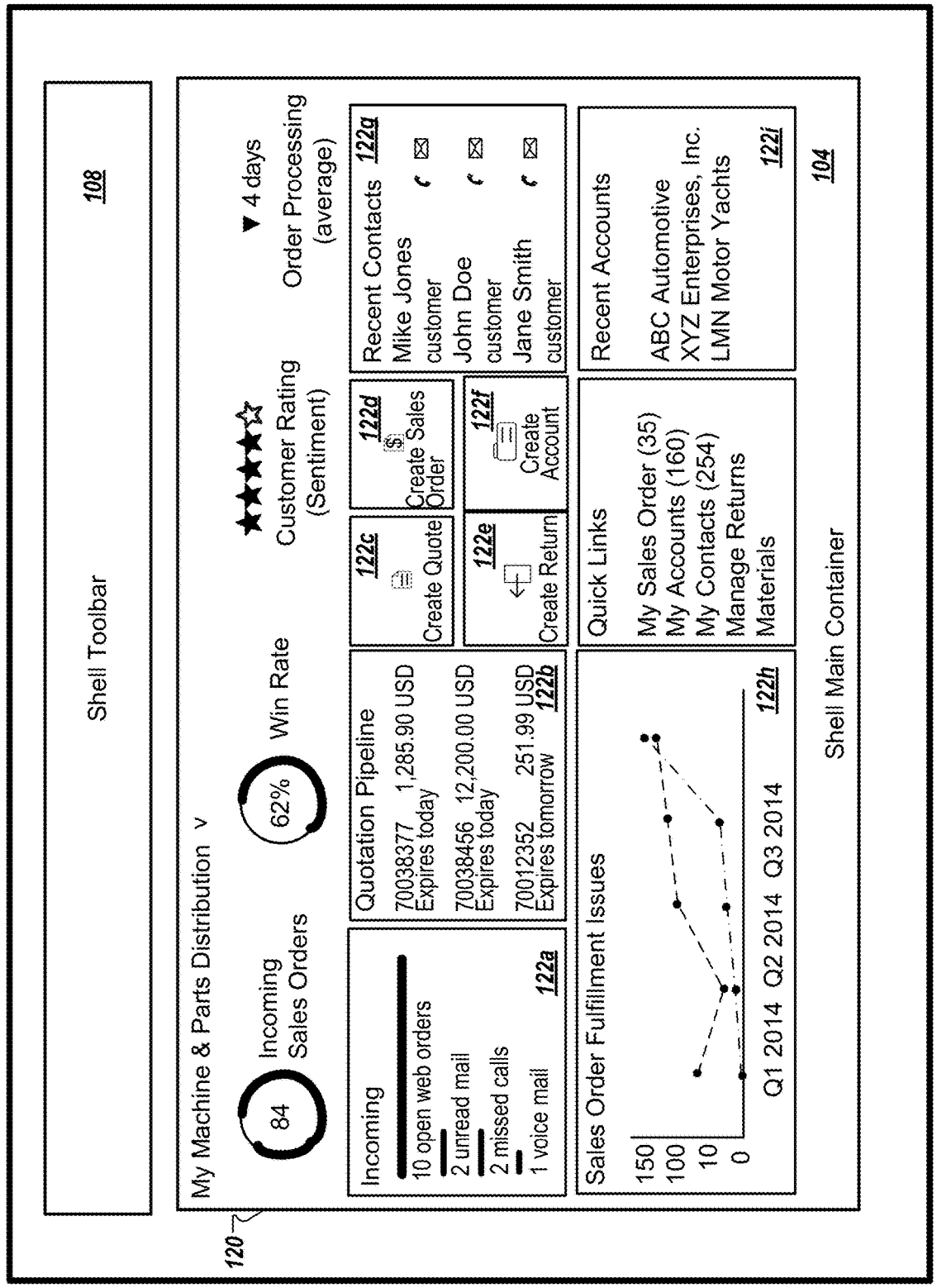
FIG. 1D is an illustration showing an example active application screen (an overview page) displayed in a shell main container.

FIG. 1D is an illustration showing an example active application screen (overview page 120) displayed in the shell main container 104. The enterprise applications that can be accessed by a user by way of the launchpad 112 and then subsequently displayed in an active application screen (e.g., the overview page 120) can include, but are not limited to, transactional applications, analytical applications, and fact sheet applications (contextual navigation applications). Transactional applications can allow a user to create, change and/or approve processes with guided navigation. Analytical applications can provide a user with a visual overview of a dedicated topic for monitoring and tracking purposes to allow for further key performance indicator (KPI) related analysis. Fact sheet applications can allow a user to view essential information about an object and to allow navigation between related objects.

The overview page 120 can visualize all of the information a user may need for a specific business context (business domain) on a single page or screen. The information can be displayed in one or more variable content packages (VCPs) or cards 122a-i. Each card can be a container of content for organizing large amounts of information on an equal plane within the overview page 120. In some implementations, a user can rearrange the position of the cards 122a-i on the overview page 120. In some implementations, a user define, add, or delete cards included in the overview page 120.

An overview page (e.g., the overview page 120) can be a selectable application (e.g., from the launchpad 112) providing an integrated gateway into enterprise applications and application content included in the launchpad 112. The UI of the overview page (e.g., the overview page 120) can provide a user with a visual summary of data, links, actions, and content that are relevant to a business domain of expertise of a user and relevant to a selected role of the user within the domain. The visual summary can be presented in one or more cards (e.g., the cards 122a-i) that display live content to a user at-a-glance without the user having to open multiple applications and perform multiple drill downs through application content to find and present the content.

In some implementations, the overview page 120 can include a footer toolbar (e.g., footer toolbar 132 as shown in FIG. 1F). In some implementations, the footer toolbar can appear to float over the content displayed in the overview page 120.

In some implementations, an enterprise system can determine content displayed on an overview page (e.g., the overview page 120). In addition or in the alternative, a selection of one or more business domains and one or more roles of a user in the business or enterprise can determine content displayed on an overview page (e.g., the overview page 120). In some implementations, a user can make the selection using a settings UI included in a launchpad (e.g., the launchpad 112). In some implementations, a user can select one or more business domains and/or one or more roles of the user in the enterprise by way of an overview page (e.g., the overview page 120). Selecting one or more business domains and/or one or more roles of the user in the enterprise by way of the overview page can maintain absolute relevance to the individual user and the way in which the user works.

In some implementations, the user can personalize the layout and placement of one or more cards (e.g., the cards 122a-i) included in a UI of an overview page (e.g., the overview page 120) and the display of content included in each card. The personalization can enhance the workplace productivity of the user.

Figure 1E:
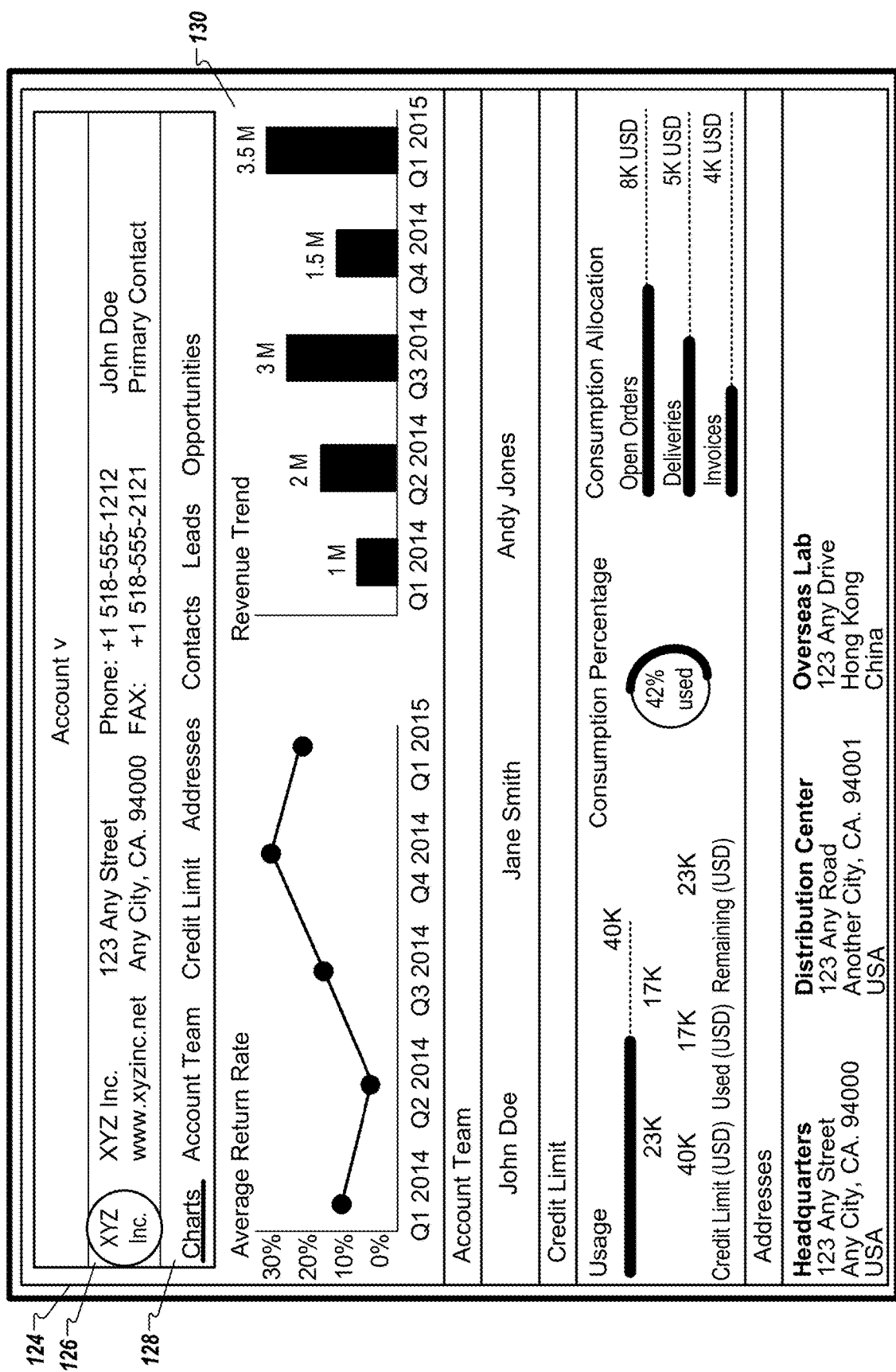
FIG. 1E is an illustration showing an example object page displayed in a shell main container.
Figure 1F:
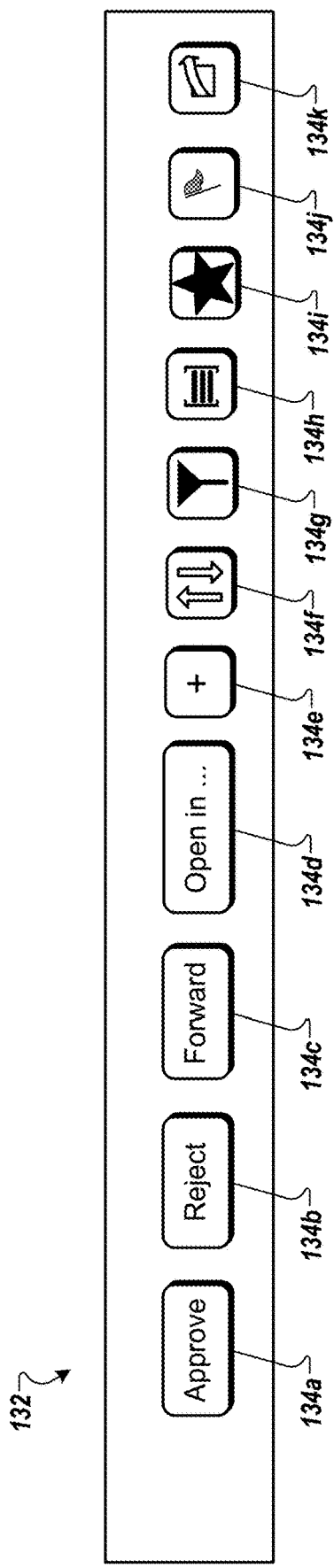
FIG. 1F is an illustration showing an example footer toolbar.

FIG. 1E is an illustration showing an example object page (object page 124) displayed in the shell main container 104. An object page can be a floor-plan used to represent objects in a UI. An object page can be used to display, create, or edit an object. An object can represent a business entity (e.g., a customer, a sales order, a product, an account, etc.). Enterprise applications that reflect a specific scenario (e.g., a sales order, am account status) can be bundled using an object. The object page can include a header area 126, a navigation area 128, a content area 130, and, in some implementations, a footer toolbar (e.g., footer toolbar 132 as shown in FIG. 1F). In some implementations, the footer toolbar can appear to float over the content displayed in the object page 124. For example, referring to FIG. 1C, a user can select the tile 114f and an object page can be displayed to the user.

FIG. 1F is an illustration showing an example a footer toolbar (e.g., footer toolbar 132). In some implementations, referring to FIG. 1A, the footer toolbar 132 can appear at the bottom of a screen displayed in the shell main container 104, the left container 102, and/or the right container 106. For example, as described herein with reference to FIGS. 1C-E, a footer toolbar (e.g., the footer toolbar 132) can be displayed at the bottom of the launchpad 112, the overview page 120, and the object page 124. The footer toolbar (e.g., the footer toolbar 132) can continue to appear at the bottom of the screen of the display area of the display device even as the displayed screen is scrolled. The footer toolbar (e.g., the footer toolbar 132) can appear to hover over or float over the content being displayed on the screen. The footer toolbar 132 can include buttons or controls 134a-k. The controls 134a-k can be selected by a user in order to perform one or more actions that can impact content included on the page being displayed on the screen. The controls 134a-k are examples of controls that can be included in a footer toolbar. In some implementations, the controls can be different, fewer than, or more than the controls 134a-k. The type and number of controls included in a footer toolbar can be based on the type of page being displayed and/or the content being displayed in the page.

Figure 1G:
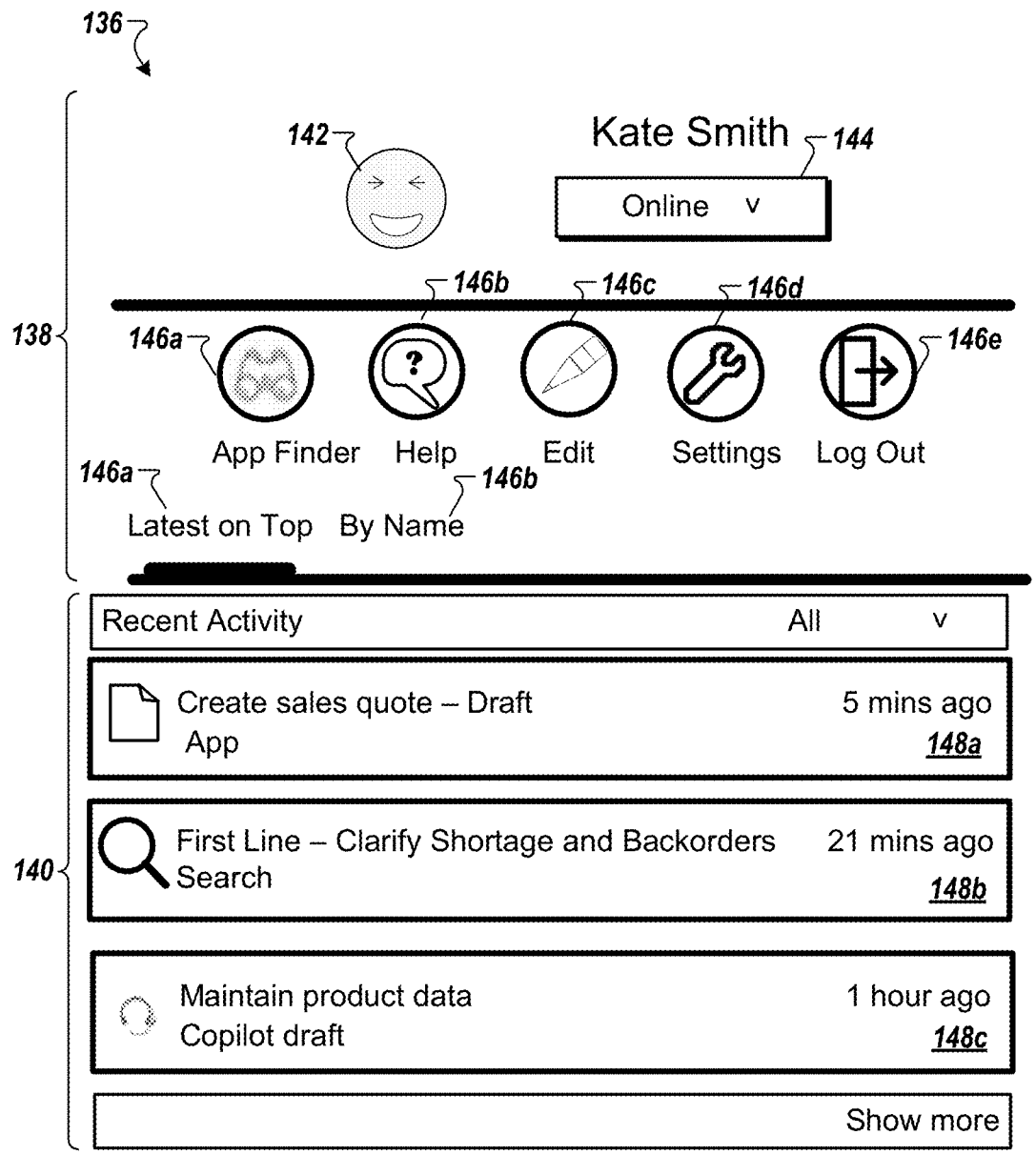
FIG. 1G is an illustration showing an example me area that can be displayed in a left container.

FIG. 1G is an illustration showing an example me area (e.g., me area 136) that can be displayed in the left container 102. In some implementations, the me area 136 can be displayed in the right container 106. The me area 136 includes an upper section 138 and a lower section 140. The upper section 138 includes a user icon 142. Selecting (clicking on) the user icon 142 can provide a user profile. A dropdown indicator button 144 displays a status of the user and, if selected, a user can logout of an application. The upper section 138 includes navigation targets 146a-e. Selection of (clicking on) a navigation target by a user triggers a corresponding functionality (e.g., an application) associated with a navigation target. The me area 136 can provide various generalized functionalities as they are related to a user.

The upper section 138 can include sort selections 146a-b. A user can select (click on) a sort selection (e.g., one of the sort selections 146a-b) to determine how the listing of the recent activities included in the lower section 140 will be sorted and displayed.

The lower section 140 of the me area 136 includes a list of recent activities 148a-c. The recent activities 148a-c can include links 156a-c, respectively, that when selected (clicked on) by a user can navigate the user to back to the shell main container 104, opening an application (or function) that corresponds to the link in the shell main container 104. Recent activity items can include, but are not limited to, enterprise applications, triggered searches, co-pilot collections, and co-pilot drafts.

Figure 1H:
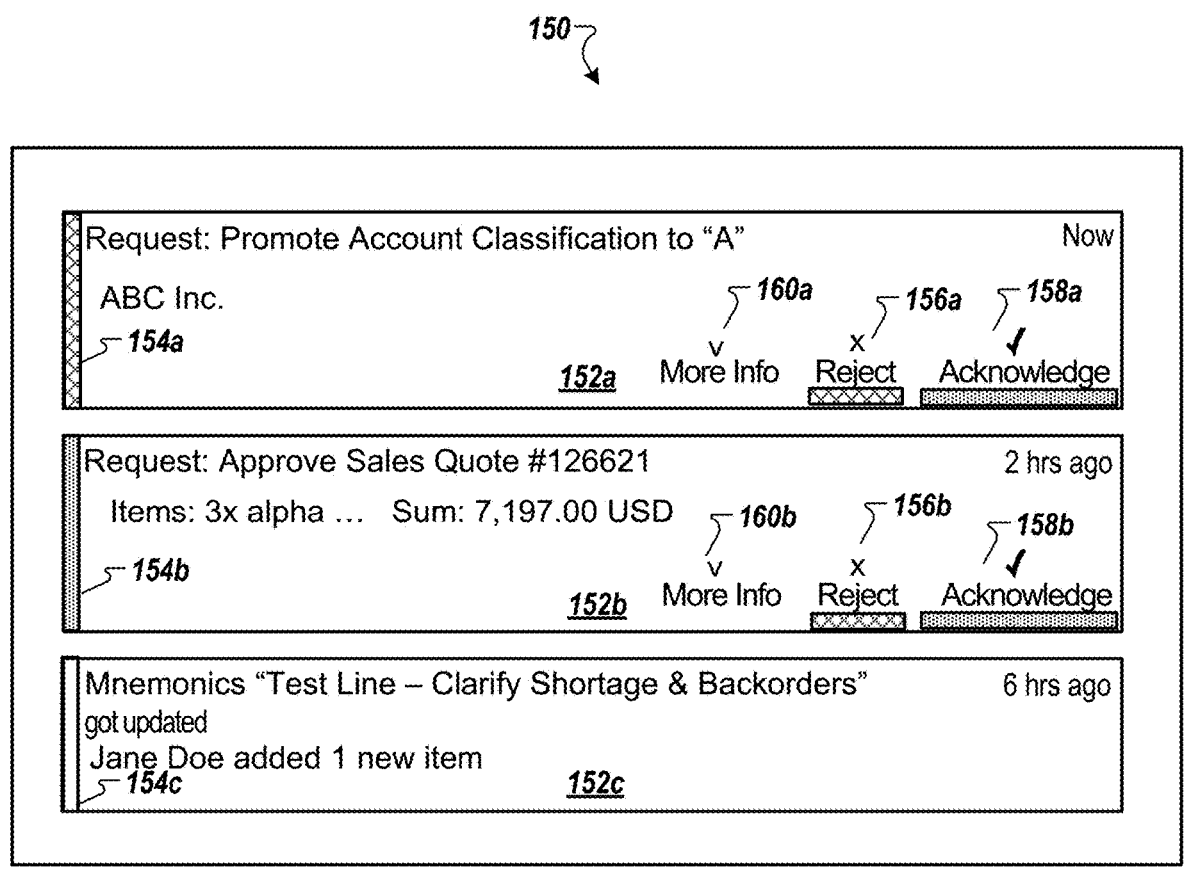
FIG. 1H is an illustration showing an example notification area that can be displayed in a right container.

FIG. 1H is an illustration showing an example notification area (e.g., notification area 150) that can be displayed in the right container 106. In some implementations, the notification area 150 can be displayed in the left container 102. The notification area 150 includes notifications 152 a-c. A user interacting with the UI in the notification area 150 can take immediate action on a notification. A notification item (e.g., notifications 152 a-c) can have an indicator (e.g., notification indicators 154a-c) that can indicate the status of the notification. For example, a notification indicator can be color coded to indicate a particular status of the notification.

A user can reject a notification by selecting (clicking on) a reject selection (e.g., a reject selection 156a-b). For example, a user can reject the notification 152a by selecting (clicking on) the reject selection 156a. The rejection of the notification 152a (the notification status) can be indicated by content included in (e.g., a color of) a notification indicator 154a. A user can acknowledge a notification by selecting (clicking on) an acknowledge selection (e.g., a acknowledge selection 158a-b). For example, a user can acknowledge the notification 152b by selecting (clicking on) the acknowledge selection 158b. The acknowledgement of the notification 152b (the notification status) can be indicated by content included in (e.g., a color of) a notification indicator 154b.

A user can drill down into a relevant application by selecting (clicking on) a more info selection (e.g., a more info selection 160a-b). In some cases, a user may contact someone directly in response to a notification.

Figure 1I:
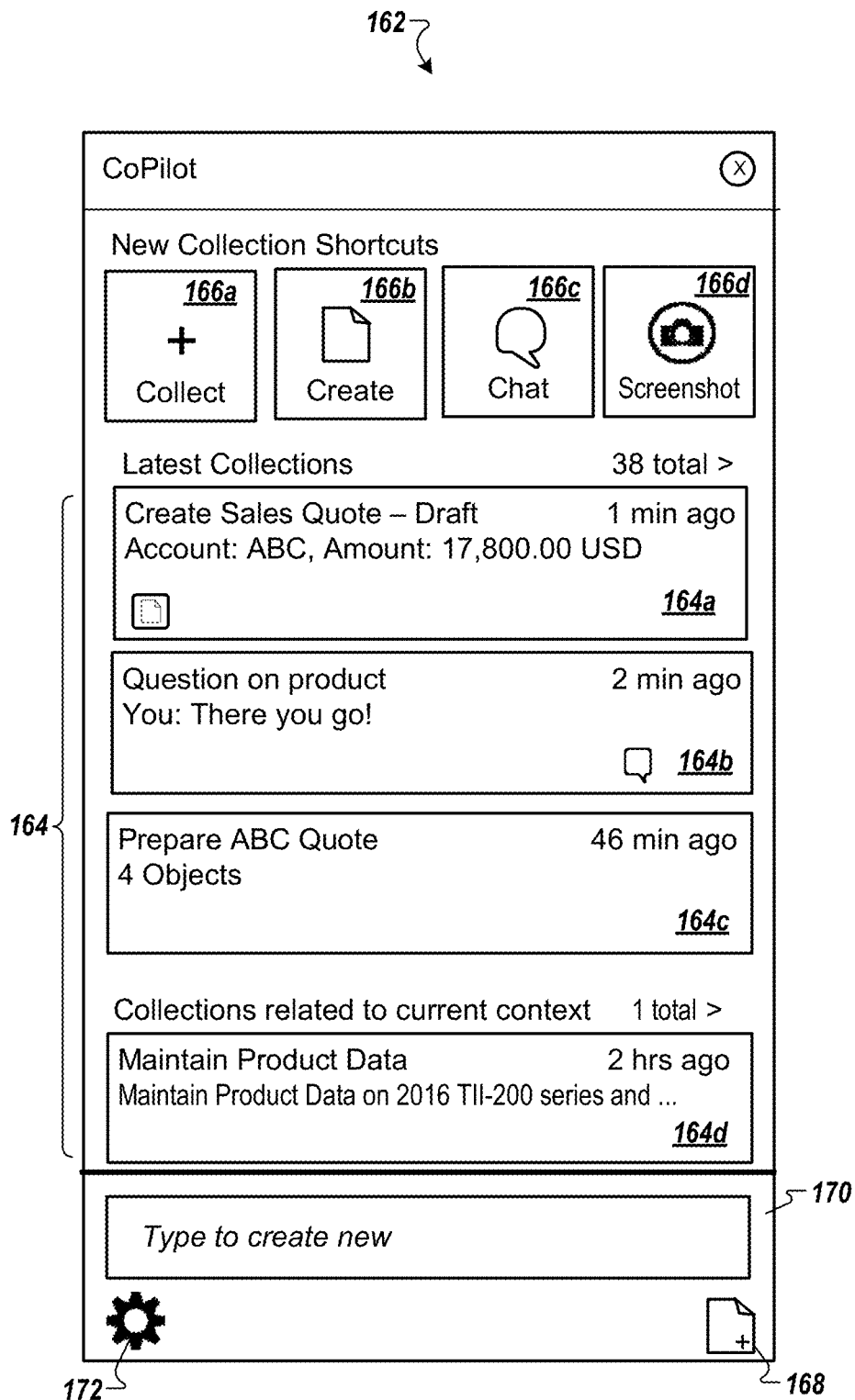
FIG. 1I is an illustration showing an example copilot user interface.

FIG. 1I is an illustration showing an example copilot UI (e.g., copilot UI 162). For example, referring to FIG. 1C, a copilot application can be launched from the launchpad 112 when a user selects (clicks on) the copilot launch icon 113. The copilot application can provide (generate and display) the copilot UI 162. In some cases, the copilot UI 162 can float over the UI included in the launchpad 112. As a floating UI control, the copilot UI 162 can be visually unobtrusive and flexible in its cross-functional omnipresent implementation across any device or application screen.

The example copilot UI 162 is an example copilot start page or start screen. The start screen (the copilot UI 162) can be an entry point for copilot functionality for an enterprise system.

The copilot UI 162 can provide shortcuts to different copilot features. For example, as shown in FIG. 1I, a collection can be represented by an entry in a collection list 164 that includes collection list entries 164a-d. A copilot collection can be a cluster of items in relation to a specific topic. For example, an item can be a note, a screenshot, a chat message, a copilot message, an object, or a quick create. In some implementations, the items included in the collection can be homogeneous (e.g., all of the items are of the same type). In some implementations, the items included in a collection can be non-homogeneous (e.g., the items can be of different types). Each collection list entry 164a-d can provide a representation of a collection that can include a title, a timestamp (e.g., last changed), a visual content summary, and a textual content preview. In some implementations, the collection list 164 can be searched and/or filtered.

For example, the selection of a copilot shortcut 166a-d can allow a user to create and navigate to a new collection with a specified intention. The selection of a copilot create icon 168 located in a copilot footer toolbar 170 can create and navigate to a new plain collection. The selection of a copilot settings icon 172 located in the copilot footer toolbar 170 can allow a user access to copilot settings (e.g., display a copilot settings UI, open a copilot settings application, etc.).

Copilot entries can be living, gradually growing artifacts and software entities that can accompany a user from the identification of an issue to a solution for the issue, while providing support in the form of relevant context and actions. Copilot entries can serve as memory aides while the copilot entries can incrementally evolve into valuable transactional tasks and collaborations as they mature in meaningful ways that bridge a gap between predefined application functionality and processes based on personal ways of working for a user. Though the example shown in FIG. 1I describes launching the copilot application from the launchpad 112, referring to FIG. 1A, the copilot application can be launched from other screens displayed in (included in) the shell main container 104, the left container 102, and/or the right container 106.

Copilot entries can be made ready for users to use when communicating, collaborating, and creating actionable transactions in desktop or mobile scenarios. For example, copilot text entries can be analyzed for recognizing and identifying relevant text related objects. Copilot text entries can emphasize displayed text, and a copilot application can recommend contextual entities for use in a current task. The copilot application can understand user context and can intelligently propose selections, auto-entries, and user options.

A smart template can provide a framework for generating user interfaces at runtime for an enterprise application. For example, a smart template can be used to generate the UI for the overview page 120 as shown in FIG. 1D. In another example, a smart template can be used to generate the UI for the object page 124, as shown in FIG. 1E. A smart template can provide a framework for generating the user interfaces based on metadata annotations and predefined templates for the most used application patterns. The use of smart templates can ensure design consistency by providing centralized high quality code by using predefined templates and controllers. The use of smart templates can keep applications up to date with evolving design guidelines. The use of smart templates can reduce an amount of front-end code used in building enterprise applications. The term "smart" can refer to annotations that add semantics and structures to provided data. The term "smart" can also refer to the way in which the templates understand the semantics.

Figure 1J:
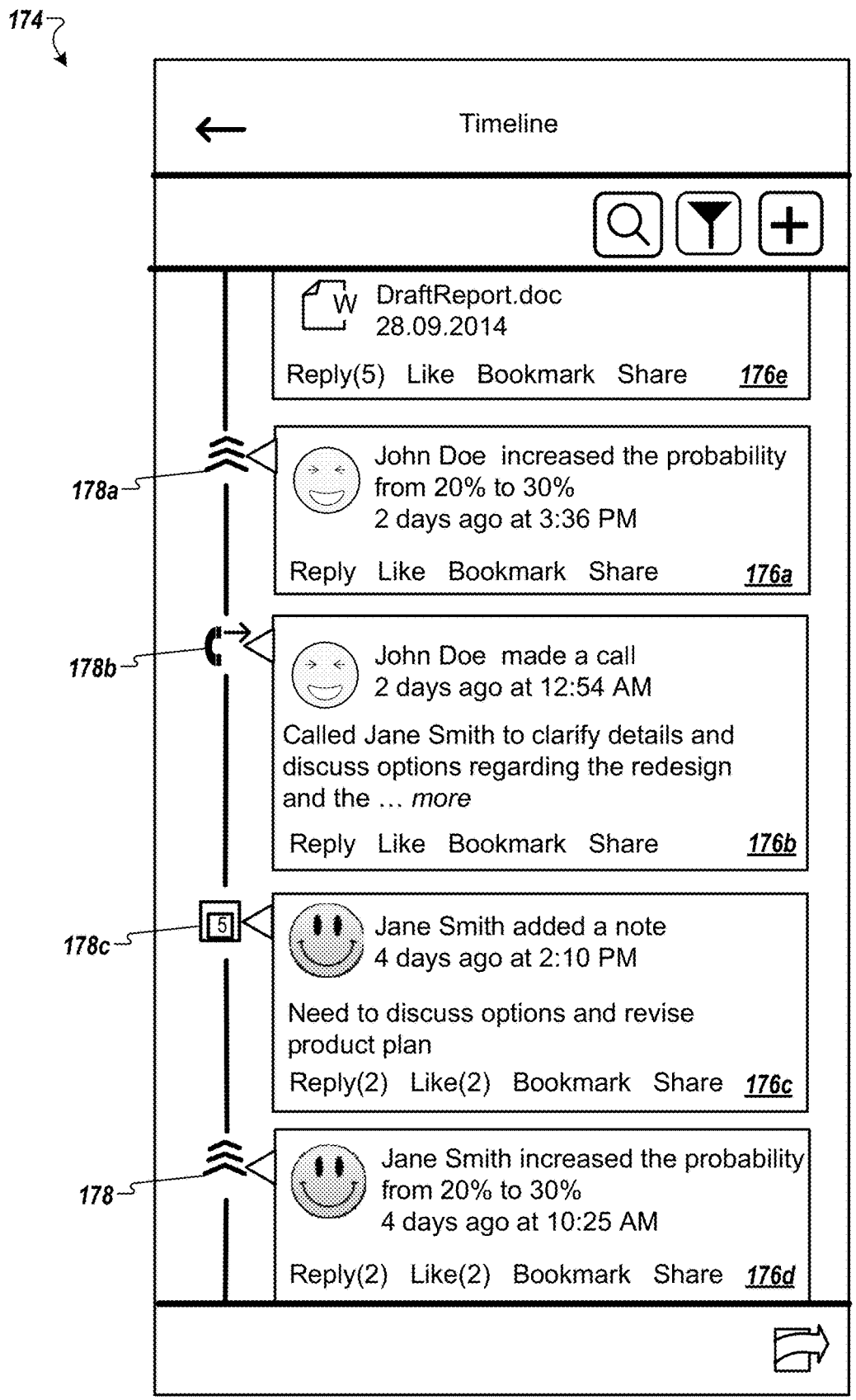
FIG. 1J is an illustration of a timeline user interface that can display timeline entries.

FIG. 1J is an illustration of a timeline UI (e.g., the timeline 174). A timeline UI (e.g., the timeline 174) can display timeline entries 176a-e. For example, the entries can be events, objects, and/or posts listed and displayed in a chronological order. The timeline 174 includes nodes 178a-d that correspond to respective timeline entries 176a-d.

The timeline 174 can be used for collaborative communications. The timeline 174 can be configured in multiple different ways depending on use case implementations. For example, the timeline 174 can provide information about changes of an object or about events related to an object. The timeline 174 can provide information about generated entries (e.g., value XY changed from A to B) or about manual entries (e.g., comments from an individual). In some implementations, the latest entry is at the top of a list displayed by a timeline. In some implementations, the timeline 174 can be displayed along with a business object. In some cases, the timeline 174 can be displayed to the right of the business object.

Two example versions of a timeline can include a basic timeline and a social timeline. A basic timeline can be a read-only timeline. A social timeline can allow for interaction and collaboration among users.

Figure 2:
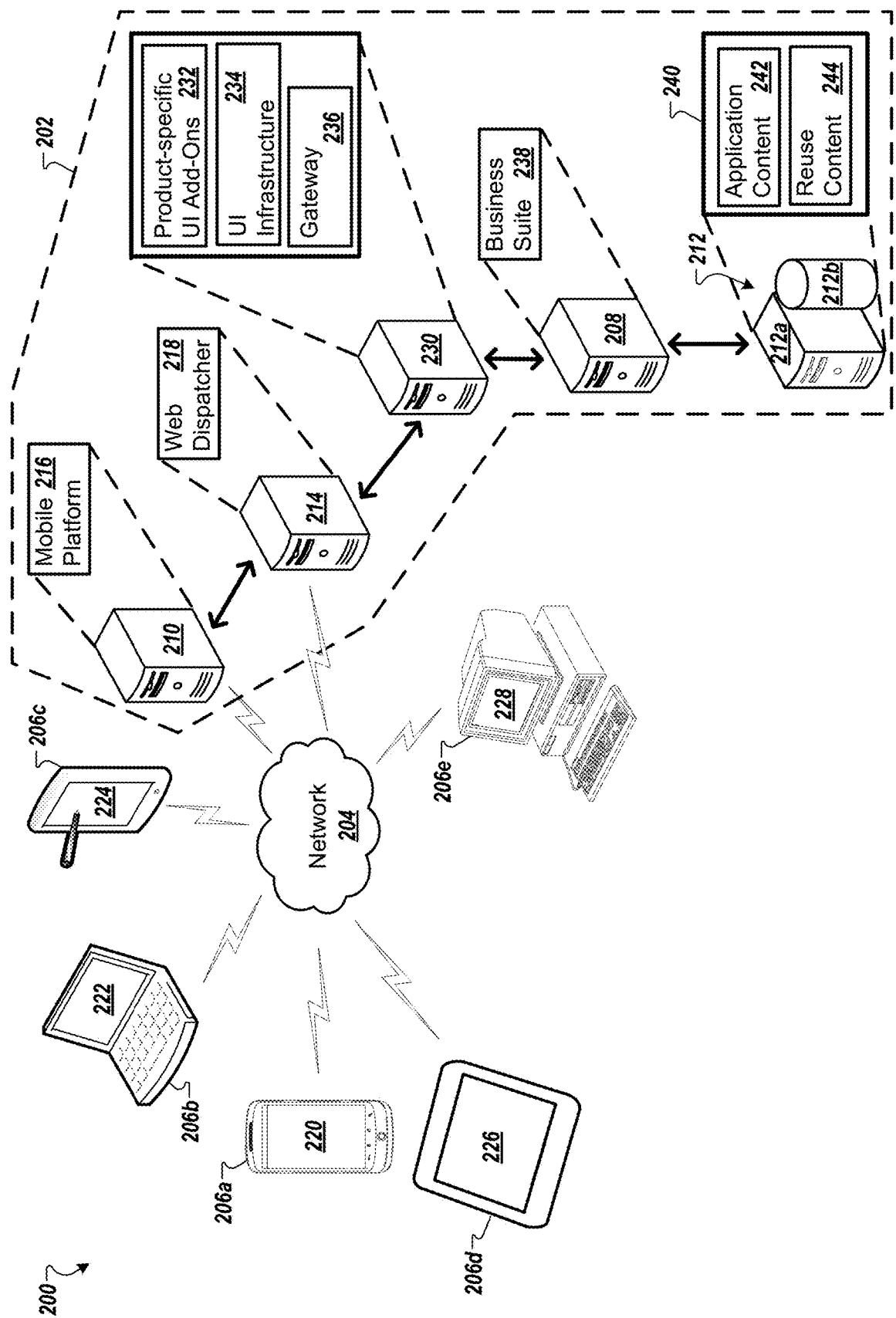
FIG. 2 is a diagram of an example system that can implement the user interfaces and user experiences described herein.

FIG. 2 is a diagram of an example system 200 that can implement the user interfaces and user experiences described herein. The system 200 includes an enterprise computing system 202, a network 204, and client computing devices 206a-e.

For example, computing device 206a can be a mobile phone, a smartphone, a personal digital assistant, or other type of mobile computing device. The computing device 206a includes a display device 220. For example, computing device 206b can be a laptop or notebook computer. The computing device 206b includes a display device 222. For example, computing device 206c can be a tablet computer. The computing device 206c includes a display device 224. For example, the computing device 206d can be a wearable device such as a smartwatch. The computing device 206d includes a display device 226. For example, the computing device 206e can be a desktop computer. The computing device 206e can include a display device 228. A user of the computing devices 206a-e can use/interface with the display devices 220, 222, 224, 226, and 228, respectively, when interacting with the enterprise computing system 202. The computing devices 206a-e can display on the display devices 220, 222, 224, 226, and 228 any of the screens and UIs described herein.

The enterprise computing system 202 can include one or more computing devices such as a web management server 214, a frontend server 230, a backend server 208, and a mobile device management server 210. The enterprise computing system 202 can also include a database management computing system 212 that includes a database management server 212a and a database 212b. Though not specifically shown in FIG. 2, each server (the web management server 214, the frontend server 230, the backend server 208, the mobile device management server 210, and the database management server 212a) can include one or more processors and one or more memory devices. Each server can run (execute) a server operating system.

In some first implementations, the client computing devices 206a-d (e.g., the mobile computing devices) can communicate with the enterprise computing system 202 (and the enterprise computing system 202 can communicate with the client computing devices 206a-d) by way of the mobile device management server 210. The mobile device management server 210 includes one or more mobile device platform application(s) 216. By using the mobile device platform application(s) 216, the enterprise computing system 202 can deliver cross-platform, secure, and scalable applications to the computing devices 202a-d, independent of the mobile computing device-type (e.g., laptop, notebook, smartwatch, mobile phone, PDA, etc.) and independent of the operating system running on the computing device 206a-d. In these implementations, the mobile device management server 210 can then communicate with the web management server 214.

In some second implementations, the client computing devices 206a-e (both the mobile computing devices (computing devices 206a-d) and the desktop computing device (computing device 206e)) can communicate with the enterprise computing system 202 (and specifically with the web management server 214), and the enterprise computing system 202 (and specifically with the web management server 214) can communicate with each of the client computing devices 202a-e) using the network 204. The web management server 214 includes a web dispatcher application 218. In both the first implementations and the second implementations, the web dispatcher application 218 can act as a "software web switch" accepting or rejecting connections to the enterprise computing system 202.

In some implementations, the network 204 can be a public communications network (e.g., the Internet, cellular data network, dialup modems over a telephone network) or a private communications network (e.g., private LAN, leased lines). In some implementations, the computing devices 206a-e can communicate with the network 204 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The frontend server 230 can include product specific UI Add-On Applications 232 and a UI infrastructure 234. The UI infrastructure 234 can include a design portion and a runtime portion. The frontend server 230 can decouple a lifecycle of a UI (e.g., design and runtime deployment) from the backend server 208. The decoupling can allow UI applications to interface with a plurality of different databases. The decoupling provides a single point of UI design, access, and maintenance allowing for theming, branding, configuring, and personalizing a UI without a need for development privileges to the backend server 208 (e.g., no need to have backend administrative rights). The decoupling can result in a more secure enterprise computing system. The decoupling can provide for rule-based dispatching of requests in a multi-system landscape (e.g., for approvals including aggregation).

The frontend server 230 includes a gateway 236. The gateway 236 can provide a way to connect devices, environments, and platforms to enterprise software based on market standards. The gateway 236 can enable the development of UIs for use in different environments (e.g., social and collaboration environments). The gateway 236 can enable the development of UIs for use on different types of client computing devices (e.g., client computing devices 206a-e). The gateway 236 can enable the development of UIs for use in internet-based applications.

The backend server 208 can include a bundle (a set) of business applications (e.g., business suite 238). The business applications can be transactional applications, analytical applications, and fact sheet and contextual navigation applications. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

The database management computing system 212 includes a database management server 212a that can run (execute) applications that can manage a database 212b. For example, the database 212b can be an in-memory, column-oriented, relational database (e.g., SAP HANA®). The database management computing system 212 can include extended application services 240 that can embed a full featured application server, web server, and development environment within the database management computing system 212. The extended application services 240 can include application content 242 and reuse content 244 for use by the enterprise computing system 202 when providing a personalized, responsive, and simple UX across different types of computing devices and deployment options.

The use of responsive screen layouts allows for content to be displayed on a plurality of different display devices (e.g., display devices 220, 222, 224, 226, and 228 as shown in FIG. 2) that can have different screen sizes and resolutions. Flexible screen layout can be considered a method or a process for displaying multiple floorplans for a user interface (UI) of a browser-based application. For example, an enterprise application can execute (run) in a web browser application executing (running) on a computing device. For example, referring to FIG. 2, the computing device can include, but is not limited to, the computing devices 206*a-e*. The use of multiple floorplans (each of which can include one or more panels) in a single UI allows for the displaying of a variety of content on a single web page of a browser-based application while adjusting how to display the content depending on the type of display device. A user, therefore, may not need to navigate to multiple web pages to view content of interest as it can be displayed to the user on a single web page that provides fluid and seamless navigation between the multiple panels included in the single web page.

The floorplans can provide a framework for generating user interfaces at runtime by applying a metadata driven approach to user interface design and development for an enterprise application. The use of floorplans can reduce an amount of frontend code needed for building applications that include user interfaces. Because the use of floorplans can provide a framework for generating user interfaces at runtime, the user interfaces included in an enterprise application can be updated with evolving user interface design guidelines.

The floorplans can include multiple panels (or columns) that can be place or located side by side in a single UI (e.g., on a single web page) for an enterprise application. The screen layout can be a predefined screen layout that can include multiple (e.g., up to three) different panels placed in a single UI. The different panels can be placed, for example, next to one another within a single UI (e.g., a single web page). A user of an enterprise application can change a layout of a UI, customizing the UI layout for their particular needs.

In a non-limiting example, a flexible screen layout can include up to three different floorplans in a single UI (e.g., on a single web page). A user of the enterprise application that includes the web page can toggle between multiple different layouts for the UI of the web page when deciding how to prioritize (and configure) the viewing of content in the web page for the particular needs of the user.

Figure 3A:
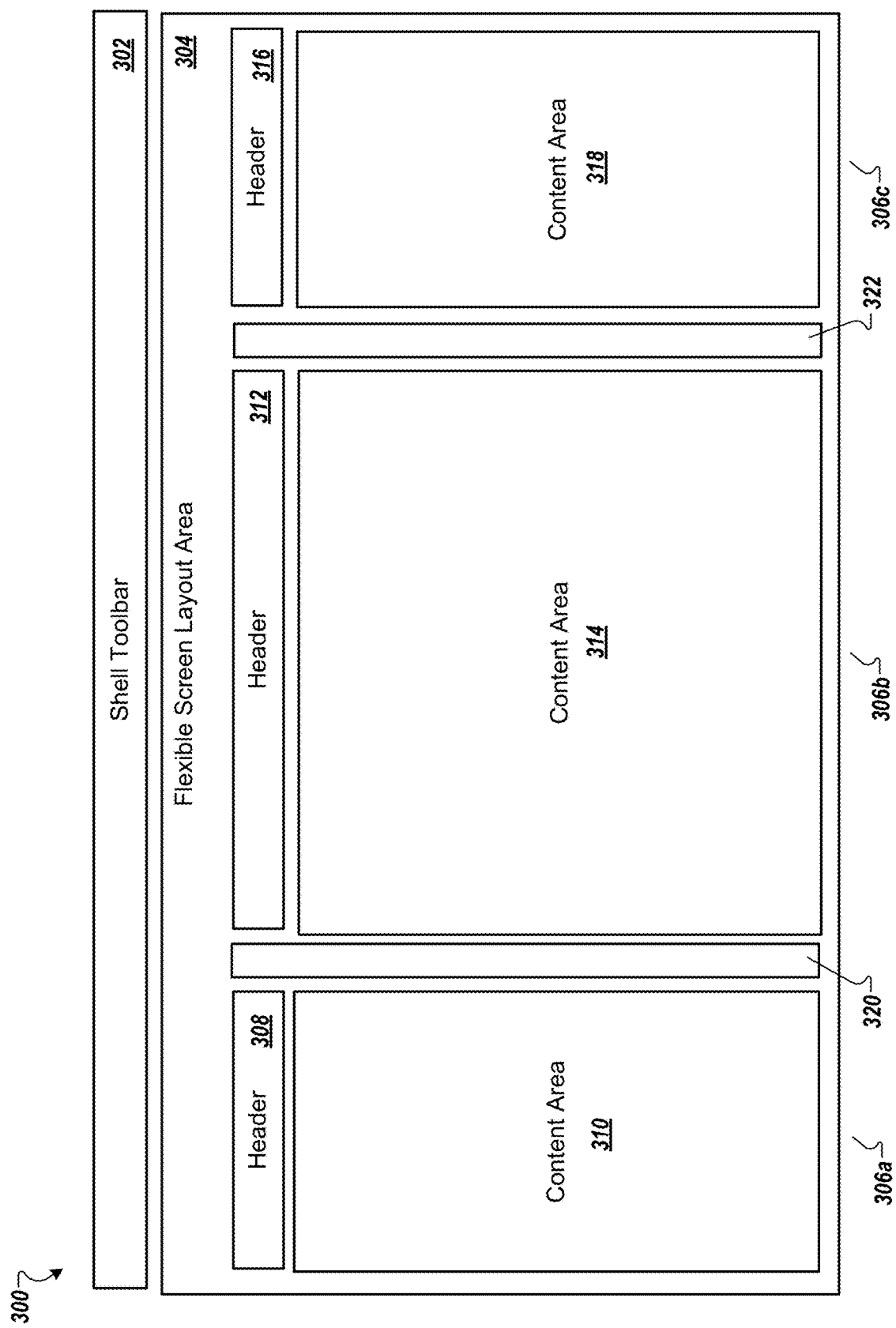
FIG. 3A is a block diagram showing an example floorplan for a user interface.

FIG. 3A is a block diagram showing an example floorplan for a user interface (UI) 300. The UI 300 includes a shell toolbar 302 and a flexible screen layout area 304. The shell toolbar 302 can include a global search and other services, which are available to a user across all enterprise applications. For example, the shell toolbar 302 can be similar to the shell toolbar 108 as shown in FIG. 1A.

A flexible screen layout area can include up to three panels of various sizes that can be included in different layouts (or floorplans). Each panel can be separated by splitters. The flexible screen layout area 304 is of a floorplan that includes three panels 306*a-c*. Panel 306*b* is separated from panel 306*a* by a splitter 320. Panel 306*b* is separated from panel 306*c* by a splitter 322. Each panel 306*a-c* includes a header and a content area. The panel 306*a* includes header 308 and content area 310. The panel 306*b* includes header 312 and content area 314. The panel 306*c* includes header 316 and content area 318. Each panel 306*a-c* can include a variable layout. FIG. 3A shows an example of a particular layout but other layouts are possible. A user can focus on a particular panel in order to prioritize the panel (e.g., the panel can be displayed in a larger area on a screen of the display device while other panels that are not focused on by the user can be displayed in a smaller area of a screen of the display device). The example UI 300 shows the focus on the panel 306*b*. In some implementations, a user can, at any time, switch between different layouts to view the prioritized panel in a full screen mode. A flexible screen layout can be responsive, dependent on an available display area of a screen of a display device. Depending on an available display area of a screen of a display device, the enterprise application can load (provide) an optimized flexible screen layout area. Providing an optimized screen layout can ensure a best possible experience for a user of the enterprise application.

For example, referring to FIG. 2, the flexible screen layout area 304 may be optimized for viewing in the available display area for the display device 228 included in the computing device 206*e* (e.g., a desktop computing device). A different flexible screen layout area may be optimized for viewing in the available display area for the display device 224 included in the computing device 206*c* (e.g., a tablet computing device). A different flexible screen layout area may be optimized for viewing in the available display area for the display device 220 included in the computing device 206*a* (e.g., a mobile computing device). As described herein with reference to FIG. 4, the flexible screen layout area 304 can be different dependent on the type of computing device though the content displayed in the flexible screen layout area 304 can be the same content on all of the different type of computing devices.

A flexible screen layout for a particular web page may not be restricted to a specific floorplan. Multiple floorplans can be used as long as they are responsive to all different available display areas included in multiple display devices. For example, referring to FIG. 2, a floorplan can be responsive to the available display area of a screen included in a display device for a desktop computing device (e.g., the display device 228 included in the computing device 206*e*) as well as being responsive to the available display area of a screen included in a display device for a mobile computing device (e.g., the display device 220 included in the computing device 206*a*).

In some implementations, a flexible screen layout can be available in different sizes. Each size flexible screen layout may include up to three panels, and in some cases, may include less than three panels dependent on the available display area of a screen included in a display device for a computing device. For example, a flexible screen layout for a display device included in a desktop computing device (e.g., the display device 228 included in the computing device 206*e*) may be available in a large size (size L) and an extra large size (size XL) each size including up to three panels. In another example, a flexible screen layout for a display device included in a tablet computing device (e.g., the display device 224 included in the computing device 206*c*) may be available in a medium size (size M) including less than three panels (two panels or a single panel). In another example, a flexible screen layout for a display device included in a mobile computing device (e.g., the display device 220 included in the computing device 206*a*)

may be available in a small size (size S) including less than three panels (two panels or a single panel) or in some cases may include only a single panel. In general, it may be assumed that the available display area of a mobile computing device is typically less than the available display area of a tablet computing device which is typically less than the available display area of the display device included in a desktop computing device. The available display areas of a different computing devices necessitates the use of a different number of panels for display in a UI.

A flexible screen layout for the available area of a screen included in a display device of a desktop computing device, which can be referred to herein as a desktop display device, can support multiple different layouts ranging from size XL to size S (e.g., five different layouts size L and size XL, three different layouts of size M, and a single layout of size S). A display device included in a tablet computing device, which can be referred to herein as a tablet display device, can support multiple different layouts ranging from size M to size S. A display device included in a mobile computing device, which can be referred to herein as a mobile display device, may support size S layouts. For example, because the mobile display device may have a limited display area, the flexible screen layout for the available display area of the screen of the mobile display device can be a full screen layout.

For example, a desktop display device may support up to five different desktop display device layouts of size L and size XL and up to three different tablet display device layouts of size M, as described with reference to FIG. 4 included herein.

In some implementations, a prioritized floorplan can include a panel that is wider than other panels included in the floorplan. As shown in FIG. 3A, the panel 306b is wider than the panel 306a and the panel 306c. In some implementations, every floorplan can be switched for use in a full screen mode. The switching will be described herein with reference to FIGS. 5A-C and FIGS. 6A-C.

Figure 3B:
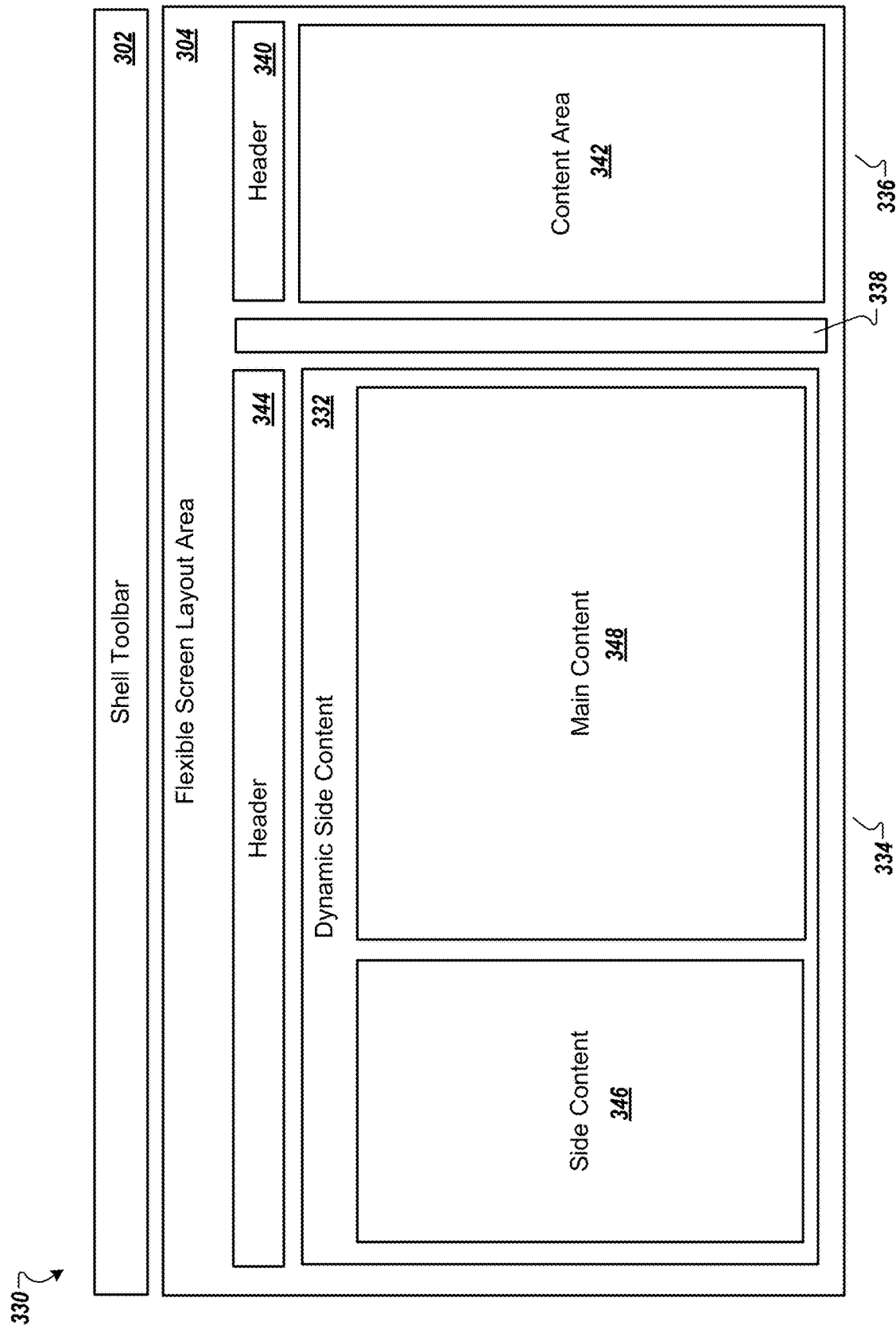
FIG. 3B is a block diagram showing an example floorplan for a user interface that includes dynamic side content.

FIG. 3B is a block diagram showing an example floorplan for a user interface (UI) 330 that includes dynamic side content 332. The UI 330 includes the shell toolbar 302 and the flexible screen layout area 304. Dynamic side content can display (provide) additional content and information in a UI for an enterprise application in a way that flexibly adapts to different screen sizes.

The dynamic side content 332 can be included in a panel 334 included in the flexible screen layout area 304. The flexible screen layout area 304 can also include a panel 336. The panel 334 is separated from the panel 336 by a splitter 338. The panel 336 includes a header 340 and a content area 342. The panel 334 includes a header 344 and a content area that includes the dynamic side content 332. The dynamic side content 332 can include a side content 346 and a main content 348. The dynamic side content 332 can display related side information to the main content 348 in the side content 346.

The use of dynamic side content 332 in the flexible screen layout area 304 can provide a user with additional information in a single screen. In some implementations, the UI 330 may be used in size L and size XL layouts and may not be used in size M layouts due to the decrease in the width per panel when displaying three panels in a smaller available screen area.

FIG. 4 is a block diagram showing multiple (e.g., five) example user interface (UI) layouts 402a-e for a display device of a computing device. Each of the UI layouts 402a-e can be a floorplan that can incorporate multiple panels.

UI layout 402a includes two panels 404a-b, a first panel 404a that is of a size that can occupy approximately 66% of the available screen area and a second panel 404b that is of a size that can occupy approximately 33% of the available screen area. A splitter 406 provides a separation between the first panel 404a and the second panel 404b.

UI layout 402b includes two panels 408a-b, a first panel 408a that is of a size that can occupy approximately 33% of the available screen area and a second panel 408b that is of a size that can occupy approximately 66% of the available screen area. A splitter 410 provides a separation between the first panel 408a and the second panel 408b.

UI layout 402c includes three panels 412a-c, a first panel 412a that is of a size that can occupy approximately 50% of the available screen area, a second panel 412b that is of a size that can occupy approximately 25% of the available screen area, and a third panel 412c that is of a size that can occupy approximately 25% of the available screen area. A splitter 414a provides a separation between the first panel 412a and the second panel 412b. A splitter 414b provides a separation between the first panel 412a and the third panel 412c.

UI layout 402d includes three panels 416a-c, a first panel 416a that is of a size that can occupy approximately 50% of the available screen area, a second panel 416b that is of a size that can occupy approximately 25% of the available screen area, and a third panel 416c that is of a size that can occupy approximately 25% of the available screen area. A splitter 418a provides a separation between the second panel 416b and the third panel 416c. A splitter 418b provides a separation between the first panel 416a and the third panel 416c. In some implementations, the UI layout 402d can be considered an optional layout. For example, the UI layout 402d can be used in a particular use case for the comparing of a first item included in the second panel 416b to a second item included in the third panel 416c, the result of the comparison being provided in the first panel 416a.

UI layout 402e is for a full screen layout that includes a single panel 420 that is of a size that occupies approximately 100% of the available screen area.

Referring to FIG. 2 and FIG. 3, the UI layouts 402a-e can be available in size L and size XL for display on a display device of a desktop computing device (e.g., the display device 228 included in the computing device 206e). The UI layouts 402a-e can be available in size L and size XL for display on a display device of a desktop computing device (e.g., the display device 228 included in the computing device 206e). The UI layouts 402a, 402b, and 402e can be available in size M for display on a display device of a tablet computing device (e.g., the display device 224 included in the computing device 206c). The UI layout 402e can be available in size S for display on a display device of a mobile computing device (e.g., the display device 220 included in the computing device 206a).

For example, referring to FIG. 2, the UI layouts 402a-e can be for the available area of the screen included in the display device 228 of the computing device 206e (e.g., a desktop computing device). In another example, referring to FIG. 2, the UI layouts 402a, 402b, and 402e can be for the available area of the screen included in the display device 224 of the computing device 206c (e.g., a tablet computing device). In another example, referring to FIG. 2, the UI layout 402e can be for the available area of the screen included in the display device 220 of the computing device 206a (e.g., a mobile computing device). The determination of a UI layout for displaying content can be based on multiple criteria that can include, but are not limited to, the available screen area and the content for display.

A flexible screen layout can combine multiple interactions that can be displayed at once in a single screen that utilizes the available screen area of a display device. The combining of multiple interactions can provide a user with a fluid and seemless user experience when interacting (interfacing) with an enterprise application.

An enterprise application may include a number of hierarchical levels. Each hierarchical level can be included in a floorplan (as a panel) of the UI. In some implementations, a number of hierarchical levels many be greater than a number of panels supported by a flexible screen layout. In these implementations, additional floorplans can be opened in a full screen layout that include a single panel in order to present the additional hierarchical levels beyond the number supported by the flexible screen layout.

A user, when interacting with a flexible screen layout for a UI for an enterprise application, can navigate in a forward direction, opening new floorplans that can trigger a new panel in a user interface. A user can easily navigate in a backward direction, closing an existing floorplan and moving back to a previous floorplan.

Figure 5A:
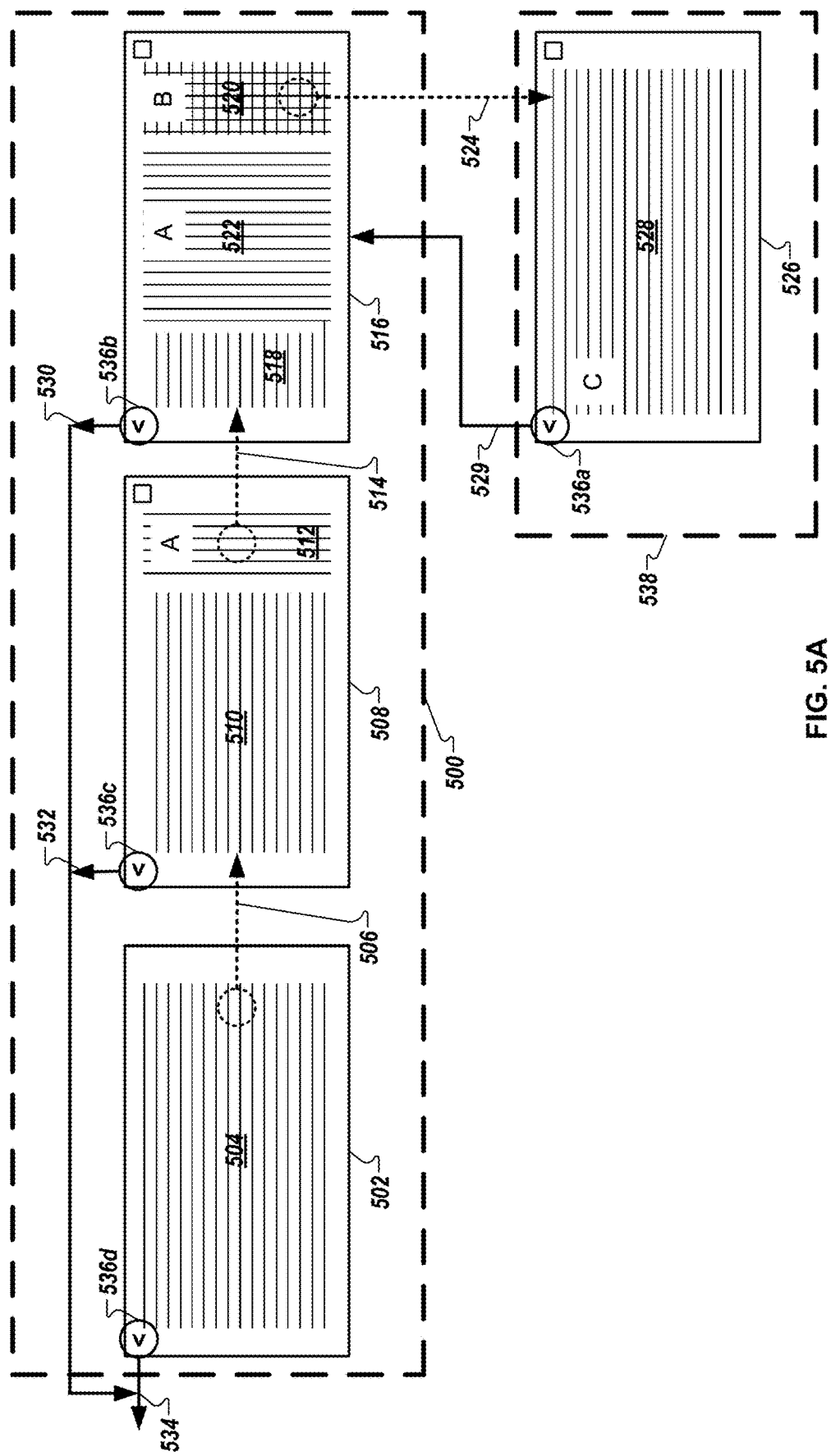
FIG. 5A is a block diagram of an example of the use of forward navigation and backward navigation with a flexible screen layout.

FIG. 5A is a block diagram of an example of the use of forward navigation and backward navigation with a flexible screen layout 500. For example, the flexible screen layout 500 can be for a UI of an enterprise application where the UI is displayed in an available display area for a display device included in a desktop computing device (e.g., referring to FIG. 2, the display device 228 included in the computing device 206e). For example, the flexible screen layout 500 can be for a size L or a size XL.

A first screen layout 502 includes a first column 504 that occupies approximately 100% of an available screen area. As described herein, a column can be a panel.

A user can forward navigate 506 to a second screen layout 508. The second screen layout can include two columns, a second column 510 that occupies approximately 66% of the available screen area and an adjacent third column 512 that occupies approximately 33% of the available screen area. In some implementations, the second column 510 can display content displayed in the first column 504 in a more compact manner. In some implementations, the second column 510 can display less than all of the content displayed in the first column 504. The second screen layout 508 includes additional content (content A) displayed in the third column 512. For example, the content A can be related content to the content displayed in the first column 504.

A user can forward navigate 514 to a third screen layout 516. The third screen layout 516 can include three columns, a fourth column 518 and a fifth column 520 that each occupy approximately 25% of the available screen area and a sixth column 522 that occupies approximately 50% of the available screen area. The fourth column 518 is adjacent to and located to the left of the sixth column 522 and the fifth column 520 is adjacent to and located to the right of the sixth column 522. In some implementations, the fourth column 518 can display content displayed in the second column 510 in a more compact manner. In some implementations, the fourth column 518 can display less than all of the content displayed in the second column 510.

Navigating from the second screen layout 508 to the third screen layout 516 can result in a focus of the flexible screen layout being on the sixth column 522 that displays the content A. The focus on the sixth column 522 is shown in the third screen layout 516 with the amount of available screen area occupied by the sixth column 522 being greater than the amount of available screen area occupied by the fourth column 518 and with the amount of available screen area occupied by the sixth column 522 being greater than the amount of available screen area occupied by the fifth column 520. The sixth column 522 can display the content (content A) displayed in the third column 512 of the second screen layout 508 in a larger area of the screen and along with additional content (content B) in the third screen layout 516. For example, the content B can be related content to the content A.

Navigating from the second screen layout 508 to the third screen layout 516 also resulted in the addition of another panel, as shown in the fifth column 520. The fifth column 520 can display additional content (content B). The sixth column 522 can display content displayed in the third column 512 in a larger area of the screen. The flexible screen layout 500 can include a fourth screen layout 540 and a fifth screen layout 542, which will be shown and described in more detail with reference to FIGS. 5B-C.

A user can forward navigate 524 to a sixth screen layout 526 included in a full screen layout 538. As described, in implementations where a number of hierarchical levels for an enterprise application is greater than a number of panels supported by a flexible screen layout, additional floorplans can be opened in a full screen layout in order to present the additional hierarchical levels beyond the number supported by the flexible screen layout. Therefore, when a maximum number (e.g., three) of panels for inclusion in a floorplan is reached, forward navigation opens the next floorplan in a full screen layout. For example, the sixth screen layout 526 includes a twelfth column 528 that occupies approximately 100% of an available screen area. The twelfth column 528 can display content (content C) not previously displayed in any other columns (e.g., not previously displayed in the first column 504, the second column 510, the third column 512, the fourth column 518, the fifth column 520, and the sixth column 522).

A user can navigate in a backward direction to previously displayed screen layouts. For example, a user can backward navigate 529 from the sixth screen layout 526, which is a full screen layout, to the third screen layout 516, which is a flexible screen layout. The user is able to backward navigate 529 in this manner based on the sixth screen layout 526 being opened as a full screen layout to display content C in an additional floorplan because a number of hierarchical levels for the enterprise application is greater than a number of panels supported by the flexible screen layout 500. Therefore, a user can navigate back to the last floorplan covered by (included in) a flexible screen layout allowing the last state of the flexible screen layout (the previously displayed screen layout) to be displayed (presented) to the user.

A user can backward navigate 530 from the third screen layout 516 (a flexible screen layout) to a web page displayed before the flexible screen layout 500. A user can backward navigate 532 from the second screen layout 508 (a flexible screen layout) to the web page displayed before the flexible screen layout 500. A user can backward navigate 534 from the first screen layout 502 (a flexible screen layout) to the web page displayed before the flexible screen layout 500. In the example shown in FIG. 5A, a user can select a backward navigation icon 536a-d included in the sixth screen layout 526, the third screen layout 516, the second screen layout 508, and the first screen layout 502, respectively, in order to navigate in a backward direction.

FIG. 5B includes a block diagram of the example flexible screen layout 500 as shown in FIG. 5A with the addition of two flexible screen layouts, the fourth screen layout 540 and the fifth screen layout 542. FIG. 5B shows an example of toggling between different possible flexible screen layouts or floorplans. FIG. 5B shows an example of toggling between the second screen layout 508 and the fourth screen layout 540. FIG. 5B shows an example of toggling between the third screen layout 516 and the fifth screen layout 542. FIG. 5B shows an example of toggling between the fourth screen layout 540 and the third screen layout 516. A user can select (click on) a toggle icon (e.g., one of the toggle icons 560a-f) in order to toggle between different screen layouts for use in a UI for the enterprise application.

Referring to FIG. 5B, for example, if a user prefers to view the content A in more detail than provided by the second screen layout 508, a user can toggle to the fourth screen layout 540. The fourth screen layout 540 can include two columns, a seventh column 546 that occupies approximately 66% of the available screen area and an adjacent eighth column 544 that occupies approximately 33% of the available screen area. A user can select (click on) a toggle icon 560a in order to toggle (change) the screen layout from the second screen layout 508 to the fourth screen layout 540, expanding the third column 512 resulting in the seventh column 546. Changing the screen layout prioritizes the content A provided in the third column 512 in the second screen layout 508 for display in the seventh column 546 in the fourth screen layout 540. The user can view the content A in more detail because the seventh column 546 occupies approximately 66% of the available screen area while the third column 512 occupies approximately 33% of the available screen area. A user can also select (click on) a toggle icon 560b in order to toggle (change) the screen layout from the fourth screen layout 540 to the second screen layout 508, contracting the seventh column 546 resulting in the third column 512.

Referring to FIG. 5B, for example, if a user prefers to view the content B in more detail than provided by the third screen layout 516, a user can toggle to the fifth screen layout 542. The fifth screen layout 542 can include three columns, a ninth column 550 and a tenth column 552 that each occupy approximately 25% of the available screen area and an eleventh column 554 that occupies approximately 50% of the available screen area. The ninth column 550 is adjacent to and located to the left of the tenth column 552 and the eleventh column 554 is adjacent to and located to the right of the tenth column 552. A user can select (click on) a toggle icon 560e in order to toggle (change) the screen layout from the third screen layout 516 to the fifth screen layout 542, expanding the fifth column 520 resulting in the eleventh column 554. Changing the layout prioritizes the content B provided in the fifth column 520 in the third screen layout 516 for display in the eleventh column 554 in the fifth screen layout 542. The user can view the content B in more detail because the eleventh column 554 occupies approximately 50% of the available screen area while the fifth column 520 occupies approximately 25% of the available screen area. A user can also select (click on) a toggle icon 560f in order to toggle (change) the screen layout from the fifth screen layout 542 to the third screen layout 516, contracting the eleventh column 554 resulting in the fifth column 520.

In some implementations, in order to toggle or switch between screen layouts that change a size of a panel or column, a user can select and drag a splitter included between two panels, the dragging increasing an amount of screen area occupied by one panel while possibly decreasing an amount of screen area occupied by another panel. While dragging the splitter and changing the screen area occupied by each of the two panels, the splitter will snap to a predefined layout while dragging. A free scaling of changing panel sizes may not be supported by a flexible screen layout. The splitter will snap to predefined layout sizes for each of the panels within a screen layout.

For example, a user can select and drag a splitter 562 towards a left side of a display area increasing the amount of available screen area occupied by the content A from being displayed in the third column 512 to being displayed in the seventh column 546, changing a screen layout from the second screen layout 508 to the fourth screen layout 540. For example, a user can select and drag a splitter 564 towards a right side of a display area for the fourth screen layout 540 decreasing the amount of available screen area occupied by the content A from being displayed in the seventh column 546 to being displayed in the third column 512 changing the screen layout to the second screen layout 508.

In another example, a user can select and drag a splitter 566 towards a left side of a display area increasing the amount of available screen area occupied by the content B from being displayed in the fifth column 520 to being displayed in the eleventh column 554, changing a screen layout from the third screen layout 516 to the fifth screen layout 542. In another example, a user can select and drag a splitter 568 towards a right side of a display area for the fifth screen layout 542 decreasing the amount of available screen area occupied by the content B from being displayed in the eleventh column 554 to being displayed in the fifth column 520 changing the screen layout to the third screen layout 516.

Expanding a first displayed panel or column included in a screen layout that includes the maximum number of panels or columns can result in hiding the last displayed panel in the layout. Referring to FIG. 5B, for example, a user can expand the third screen layout 516 by selecting (clicking on) the toggle icon 560d. The user can alternatively select and drag a splitter 569 towards a left side of a display area for the third screen layout 516. The dragging of the splitter 569 can result in the screen layout changing to the fourth screen layout 540 and hiding the content B as displayed in the fifth column 520. The amount of available screen area occupied by the content A in the fourth screen layout 540 (66%) is increased from the amount of available screen area occupied by the content A in the third screen layout 516 (50%). The fifth column 520, however, is hidden in the fourth screen layout 540. A user can then select a toggle icon 560c to unhide the content B, displaying the fifth column 520 and toggling (changing) the screen layout to the third screen layout 516. The toggle icon 560c is available for selection in cases where a user previously toggled to the fourth screen layout 540 from the third screen layout 516 where the fifth column 520 was active (content B was displayed in the fifth column 520). A user can also forward navigate 548 from the fourth screen layout 540 to the third screen layout 516. The ability to forward navigate 548 may not depend on a user previously navigating to and viewing the third screen layout 516. The user can alternatively select and drag a splitter 569 towards a left side of a display area for the third screen layout 516. The dragging of the splitter 569 can result in the screen layout changing to the fourth screen layout 540 and hiding the content B as displayed in the fifth column 520.

For example, a user can toggle between the second screen layout 508 and the fourth screen layout 540 as described herein. The user can forward navigate 514 to the third screen layout 516 from the second screen layout 508. Alternatively, the user can forward navigate 548 to the third screen layout 516 from the fourth screen layout 540. Referring to FIG. 5A, the user can forward navigate 556 to the sixth screen layout 526, which is a full screen layout 538.

A user can navigate in a backward direction to previously displayed screen layouts. Referring to FIG. 5B, a user can backward navigate 561 from the fourth screen layout 540 (a flexible screen layout) to a web page displayed before the flexible screen layout 500. A user can backward navigate 563 from the fifth screen layout 542 (a flexible screen layout) to the web page displayed before the flexible screen layout 500. In the example shown in FIG. 5B, a user can select a backward navigation icon 566a-b included in the fourth screen layout 540 and the fifth screen layout 542, respectively, in order to navigate in a backward direction.

FIG. 5B also includes a block diagram of an example full screen layout 570 including a seventh screen layout 572 and an eighth screen layout 574. For example, content A can be displayed in a thirteenth column 576 in the seventh screen layout 572. Content B can be displayed in a fourteenth column 578 in the eighth screen layout 574. The thirteenth column 576 and the fourteenth column 578 occupy approximately 100% of an available screen area. A user can forward navigate 580 from the seventh screen layout 572 to the eighth screen layout 574. A user can backward navigate 582 from the eighth screen layout 574 to the seventh screen layout 572. A user can backward navigate 584 from the seventh screen layout 572 to the first screen layout 502 included in the flexible screen layout 500. The user can then navigate the screen layouts included in the flexible screen layout 500 in order to display content A and content B in a single screen layout. By using flexible screen layouts, multiple interactions can be displayed together in a single screen layout providing the user with a fluid and seemless user experience when interacting (interfacing) with an enterprise application.

In the example shown in FIG. 5B, a user can select a backward navigation icon 586a-b included in the seventh screen layout 572 and the eighth screen layout 574, respectively, in order to navigate in a backward direction.

Figure 5C:
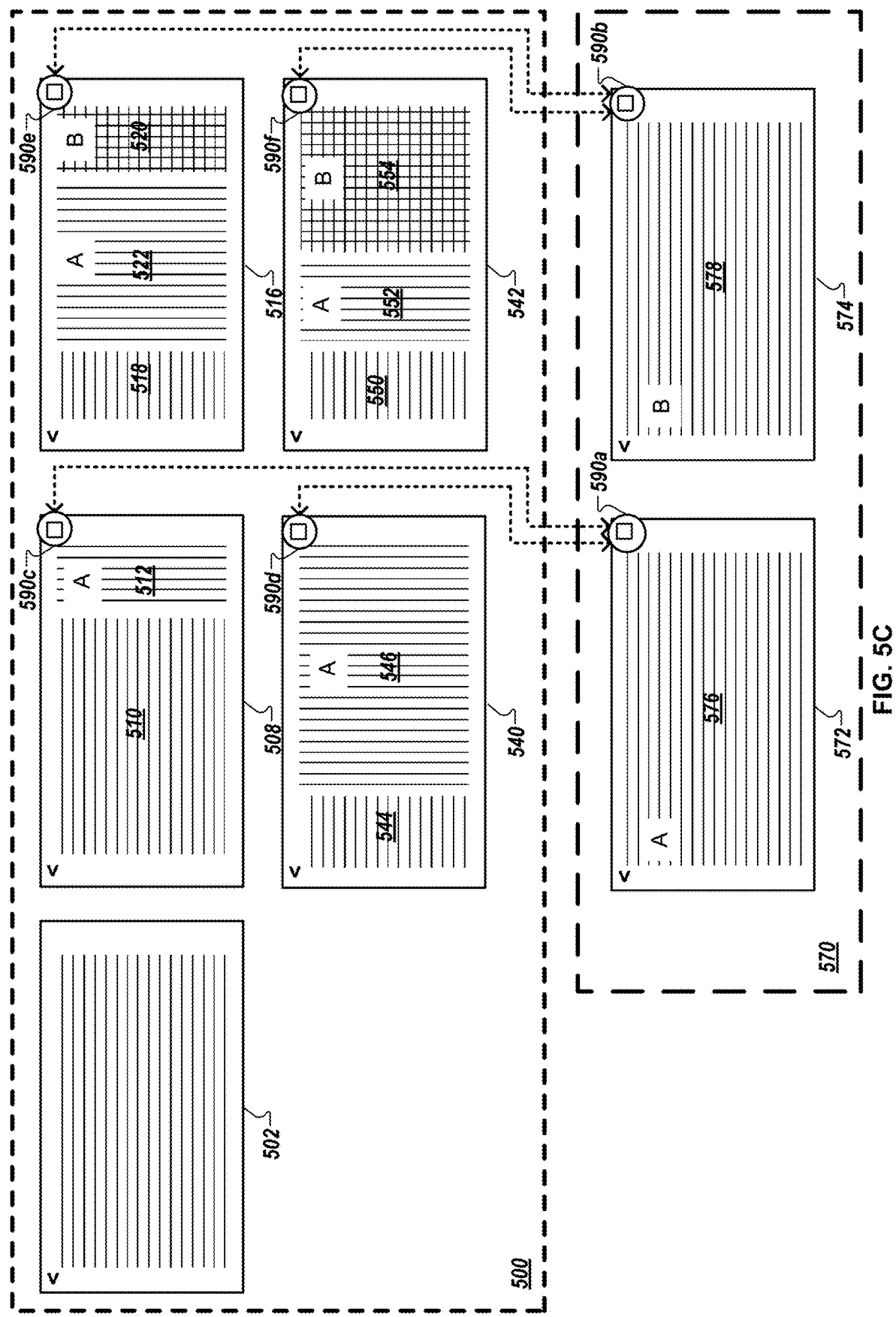
FIG. 5C is a block diagram showing switching between the full screen layout and the flexible screen layout as shown in FIG. 5B.

FIG. 5C is a block diagram showing switching between the full screen layout 570 and the flexible screen layout 500 as shown in FIG. 5B. In some implementations, a user may prefer to interact with and view content in a UI for an enterprise application in a full screen layout 570. In a full screen layout (e.g., the full screen layout 570) every floorplan or screen layout (e.g., the seventh screen layout 572 and the eighth screen layout 574) is shown in a full screen (displayed content occupies approximately 100% of an available screen area). To switch from a full screen layout to a flexible screen layout a user can select (click on) a layout icon.

In some implementations, a user can select (click on) a layout icon 590a to switch from the seventh screen layout 572 (a full screen layout) where the content A is displayed (provided) in the thirteenth column 576 to a fourth screen layout 540 (a flexible screen layout) where the content A is displayed (provided) in the seventh column 546. In some implementations, a user can select (click on) the layout icon 590a to switch from the seventh screen layout 572 (a full screen layout) where the content A is displayed (provided) in the thirteenth column 576 to a second screen layout 508 (a flexible screen layout) where the content A is displayed (provided) in the third column 512.

In some implementations, a user can select (click on) a layout icon 590b to switch from the eighth screen layout 574 (a full screen layout) where the content B is displayed (provided) in the fourteenth column 578 to a fifth screen layout 542 (a flexible screen layout) where the content B is displayed (provided) in the eleventh column 554. In some implementations, a user can select (click on) the layout icon 590b to switch from the eighth screen layout 574 (a full screen layout) where the content B is displayed (provided) in the fourteenth column 578 to a third screen layout 516 (a flexible screen layout) where the content B is displayed (provided) in the fifth column 520.

A user can select (click on) a layout icon 590c to switch from the second screen layout 508 (a flexible screen layout) where the content A is displayed (provided) in the third column 512 to a seventh screen layout 572 (a full screen layout) where the content A is displayed (provided) in the thirteenth column 576. A user can select (click on) a layout icon 590d to switch from the fourth screen layout 540 (a flexible screen layout) where the content A is displayed (provided) in the seventh column 546 to a seventh screen layout 572 (a full screen layout) where the content A is displayed (provided) in the thirteenth column 576.

A user can select (click on) a layout icon 590e to switch from the third screen layout 516 (a flexible screen layout) where the content B is displayed (provided) in the fifth column 520 to an eighth screen layout 574 (a full screen layout) where the content B is displayed (provided) in the fourteenth column 578. A user can select (click on) a layout icon 590f to switch from the fifth screen layout 542 (a flexible screen layout) where the content B is displayed (provided) in the eleventh column 554 to an eighth screen layout 574 (a full screen layout) where the content B is displayed (provided) in the fourteenth column 578.

A user can navigate between screen layouts included in a full screen layout as shown in FIGS. 5B-C. A user can toggle between flexible screen layouts as shown in FIGS. 5B-C. When switching from a full screen layout to a flexible screen layout, the content displayed (provided) in the full screen layout is displayed (provided) in a panel in the rightmost panel of the flexible screen layout. When switching from a flexible screen layout to a full screen layout, the content displayed (provided) in the rightmost panel of the flexible screen layout is displayed (provided) in the full screen layout.

Referring to the example flexible screen layout shown in the UI 300 in FIG. 3A, a user can select (click on) a header in a panel causing the screen layout to switch to a full screen layout that displays (provides) the content displayed (provided) in the content area of the panel in a full screen. For example, a user can select (click on) the header 308 for the panel 306a. Content displayed (provided) in the content area 310 of the panel 306a can be displayed in a full screen layout. A user can select (click on) the header 312 for the panel 306b. Content displayed (provided) in the content area 314 of the panel 306b can be displayed in a full screen layout. A user can select (click on) the header 316 for the panel 306c. Content displayed (provided) in the content area 318 of the panel 306c can be displayed in a full screen layout.

Figure 6A:
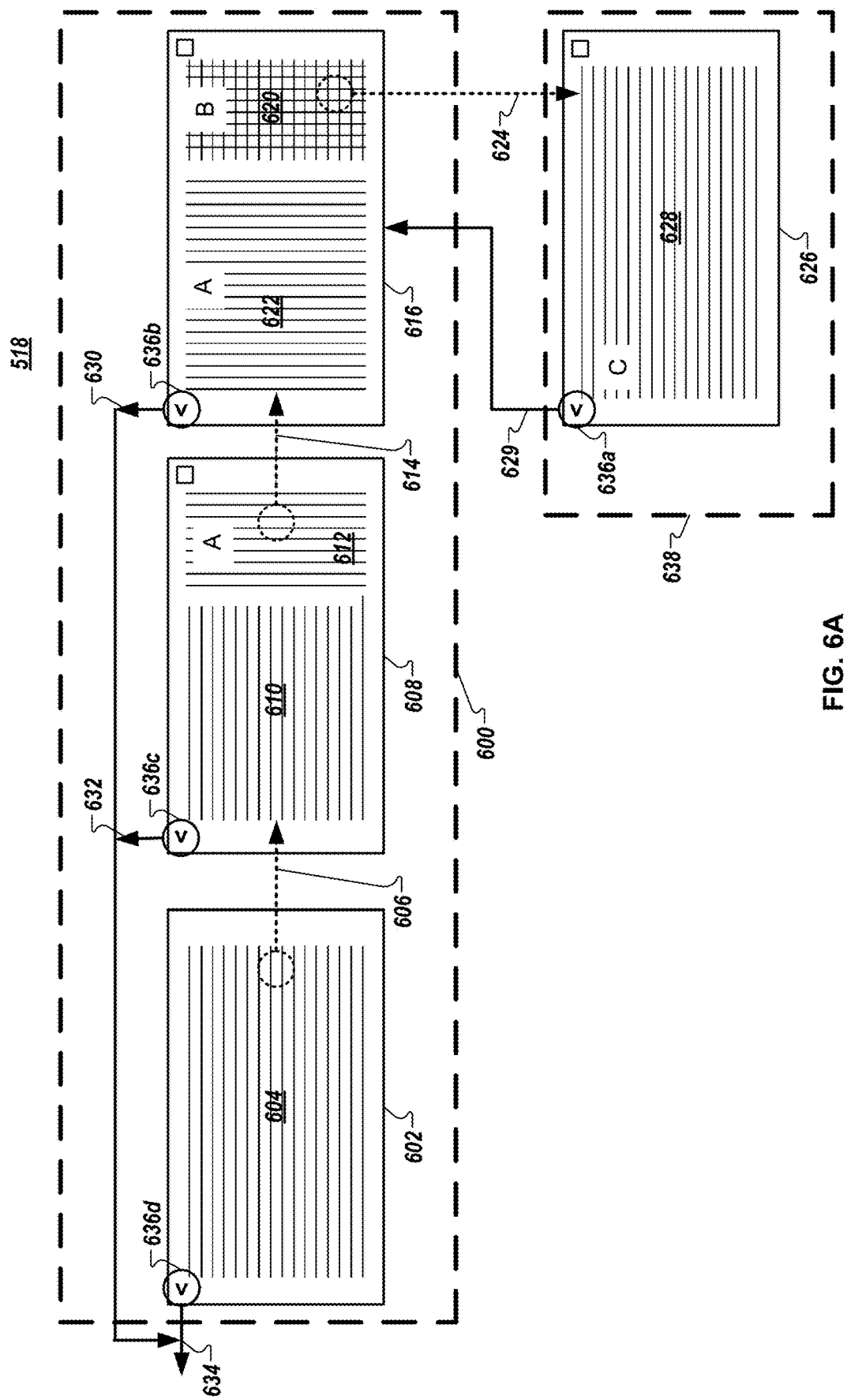
FIG. 6A is a block diagram of another example of the use of forward navigation and backward navigation with a flexible screen layout.

FIG. 6A is a block diagram of an example of the use of forward navigation and backward navigation with a flexible screen layout 600. For example, the flexible screen layout 600 can be for a UI of an enterprise application where the UI is displayed in an available display area for a display device included in a tablet computing device (e.g., referring to FIG. 2, the display device 224 included in the computing device 206c). For example, the flexible screen layout 600 can be for a size M.

A first screen layout 602 includes a first column 604 that occupies approximately 100% of an available screen area. A user can forward navigate 606 to a second screen layout 608. The second screen layout can include two columns, a second column 610 that occupies approximately 66% of the available screen area and an adjacent third column 612 that occupies approximately 33% of the available screen area. In some implementations, the second column 610 can display content displayed in the first column 604 in a more compact manner. In some implementations, the second column 610 can display less than all of the content displayed in the first column 604. The second screen layout 608 includes additional content (content A) displayed in the third column 612. For example, the content A can be related content to the content displayed in the first column 604.

A user can forward navigate 614 to a third screen layout 616. The third screen layout 616 can include two columns, a fourth column 620 that occupies approximately 33% of the available screen area and a fifth column 622 that occupies approximately 66% of the available screen area. The fourth column 620 is adjacent to and located to the right of the fifth column 622.

Navigating from the second screen layout 608 to the third screen layout 616 can result in a focus of the flexible screen layout being on the fifth column 622 that displays the content A. The focus on the fifth column 622 is shown in the third screen layout 616 with the amount of available screen area occupied by the fifth column 622 being greater than the amount of available screen area occupied by the fourth column 620. The fifth column 622 can display the content (content A) displayed in the third column 612 of the second screen layout 608 in a larger area of the screen and along with additional content (content B) in the third screen layout 616. For example, the content B can be related content to the content A.

Navigating from the second screen layout 608 to the third screen layout 616 also resulted in the addition of another panel, as shown in the fourth column 620. The fourth column 620 can display additional content (content B). The fifth column 622 can display content displayed in the third column 612 in a larger area of the screen. The flexible screen layout 600 can include a fourth screen layout 640 and a fifth screen layout 642, which will be shown and described in more detail with reference to FIGS. 6B-C.

A user can forward navigate 624 to a sixth screen layout 626 included in a full screen layout 638. As described, in implementations where a number of hierarchical levels for an enterprise application is greater than a number of panels supported by a flexible screen layout, additional floorplans can be opened in a full screen layout in order to present the additional hierarchical levels beyond the number supported by the flexible screen layout. Therefore, when a maximum number (e.g., two) of panels for inclusion in a floorplan is reached, forward navigation opens the next floorplan in a full screen layout. For example, the sixth screen layout 626 includes a tenth column 628 that occupies approximately 100% of an available screen area. The tenth column 628 can display content (content C) not previously displayed in any other columns (e.g., not previously displayed in the first column 604, the second column 610, the third column 612, the fourth column 620, and the fifth column 622).

A user can navigate in a backward direction to previously displayed screen layouts. For example, a user can backward navigate 629 from the sixth screen layout 626, which is a full screen layout, to the third screen layout 616, which is a flexible screen layout. The user is able to backward navigate 629 in this manner based on the sixth screen layout 626 being opened as a full screen layout to display content C in an additional floorplan because a number of hierarchical levels for the enterprise application is greater than a number of panels supported by the flexible screen layout 600. Therefore, a user can navigate back to the last floorplan covered by (included in) a flexible screen layout allowing the last state of the flexible screen layout (the previously displayed screen layout) to be displayed (presented) to the user.

A user can backward navigate 630 from the third screen layout 616 (a flexible screen layout) to a web page displayed before the flexible screen layout 600. A user can backward navigate 632 from the second screen layout 608 (a flexible screen layout) to the web page displayed before the flexible screen layout 600. A user can backward navigate 634 from the first screen layout 602 (a flexible screen layout) to the web page displayed before the flexible screen layout 600. In the example shown in FIG. 6A, a user can select a backward navigation icon 636*a-d* included in the sixth screen layout 626, the third screen layout 616, the second screen layout 608, and the first screen layout 602, respectively, in order to navigate in a backward direction.

Figure 6B:
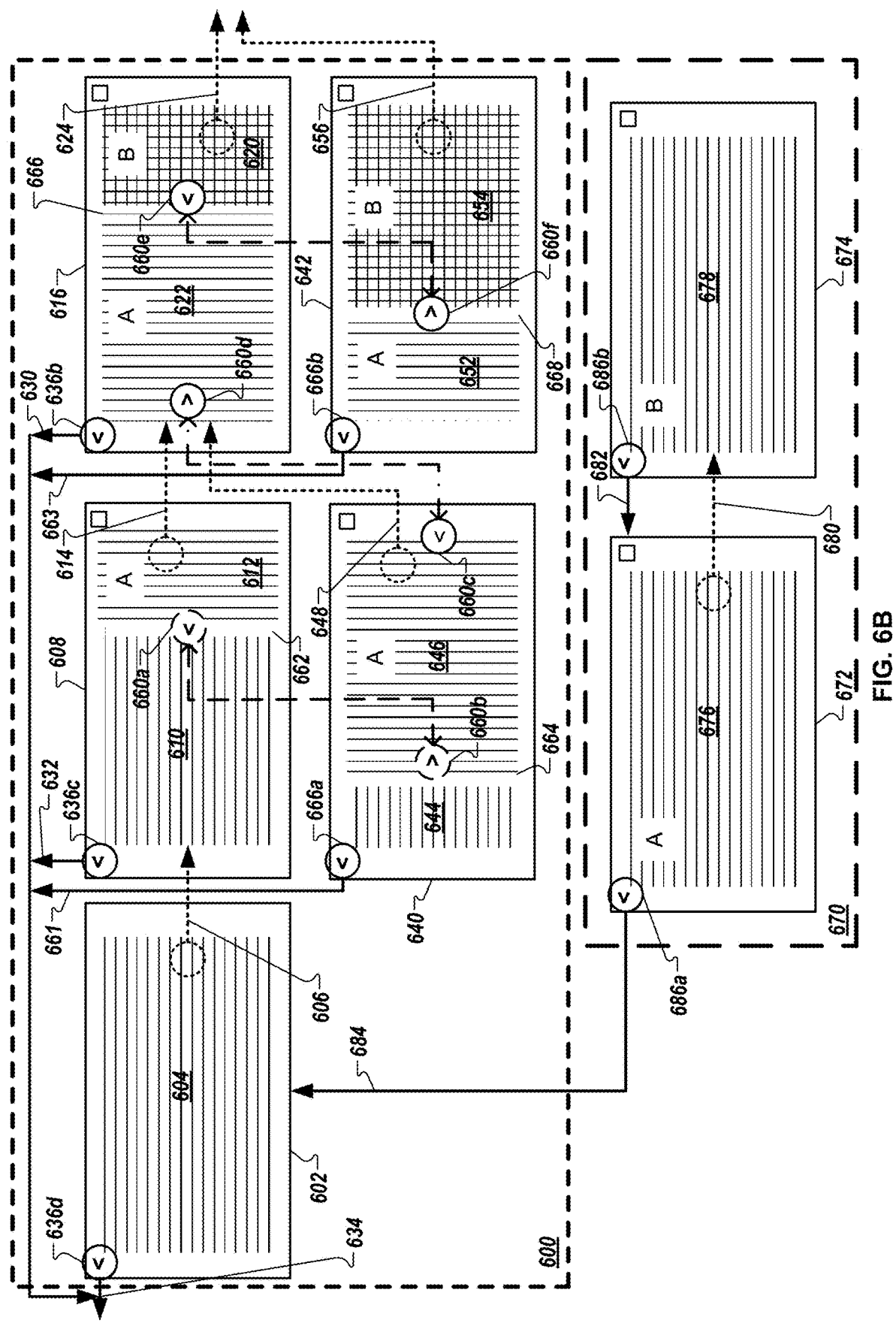
FIG. 6B includes a block diagram of the other example flexible screen layout as shown in FIG. 6A with the addition of two flexible screen layouts.

FIG. 6B includes a block diagram of the example flexible screen layout 600 as shown in FIG. 6A with the addition of two flexible screen layouts, the fourth screen layout 640 and the fifth screen layout 642. FIG. 6B shows an example of toggling between different possible flexible screen layouts or floorplans. FIG. 6B shows an example of toggling between the second screen layout 608 and the fourth screen layout 640. FIG. 6B shows an example of toggling between the third screen layout 616 and the fifth screen layout 642. FIG. 6B shows an example of toggling between the fourth screen layout 640 and the third screen layout 616. A user can select (click on) a toggle icon (e.g., one of the toggle icons 660*a-f*) in order to toggle between different screen layouts for use in a UI for the enterprise application.

Referring to FIG. 6B, for example, if a user prefers to view the content A in more detail than provided by the second screen layout 608, a user can toggle to the fourth screen layout 640. The fourth screen layout 640 can include two columns, a sixth column 646 that occupies approximately 66% of the available screen area and an adjacent seventh column 644 that occupies approximately 33% of the available screen area. A user can select (click on) a toggle icon 660*a* in order to toggle (change) the screen layout from the second screen layout 608 to the fourth screen layout 640, expanding the third column 612 resulting in the sixth column 646. Changing the screen layout prioritizes the content A provided in the third column 612 in the second screen layout 608 for display in the sixth column 646 in the fourth screen layout 640. The user can view the content A in more detail because the sixth column 646 occupies approximately 66% of the available screen area while the third column 612 occupies approximately 33% of the available screen area. A user can also select (click on) a toggle icon 660*b* in order to toggle (change) the screen layout from the fourth screen layout 640 to the second screen layout 608, contracting the sixth column 646 resulting in the third column 612.

Referring to FIG. 6B, for example, if a user prefers to view the content B in more detail than provided by the third screen layout 616, a user can toggle to the fifth screen layout 642. The fifth screen layout 642 can include two columns, an eighth column 652 and a ninth column 654. The eighth column 652 occupies approximately 33% of the available screen area. The ninth column 654 occupies approximately 66% of the available screen area. The ninth column 654 is adjacent to and located to the left of the eighth column 652. A user can select (click on) a toggle icon 660*e* in order to toggle (change) the screen layout from the third screen layout 616 to the fifth screen layout 642, expanding the fourth column 620 resulting in the ninth column 654. Changing the layout prioritizes the content B provided in the fourth column 620 in the third screen layout 616 for display in the ninth column 654 in the fifth screen layout 642. The user can view the content B in more detail because the ninth column 654 occupies approximately 66% of the available screen area while the fourth column 620 occupies approximately 33% of the available screen area. A user can also select (click on) a toggle icon 660*f* in order to toggle (change) the screen layout from the fifth screen layout 642 to the third screen layout 616, contracting the ninth column 654 resulting in the fourth column 620.

For example, a user can select and drag a splitter 661 towards a left side of a display area increasing the amount of available screen area occupied by the content A from being displayed in the third column 612 to being displayed in the sixth column 646, changing a screen layout from the second screen layout 608 to the fourth screen layout 640. For example, a user can select and drag a splitter 664 towards a right side of a display area for the fourth screen layout 640 decreasing the amount of available screen area occupied by the content A from being displayed in the sixth column 646 to being displayed in the third column 612 changing the screen layout to the second screen layout 608.

In another example, a user can select and drag a splitter 666 towards a left side of a display area increasing the amount of available screen area occupied by the content B from being displayed in the fourth column 620 to being displayed in the ninth column 654, changing a screen layout from the third screen layout 616 to the fifth screen layout 642. In another example, a user can select and drag a splitter 668 towards a right side of a display area for the fifth screen layout 642 decreasing the amount of available screen area occupied by the content B from being displayed in the ninth column 654 to being displayed in the fourth column 620 changing the screen layout to the third screen layout 616.

Expanding a first displayed panel or column included in a screen layout that includes the maximum number of panels or columns can result in hiding the last displayed panel in the layout. Referring to FIG. 6B, for example, a user can expand the third screen layout 616 by selecting (clicking on) the toggle icon 660*d*. The expansion can result in the screen layout changing to the fourth screen layout 640 and hiding the content B as displayed in the fourth column 620 while including the seventh column 644. A user can then select a toggle icon 660*c* to unhide the content B, displaying the fourth column 620 and toggling (changing) the screen layout to the third screen layout 616. The toggle icon 660*c* is available for selection in cases where a user previously toggled to the fourth screen layout 640 from the third screen layout 616 where the fourth column 620 was active (content B was displayed in the fourth column 620). A user can also forward navigate 648 from the fourth screen layout 640 to the third screen layout 616. The ability to forward navigate 648 may not depend on a user previously navigating to and viewing the third screen layout 616.

For example, a user can toggle between the second screen layout 608 and the fourth screen layout 640 as described herein. The user can forward navigate 614 to the third screen layout 616 from the second screen layout 608. Alternatively, the user can forward navigate 648 to the third screen layout 616 from the fourth screen layout 640. Referring to FIG. 6A, the user can forward navigate 656 to the sixth screen layout 626, which is a full screen layout 638.

A user can navigate in a backward direction to previously displayed screen layouts. Referring to FIG. 6B, a user can backward navigate 662 from the fourth screen layout 640 (a flexible screen layout) to a web page displayed before the flexible screen layout 600. A user can backward navigate 663 from the fifth screen layout 642 (a flexible screen layout) to the web page displayed before the flexible screen layout 600. In the example shown in FIG. 6B, a user can select a backward navigation icon 666*a-b* included in the fourth screen layout 640 and the fifth screen layout 642, respectively, in order to navigate in a backward direction.

FIG. 6B also includes a block diagram of an example full screen layout 670 including a seventh screen layout 672 and an eighth screen layout 674. For example, content A can be displayed in an eleventh column 676 in the seventh screen layout 672. Content B can be displayed in a twelfth column 678 in the eighth screen layout 674. The eleventh column 676 and the twelfth column 678 occupy approximately 100% of an available screen area. A user can forward navigate 680 from the seventh screen layout 672 to the eighth screen layout 674. A user can backward navigate 682 from the eighth screen layout 674 to the seventh screen layout 672. A user can backward navigate 684 from the seventh screen layout 672 to the first screen layout 602 included in the flexible screen layout 600. The user can then navigate the screen layouts included in the flexible screen layout 600 in order to display content A and content B in a single screen layout. By using flexible screen layouts, multiple interactions can be displayed together in a single screen layout providing the user with a fluid and seamless user experience when interacting (interfacing) with an enterprise application.

In the example shown in FIG. 6B, a user can select a backward navigation icon 686*a-b* included in the seventh screen layout 672 and the eighth screen layout 674, respectively, in order to navigate in a backward direction.

Figure 6C:
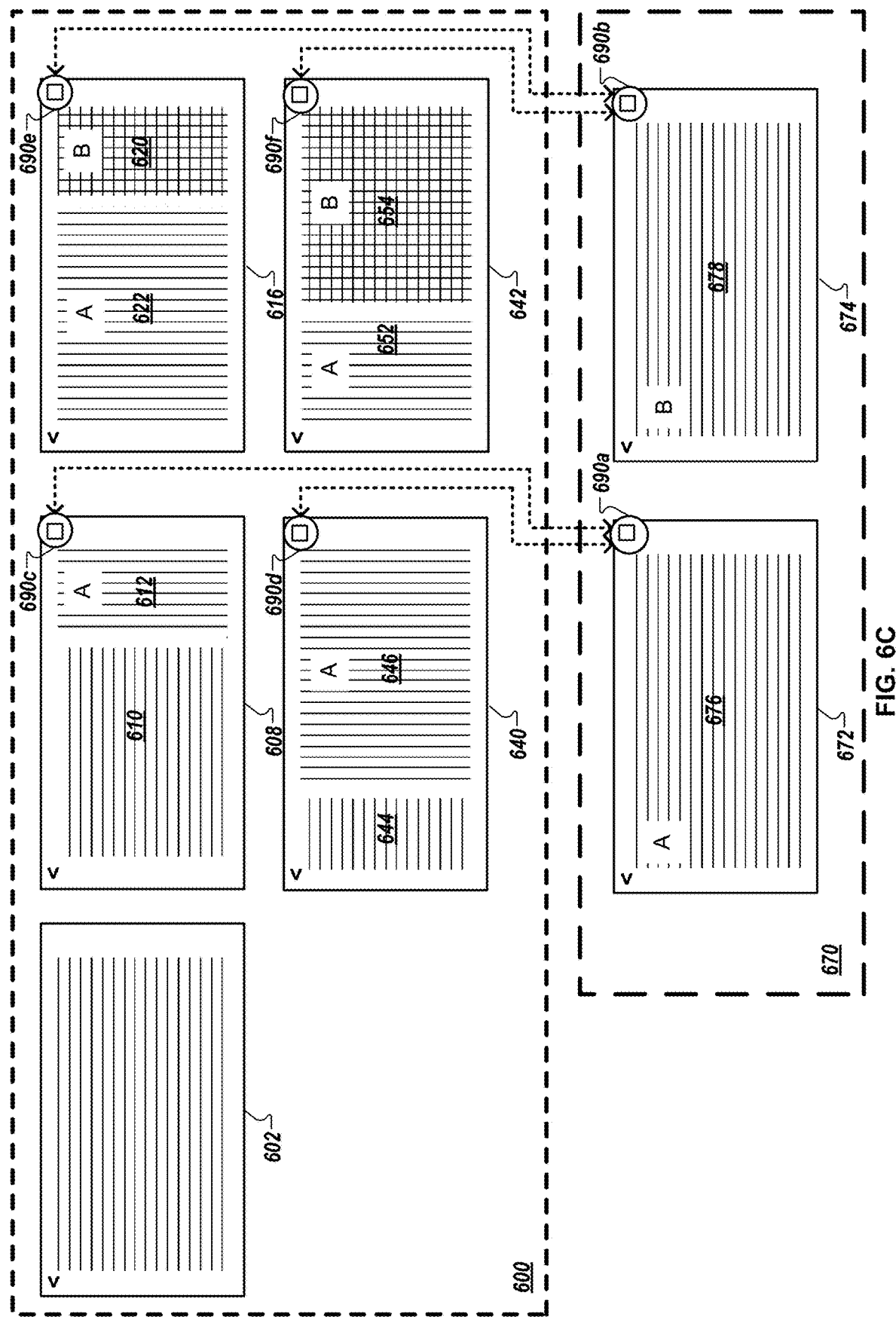
FIG. 6C is a block diagram showing switching between the full screen layout and the flexible screen layout as shown in FIG. 6B.

FIG. 6C is a block diagram showing switching between the full screen layout 670 and the flexible screen layout 600 as shown in FIG. 6B. In some implementations, a user may prefer to interact with and view content in a UI for an enterprise application in a full screen layout 670. In a full screen layout (e.g., the full screen layout 670) every floorplan or screen layout (e.g., the seventh screen layout 672 and the eighth screen layout 674) is shown in a full screen (displayed content occupies approximately 100% of an available screen area). To switch from a full screen layout to a flexible screen layout a user can select (click on) a layout icon.

In some implementations, a user can select (click on) a layout icon 690*a* to switch from the seventh screen layout 672 (a full screen layout) where the content A is displayed (provided) in the eleventh column 676 to a fourth screen layout 640 (a flexible screen layout) where the content A is displayed (provided) in the sixth column 646. In some implementations, a user can select (click on) the layout icon 690*a* to switch from the seventh screen layout 672 (a full screen layout) where the content A is displayed (provided) in the eleventh column 676 to a second screen layout 608 (a flexible screen layout) where the content A is displayed (provided) in the third column 612.

In some implementations, a user can select (click on) a layout icon 690*b* to switch from the eighth screen layout 674 (a full screen layout) where the content B is displayed (provided) in the twelfth column 678 to a fifth screen layout 642 (a flexible screen layout) where the content B is displayed (provided) in the ninth column 654. In some implementations, a user can select (click on) the layout icon 690*b* to switch from the eighth screen layout 674 (a full screen layout) where the content B is displayed (provided) in the twelfth column 678 to a third screen layout 616 (a flexible screen layout) where the content B is displayed (provided) in the fourth column 620.

A user can select (click on) a layout icon 690*c* to switch from the second screen layout 608 (a flexible screen layout) where the content A is displayed (provided) in the third column 612 to a seventh screen layout 672 (a full screen layout) where the content A is displayed (provided) in the eleventh column 676. A user can select (click on) a layout icon 690*d* to switch from the fourth screen layout 640 (a flexible screen layout) where the content A is displayed (provided) in the sixth column 646 to a seventh screen layout 672 (a full screen layout) where the content A is displayed (provided) in the eleventh column 676.

A user can select (click on) a layout icon 690*e* to switch from the third screen layout 616 (a flexible screen layout) where the content B is displayed (provided) in the fourth column 620 to an eighth screen layout 674 (a full screen layout) where the content B is displayed (provided) in the twelfth column 678. A user can select (click on) a layout icon 690*f* to switch from the fifth screen layout 642 (a flexible screen layout) where the content B is displayed (provided) in the ninth column 654 to an eighth screen layout 674 (a full screen layout) where the content B is displayed (provided) in the twelfth column 678.

A user can navigate between screen layouts included in a full screen layout as shown in FIGS. 6B-C. A user can toggle between flexible screen layouts as shown in FIGS. 6B-C. When switching from a full screen layout to a flexible screen layout, the content displayed (provided) in the full screen layout is displayed (provided) in a panel in the rightmost panel of the flexible screen layout. When switching from a flexible screen layout to a full screen layout, the content displayed (provided) in the rightmost panel of the flexible screen layout is displayed (provided) in the full screen layout.

As shown in FIGS. 5A-C and FIGS. 6A-C, five flexible layout floorplans are available to a user in size L and XL as well as in size M.

A flexible screen layout is runtime responsive. The flexible screen layout can change its behavior dependent on a size (e.g., size S, size M, size L, size XL) for the flexible screen layout. The flexible screen layout allows for resizing the UI in real time dependent on the size and, in some cases, dependent on an orientation of the display device. As described herein, the size for the flexible screen layout can be dependent on available display area on a display device of a computing device. Being runtime responsive, a flexible screen layout, when being used for a UI of an enterprise application, can change the presentation of the UI at runtime.

For example, referring to FIG. 2, an enterprise application executing on a tablet computing device (e.g., the computing device 206*c*) using a flexible screen layout where the tablet computing device is in a portrait mode of operation can automatically switch the layout of the UI (the UI floorplan, the layout floorplan) when the tablet computing device is placed in a landscape mode of operation. The flexible screen layout can adjust the presentation of the UI based on a difference in the available display area for the display device (e.g., the display device 224) of the tablet computing device (e.g., the computing device 206*c*) when in a portrait mode of operation verses a landscape mode of operation.

Figure 7A:
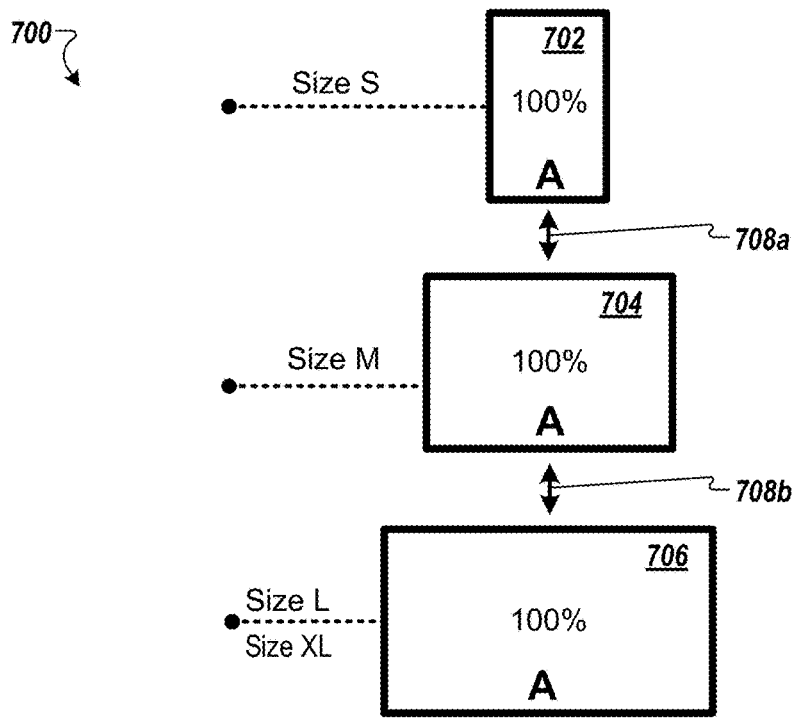
FIG. 7A is a block diagram showing responsive behavior for an example single panel flexible screen layout.

FIG. 7A is a block diagram showing responsive behavior for an example single panel flexible screen layout 700. The single panel flexible screen layout 700 can present content A in a UI for an enterprise application in a flexible screen mode of operation that uses a full screen mode. The single panel flexible screen layout 700 includes multiple size layouts or floorplans for a screen of a display device. The single panel flexible screen layout 700 includes a size S layout 702, a size M layout 704, and a size L/XL layout 706. As shown in FIG. 7A and as described herein, a layout size can be dependent on an available screen area for a display device. The flexible screen layout can automatically switch between presenting content A in the size S layout 702, the size M layout 704, and the size L/XL layout 706 based on an available screen area for a display device included in a computing device executing an enterprise application. Arrows 708*a-b* indicate the automatic switching between the layouts 702, 704, and 706.

Figure 7B:
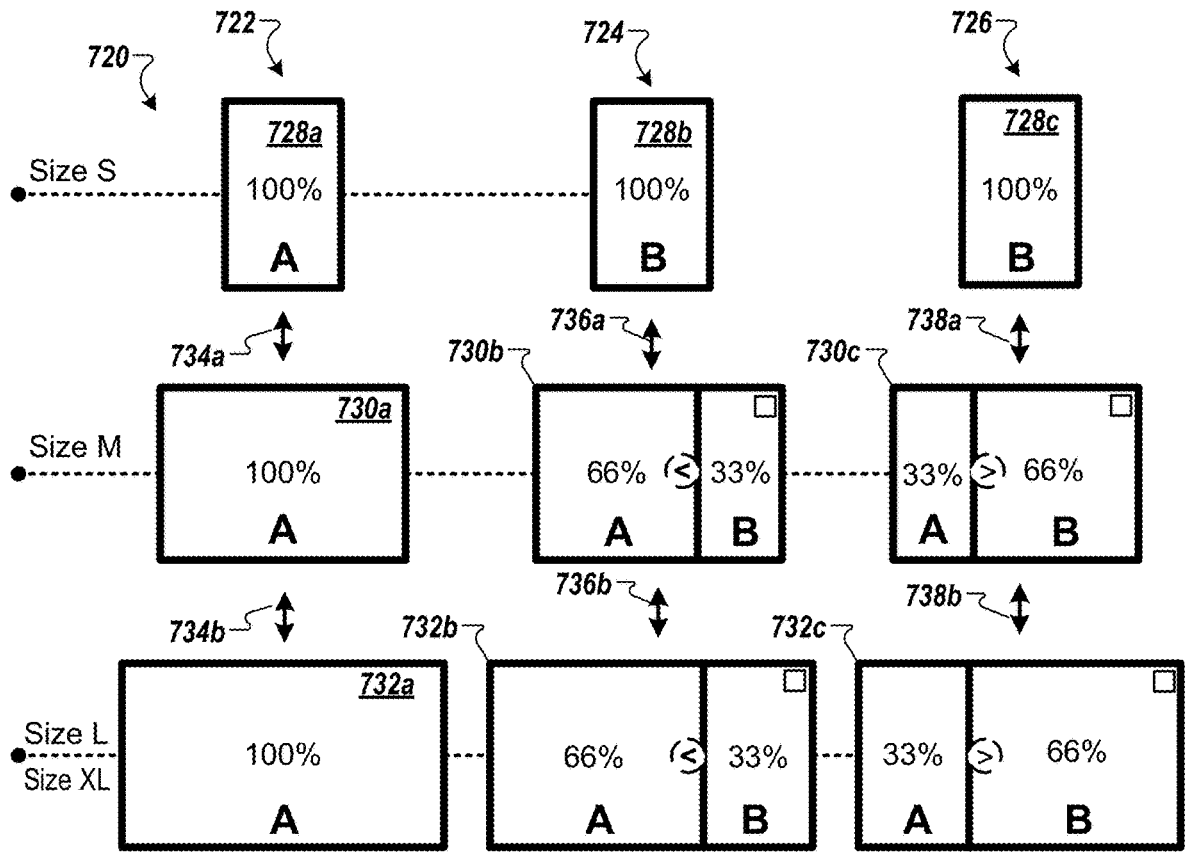
FIG. 7B is a block diagram showing responsive behavior for an example two panel flexible screen layout.

FIG. 7B is a block diagram showing responsive behavior for an example two panel flexible screen layout 720. The two panel flexible screen layout 720 includes multiple size layouts or floorplans. The two panel flexible screen layout 720 includes size S layouts 728*a-c*, size M layouts 730*a-c*, and size L/XL layouts 732*a-c*. As shown in FIG. 7B and as described herein, a layout size can be dependent on an available screen area for a display device. The two panel flexible screen layout 720 can present content A in a UI for an enterprise application in a flexible screen mode of operation that uses a full screen mode (e.g., a first two panel operation mode 722). The first two panel operation mode 722 can be similar to the single panel flexible screen layout 700. Arrows 734*a-b* indicate the automatic switching between the layouts 728*a*, 730*a*, and 732*a*.

The two panel flexible screen layout 720 can present content A and content B in a UI for an enterprise application in a flexible screen mode of operation that can utilize two layouts (e.g., a first two panel operation mode 724 and a second two panel operation mode 726). The two panel flexible screen layout 720 can determine an appropriate screen layout based on an available screen area for a display device included in a computing device executing an enterprise application.

The two panel flexible screen layout 720 in the first two panel operation mode 724 can automatically switch between presenting content B in the size S layout 728*b*, and presenting content A and content B in the size M layout 730*b* and the size L/XL layout 732*b*. Arrows 736*a-b* indicate the automatic switching between the layouts 728*b*, 730*b*, and 732*b*.

The two panel flexible screen layout 720 in the second two panel operation mode 726 can automatically switch between presenting content B in the size S layout 728*c*, and presenting content A and content B in the size M layout 730*c*, and the size L/XL layout 732*c*. Arrows 738*a-b* indicate the automatic switching between the layouts 728*c*, 730*c*, and 732*c*.

Figure 7C:
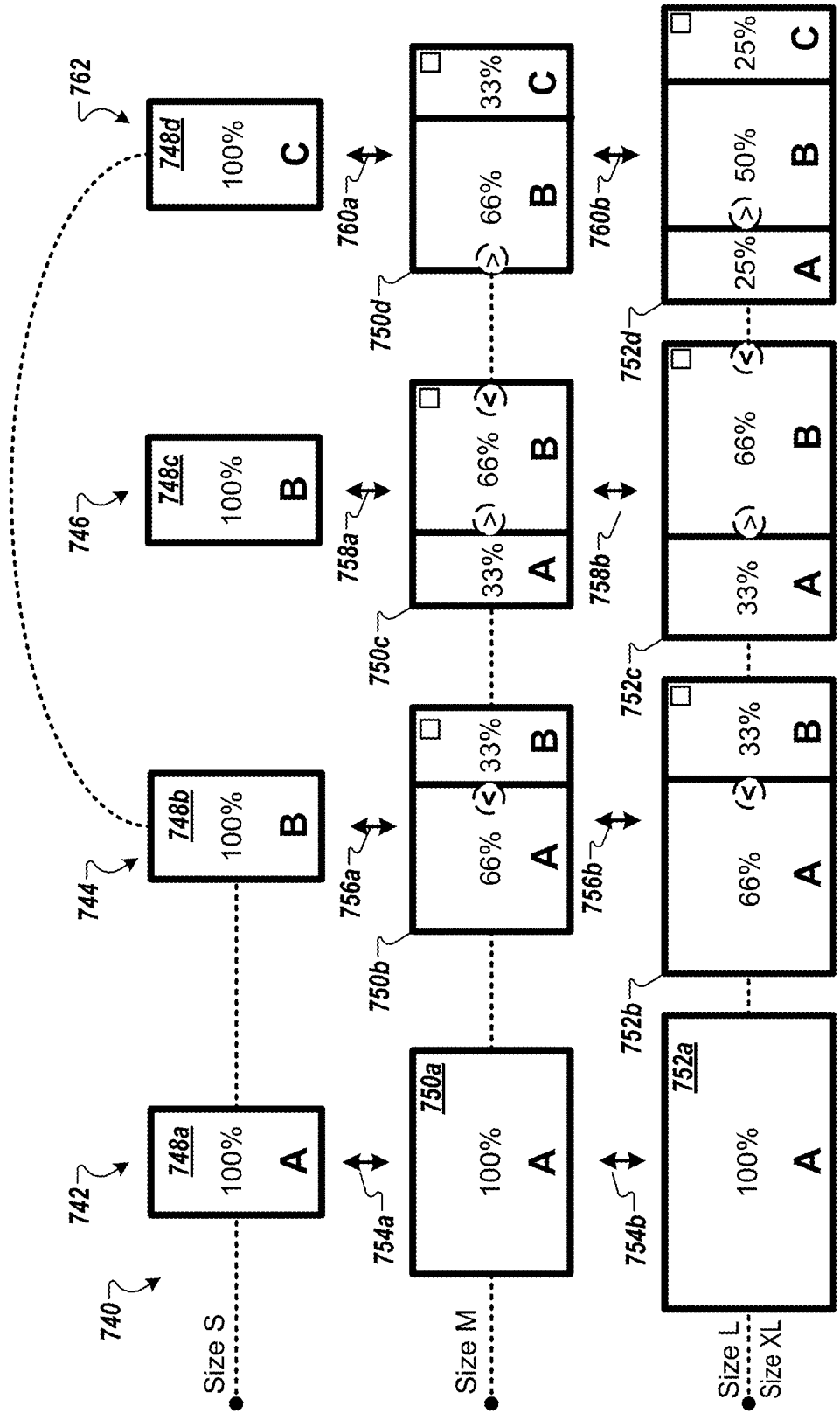
FIG. 7C is a block diagram showing responsive behavior for an example three panel flexible screen layout.

FIG. 7C is a block diagram showing responsive behavior for an example three panel flexible screen layout 740. The three panel flexible screen layout 740 includes multiple size layouts or floorplans. The three panel flexible screen layout 740 includes size S layouts 748*a-d*, size M layouts 750*a-d*, and size L/XL layouts 752*a-d*. As shown in FIG. 7C and as described herein, a layout size can be dependent on an available screen area for a display device. The three panel flexible screen layout 740 can present content A in a UI for an enterprise application in a flexible screen mode of operation that uses a full screen mode (e.g., a first two panel operation mode 742). The first two panel operation mode 742 can be similar to the single panel flexible screen layout

700. Arrows 754a-b indicate the automatic switching between the layouts 748a, 750a, and 752a.

The three panel flexible screen layout 740 can present content A and content B in a UI for an enterprise application in a flexible screen mode of operation that can utilize two layouts (e.g., a first two panel operation mode 744 and a second two panel operation mode 746). The three panel flexible screen layout 740 can present content A and/or content B and/or content C in a UI for an enterprise application in a flexible screen mode of operation that can utilize a two/three panel operation mode 762.

The flexible screen layout 740 can determine an appropriate screen layout based on an available screen area for a display device included in a computing device executing an enterprise application.

The flexible screen layout 740 in the first two panel operation mode 744 can automatically switch between presenting content B in the size S layout 748b, and presenting content A and content B in the size M layout 750b and the size L/XL layout 752b. Arrows 756a-b indicate the automatic switching between the layouts 748b, 750b, and 752b.

The flexible screen layout 740 in the second two panel operation mode 746 can automatically switch between presenting content B in the size S layout 748c, and presenting content A and content B in the size M layout 750c, and the size L/XL layout 752c. Arrows 758a-b indicate the automatic switching between the layouts 748c, 750c, and 752c.

The flexible screen layout 740 in the two/three panel operation mode 762 can automatically switch between presenting content C in the size S layout 748d, and presenting content B and content C in the size M layout 750d, and the size L/XL layout 752d. Arrows 760a-b indicate the automatic switching between the layouts 748d, 750d, and 752d.

Figure 7D:
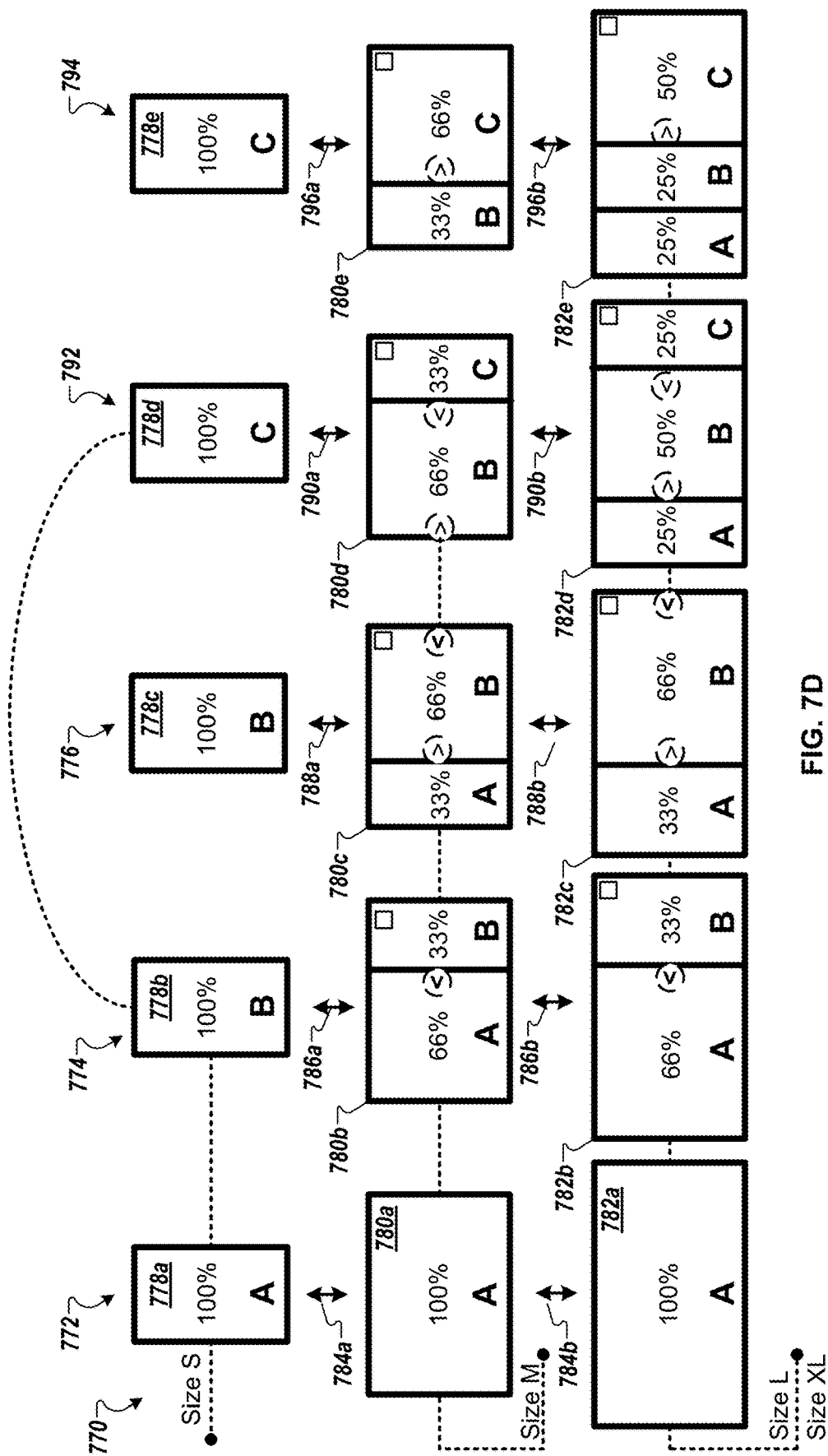
FIG. 7D is a block diagram showing responsive behavior for another example three panel flexible screen layout.

FIG. 7D is a block diagram showing responsive behavior for another example three panel flexible screen layout 770. The three panel flexible screen layout 770 includes multiple size layouts or floorplans. The three panel flexible screen layout 770 includes size S layouts 778a-e, size M layouts 780a-e, and size L/XL layouts 782a-e. As shown in FIG. 7D and as described herein, a layout size can be dependent on an available screen area for a display device. The three panel flexible screen layout 770 can present content A in a UI for an enterprise application in a flexible screen mode of operation that uses a full screen mode (e.g., a first two panel operation mode 772). The first two panel operation mode 772 can be similar to the single panel flexible screen layout 700. Arrows 784a-b indicate the automatic switching between the layouts 778a, 780a, and 782a.

The three panel flexible screen layout 770 can present content A and content B in a UI for an enterprise application in a flexible screen mode of operation that can utilize two layouts (e.g., a first two panel operation mode 774 and a second two panel operation mode 776). The three panel flexible screen layout 770 can present content A and/or content B and/or content C in a UI for an enterprise application in a flexible screen mode of operation that can utilize a first two/three panel operation mode 792 and a second two/three panel operation mode 794.

The flexible screen layout 770 can determine an appropriate screen layout based on an available screen area for a display device included in a computing device executing an enterprise application.

The flexible screen layout 770 in the first two panel operation mode 774 can automatically switch between presenting content B in the size S layout 778b, and presenting content A and content B in the size M layout 780b and the size L/XL layout 782b. Arrows 786a-b indicate the automatic switching between the layouts 778b, 780b, and 782b.

The flexible screen layout 770 in the second two panel operation mode 776 can automatically switch between presenting content B in the size S layout 778c, and presenting content A and content B in the size M layout 780c, and the size L/XL layout 782c. Arrows 788a-b indicate the automatic switching between the layouts 778c, 780c, and 782c.

The flexible screen layout 770 in the first two/three panel operation mode 792 can automatically switch between presenting content C in the size S layout 778d, and presenting content B and content C in the size M layout 780d, and the size L/XL layout 782d. Arrows 790a-b indicate the automatic switching between the layouts 778d, 780d, and 782d.

The flexible screen layout 770 in the second two/three panel operation mode 794 can automatically switch between presenting content C in the size S layout 778e, and presenting content B and content C in the size M layout 780e, and presenting content A, content B, and content C in the size L/XL layout 782e. Arrows 796a-b indicate the automatic switching between the layouts 778e, 780e, and 782e.

The ability to navigate within a flexible screen layout, navigate between flexible screen layouts, toggle between different flexible screen layouts, and switch between full screen layouts and flexible screen layouts as described with reference to FIGS. 5A-C and FIGS. 6A-C can be applied to the flexible screen layouts 700, 720, 740, and 770 as shown in FIGS. 7A-D, respectively.

A floorplan may require a minimum number of pixels (e.g., 320 pixels) for a width of the floorplan to be included in a screen of a display device in order to utilize flexible screen layouts. For example, a two panel layout may require up to three times the minimum number of pixels (e.g., 960 pixels). In another example, a three panel layout may require four time the minimum number of pixels (e.g., 1280 pixels).

Each panel included in a flexible screen layout can include an independent floorplan that allows scrolling. A height of a panel can be determined based on an available screen area. Information for display within the panel can be displayed utilizing all of the display area of the panel. In some implementations, if information for display within a panel exceeds a size of a panel, a user may be presented with a scroll bar for scrolling through the information.

In some implementations, referring to FIGS. 5A-C and FIG. 6A-C, the backward navigation icons 536a-d, the backward navigation icons 566a-b, the backward navigation icons 586a-b, the backward navigation icons 636a-d, the backward navigation icons 666a-b, and the backward navigation icons 686a-b can be optional icons provided in a shell toolbar (e.g., referring to FIG. 1, the shell toolbar 108). In some implementations, the layout icons 590a-f and the layout icons 690a-f can be provided in a shell toolbar (e.g., referring to FIG. 1, the shell toolbar 108). As such, the enterprise application need not provide any additional elements or controls for backward navigation because an optional back button provided by the shell toolbar can be used for backward navigation. The enterprise application need not provide any additional elements or controls for switching between layouts because the layout switching controls can be provided by the shell toolbar. In some implementations, navigation provided by a web browser that executes (runs) the web pages for the enterprise application can be used for forward navigation between layouts in a flexible screen layout as well as for forward navigation between screens (layouts) in a full screen layout.

Referring to FIGS. 5A-C and FIGS. 6A-C, layout icons (the layout icons 590a-f and the layout icons 690a-f) are provided in two panel layouts, in three panel layouts, and in full screen layouts.

As shown in the non-limiting examples in FIGS. 5A-C and in FIGS. 6A-C, a user can interact with a UI for an enterprise application using four different interaction patterns.

A first pattern is forward navigation from one screen layout to another. Forward navigation can open a new floorplan. Forward navigation in a flexible screen layout can open (trigger) a new floorplan that can add a new panel to a current floorplan. The new panel can display (present) new or additional content along with content that was displayed in the previous floorplan. When forward navigating in a flexible screen layout, once a maximum number of panels supported by the UI for the enterprise application is reached, forward navigation can open a next floorplan in a full screen layout in order to display the new or additional content. In this case, however, the content displayed in the previous floorplan will not be displayed with the new content. Forward navigation in a full screen layout opens a new full screen that can display new content without displaying the previous content.

A second pattern is backward navigation from a current screen layout to a previous screen layout. Back navigation for flexible screen layouts results in the displaying of a web page that was displayed before the flexible screen layout. A flexible screen layout can use a single web page for displaying multiple floorplans or screen layouts. Back navigation within a flexible screen layout may not undo changes within the flexible screen layout such as by switching layouts (or toggling to another layout). Back navigation within a flexible screen layout will not result in switching to a full screen layout. Back navigation for a full screen layout results in the displaying of the previous web page.

A third pattern is toggling (switching) between different flexible screen layouts. The ability to toggle between, switch, or change a current screen layout to a different screen layout that can prioritize content a user may want to view in more detail can be considered an advantage of the use of a flexible screen layout. In some implementations, as described herein, a user can expand a current floorplan or screen layout by dragging a splitter included in the screen layout or by selecting (clicking on) a toggle icon included in the screen layout. For example, in a three panel screen layout as shown herein, when a user expands the three panel screen layout or floorplan to a two panel screen layout or floorplan (a user toggles from the three panel screen layout to a two panel screen layout), a last displayed panel (e.g., a third panel) is hidden. The user can restore the hidden panel (e.g., the third panel) by selecting (clicking on) a provided toggle icon included in the two panel screen layout that can toggle (switch) to the three panel screen layout. The toggle icon is provided in the two panel screen layout when the two panel screen layout is a result of the expansion of a three panel screen layout resulting in a hidden panel. An advantage of the use of flexible screen layouts for the UI of an enterprise application is the ability for a user to be able to change a current layout. A user can select (click on) a toggle icon (e.g., one of the toggle icons 660a-f) in order to toggle between different screen layouts for use in a UI for the enterprise application. For example, a user may want to change a current layout in order to prioritize content the user would prefer to view in greater detail.

An advantage of the use of flexible screen layouts for the UI of an enterprise application is the ability for a user to be able to change a current layout. A user can select (click on) a toggle icon (e.g., one of the toggle icons 560a-f, one of the toggle icons 660a-f) in order to toggle between different screen layouts for use in a UI for the enterprise application. For example, a user may want to change a current layout in order to prioritize content the user would prefer to view in greater detail.

A fourth pattern is switching between a flexible screen layout and a full screen layout. For example, a user may prefer to view and interact with content as displayed (provided) in a full screen layout. In some implementations, as described herein, a user can switch between a flexible screen layout and a full screen layout by selecting (clicking on) a layout icon.

FIGS. 8A-H are screen shots of example user interfaces (UIs) that are generated by an enterprise application using flexible screen layouts.

Figure 8A:
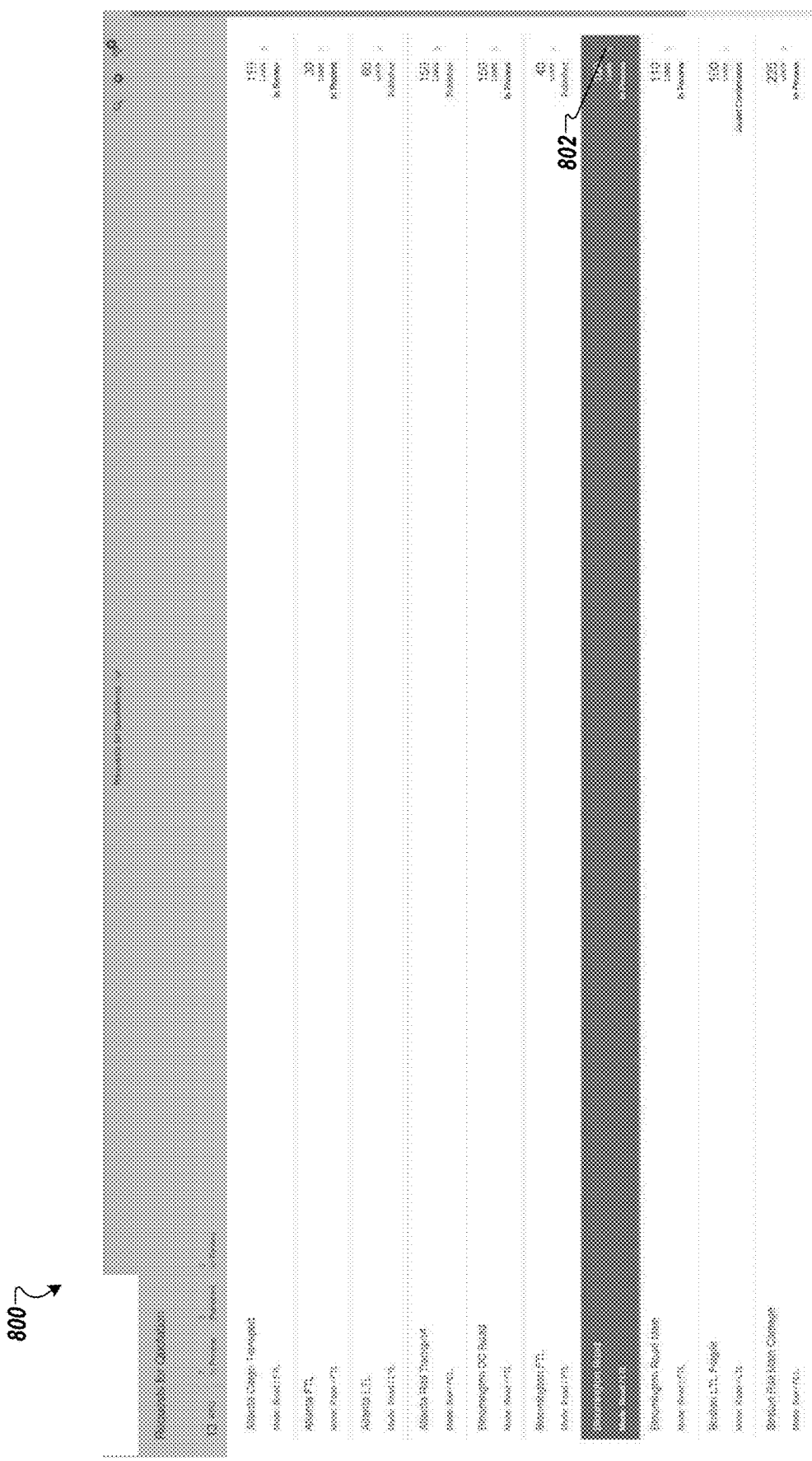
FIGS. 8A-H are example screen shots of user interfaces that show the screen layouts described in FIGS. 5A-C and FIGS. 6A-C.
Figure 8B:
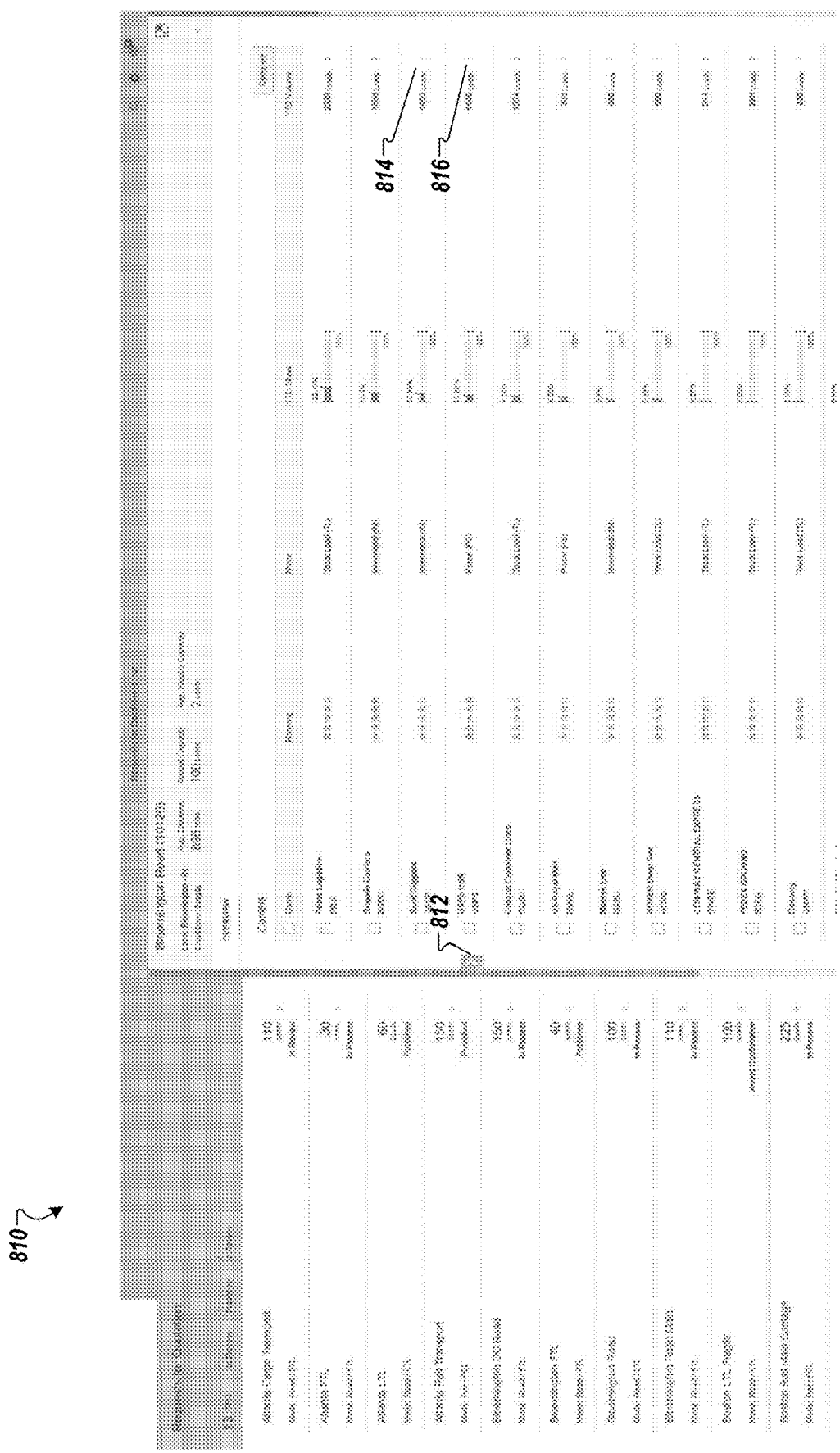
Figure 8C:
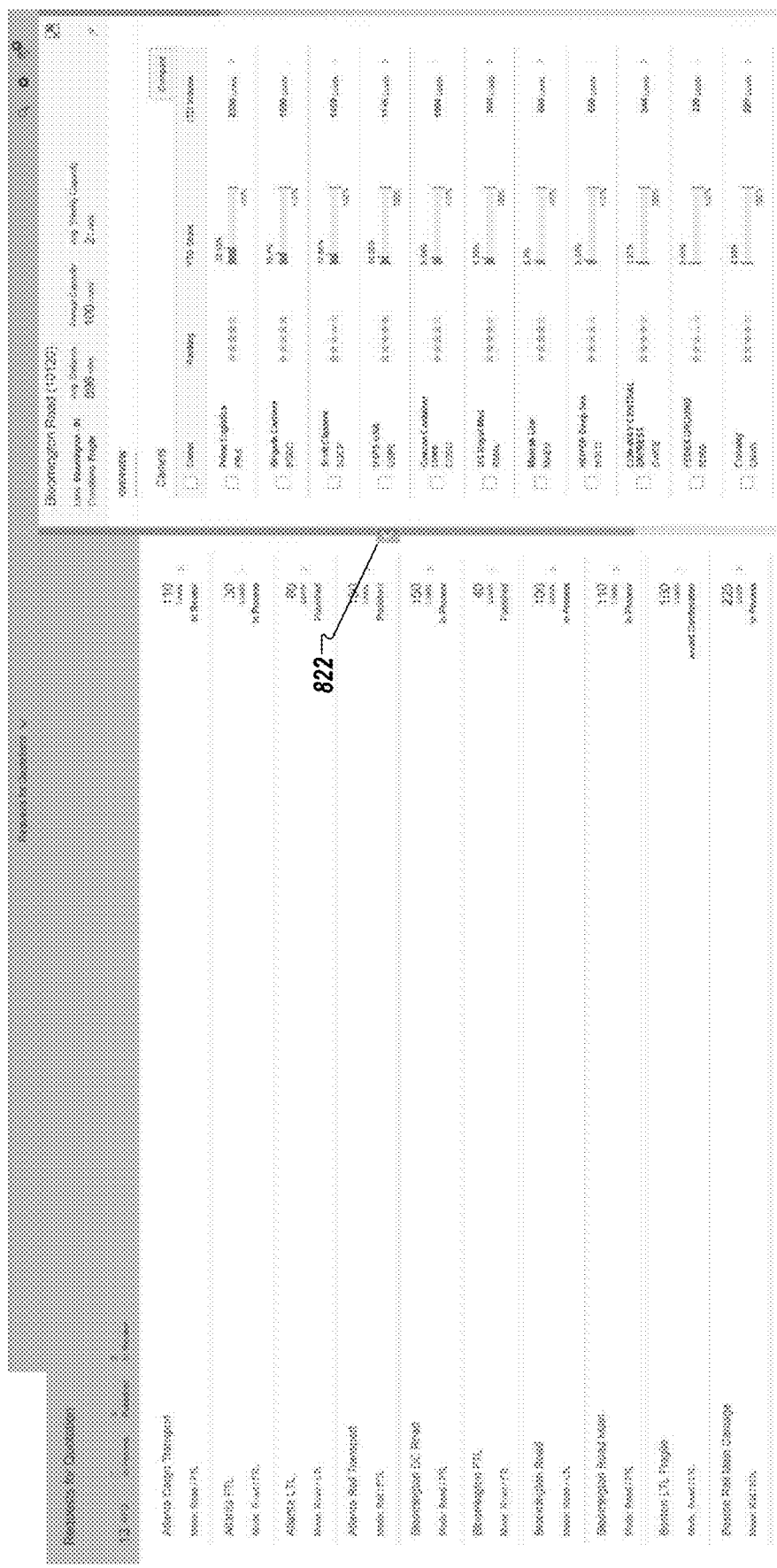
Figure 8D:
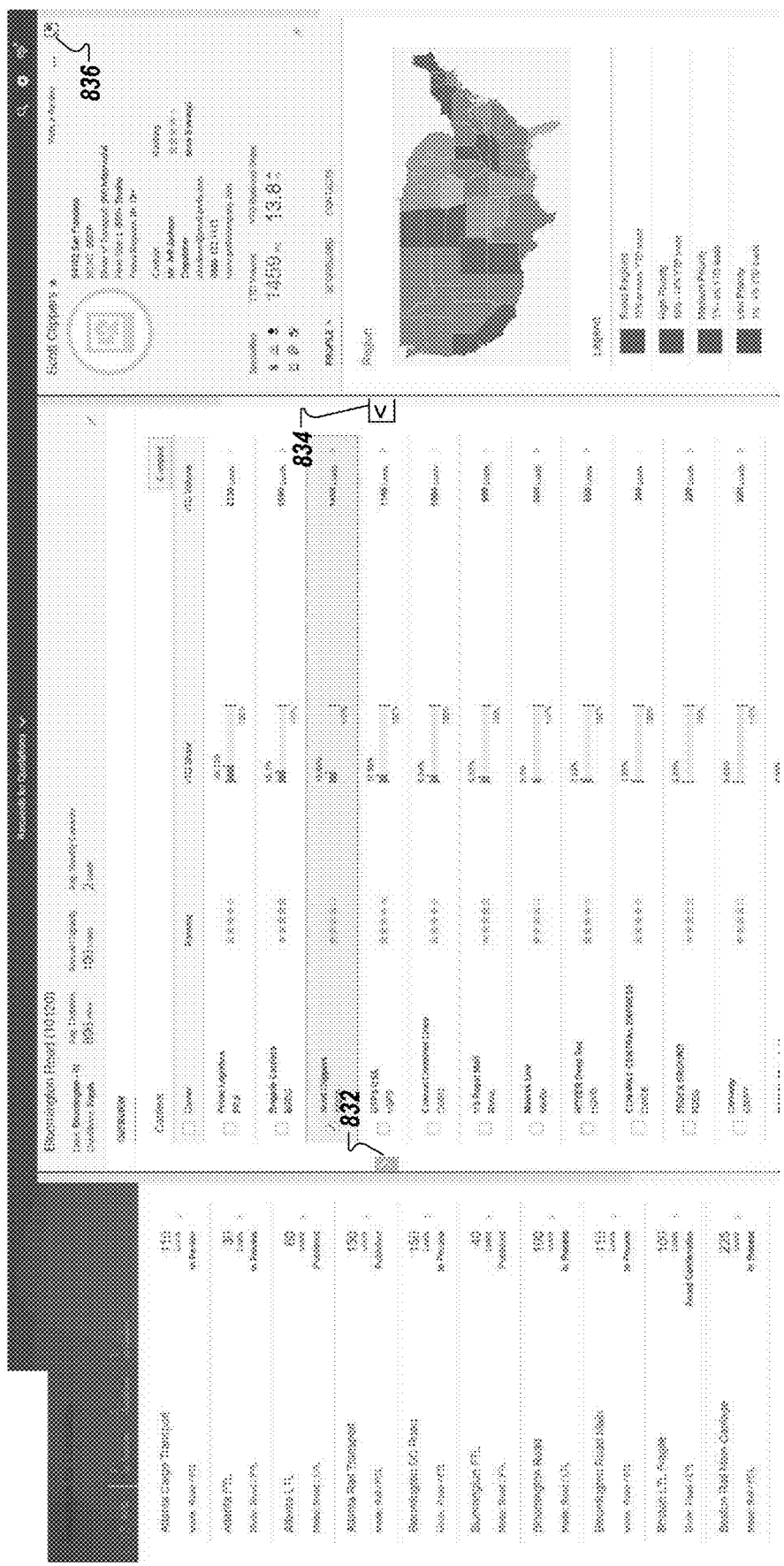
Figure 8E:
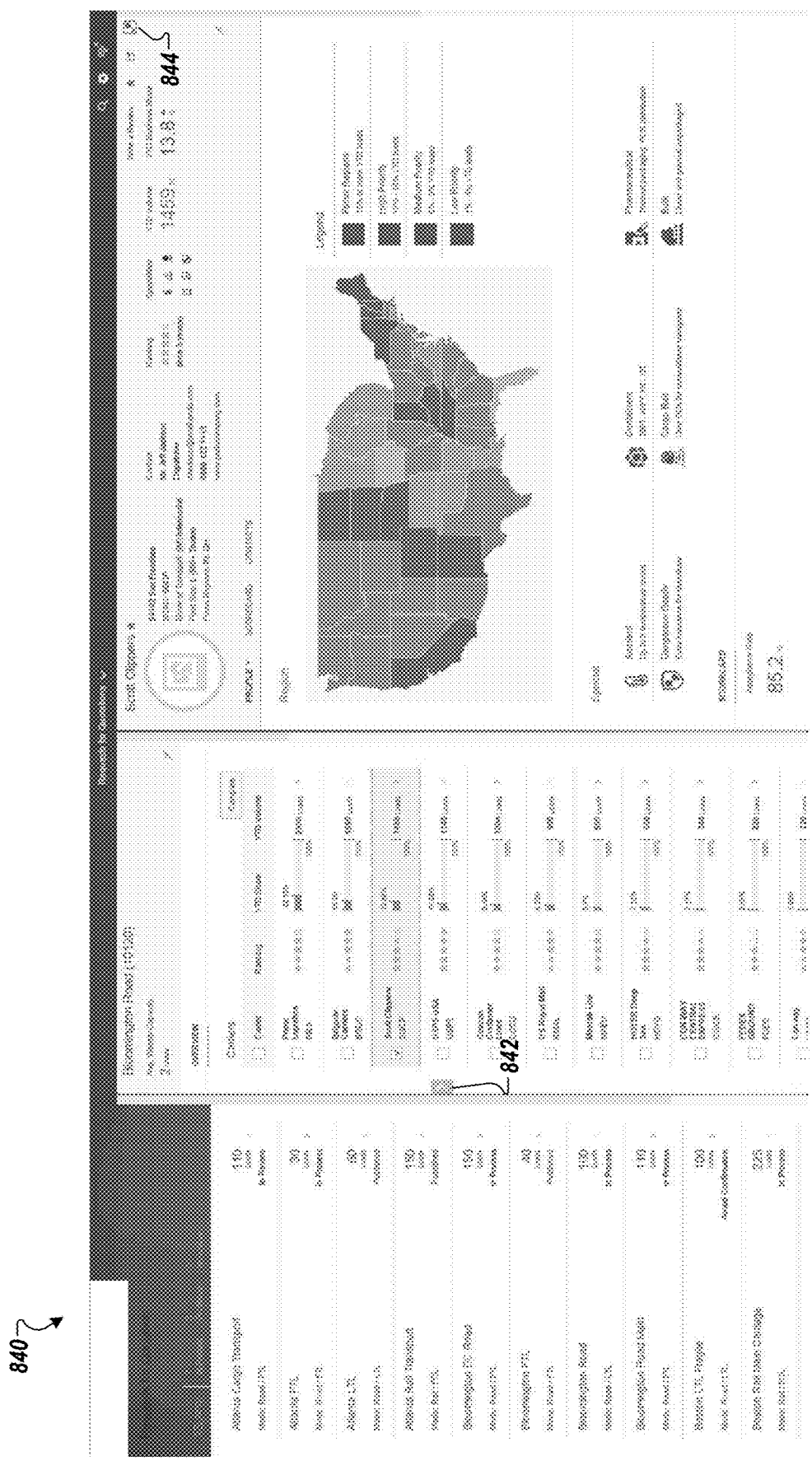
Figure 8F:
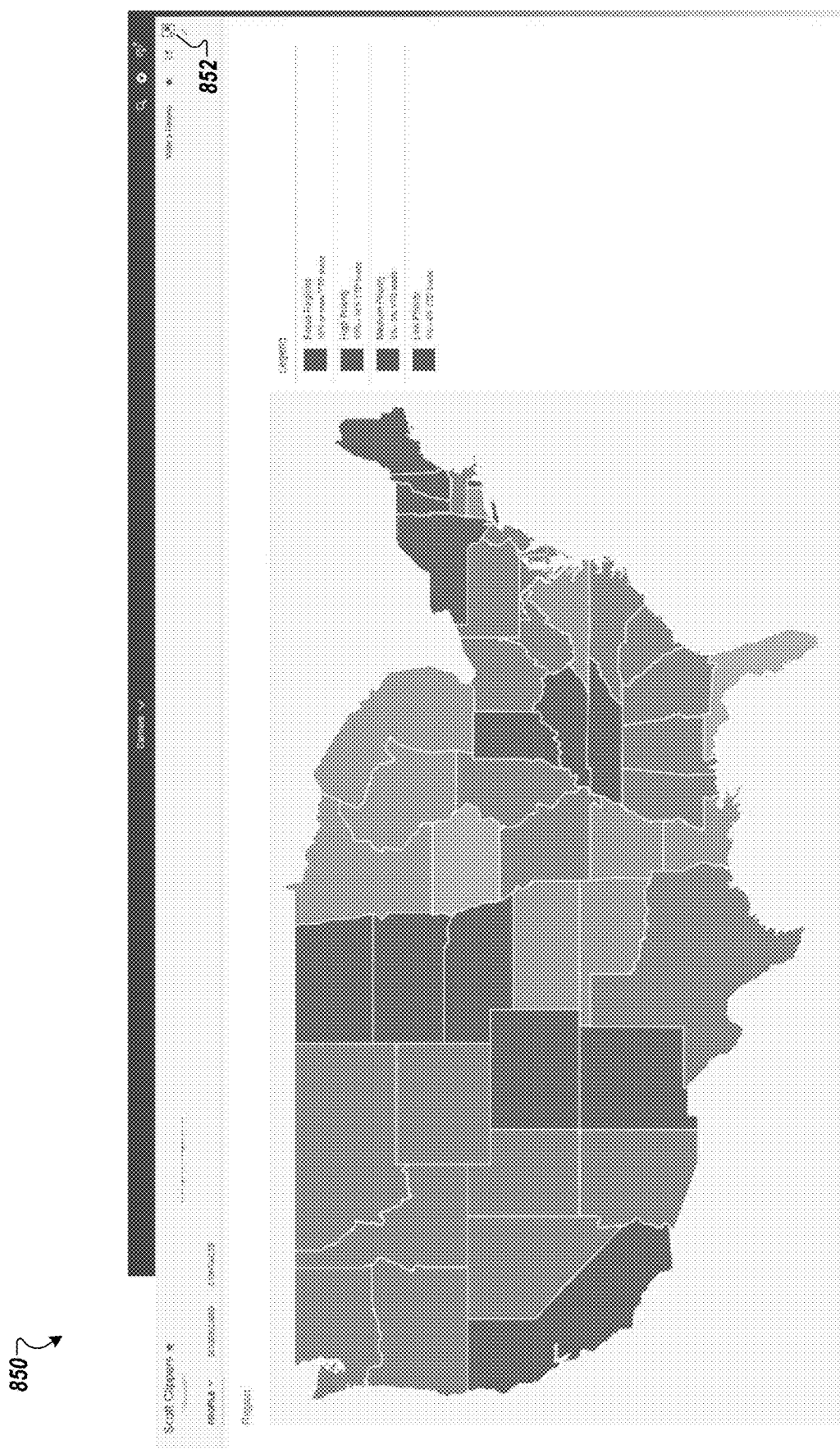
Figure 8G:
Figure 8H:
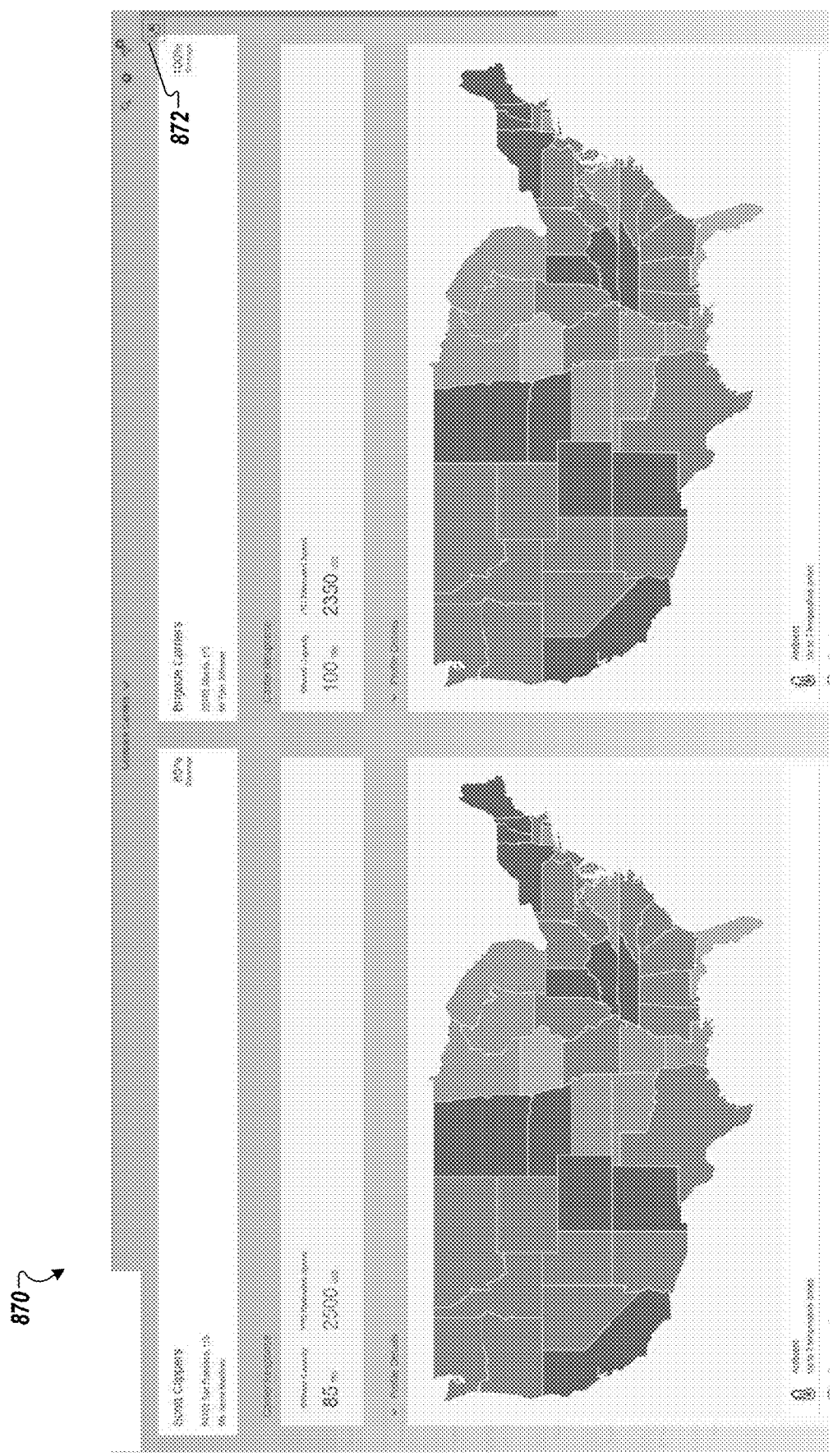

Referring to FIGS. 5A-C, FIG. 8A can be an example screen shot of a first UI 800 that utilizes the first screen layout 502. FIG. 8B can be an example screen shot of a second UI 810 that utilizes the second screen layout 508. FIG. 8C can be an example screen shot of a third UI 820 that utilizes the fourth screen layout 540. FIG. 8D can be an example screen shot of a fourth UI 830 that utilizes the third screen layout 516. FIG. 8E can be an example screen shot of a fifth UI 840 that utilizes the fifth screen layout 542. FIG. 8F can be an example screen shot of a sixth UI 850 that utilizes the eighth screen layout 574. FIG. 8G can be an example screen shot of a seventh UI 860 that utilizes the fifth screen layout 542. FIG. 8H can be an example screen shot of an eighth UI 870 that utilizes the eighth screen layout 574.

Referring to FIGS. 6A-C, FIG. 8A can be an example screen shot of a first UI 800 that utilizes the first screen layout 602. FIG. 8B can be an example screen shot of a second UI 810 that utilizes the second screen layout 608. FIG. 8C can be an example screen shot of a third UI 820 that utilizes the fourth screen layout 640. FIG. 8D can be an example screen shot of a fourth UI 830 that utilizes the third screen layout 616. FIG. 8E can be an example screen shot of a fifth UI 840 that utilizes the fifth screen layout 642. FIG. 8F can be an example screen shot of a sixth UI 850 that utilizes the eighth screen layout 674. FIG. 8G can be an example screen shot of a seventh UI 860 that utilizes the fifth screen layout 642. FIG. 8H can be an example screen shot of an eighth UI 870 that utilizes the eighth screen layout 674.

A user can forward navigate from the first UI 800 to the second UI 810 by selecting the forward navigation icon 802. A user can select a toggle icon 812 to switch (toggle) to the third UI 820 from the second UI 810. A user can select a toggle icon 822 to switch (toggle) to the second UI 810 from the third UI 820. A user can forward navigate from the second UI 810 to the fourth UI 830 by selecting a forward navigation icon 814. A user can select a toggle icon 834 to switch (toggle) to the fifth UI 840 from the fourth UI 830. A user can select a toggle icon 842 to switch (toggle) to the second UI 810 from the fifth UI 840. A user can select a layout icon 844 to switch (toggle) to the sixth UI 850. The user can then select a layout icon 852 to switch (toggle) back to the fifth UI 840. A user can select a layout icon 836 to switch (toggle) to the sixth UI 850. The user can then select the layout icon 852 to switch (toggle) back to the fourth UI 830. A user can forward navigate from the second UI 810 to the seventh UI 860 by selecting the forward navigation icon 814 and a forward navigation icon 816. A user can select a layout icon 872 to switch (toggle) to the seventh UI 860. The user can then select a layout icon 862 to switch (toggle) back to the eighth UI 870.

Figure 9:
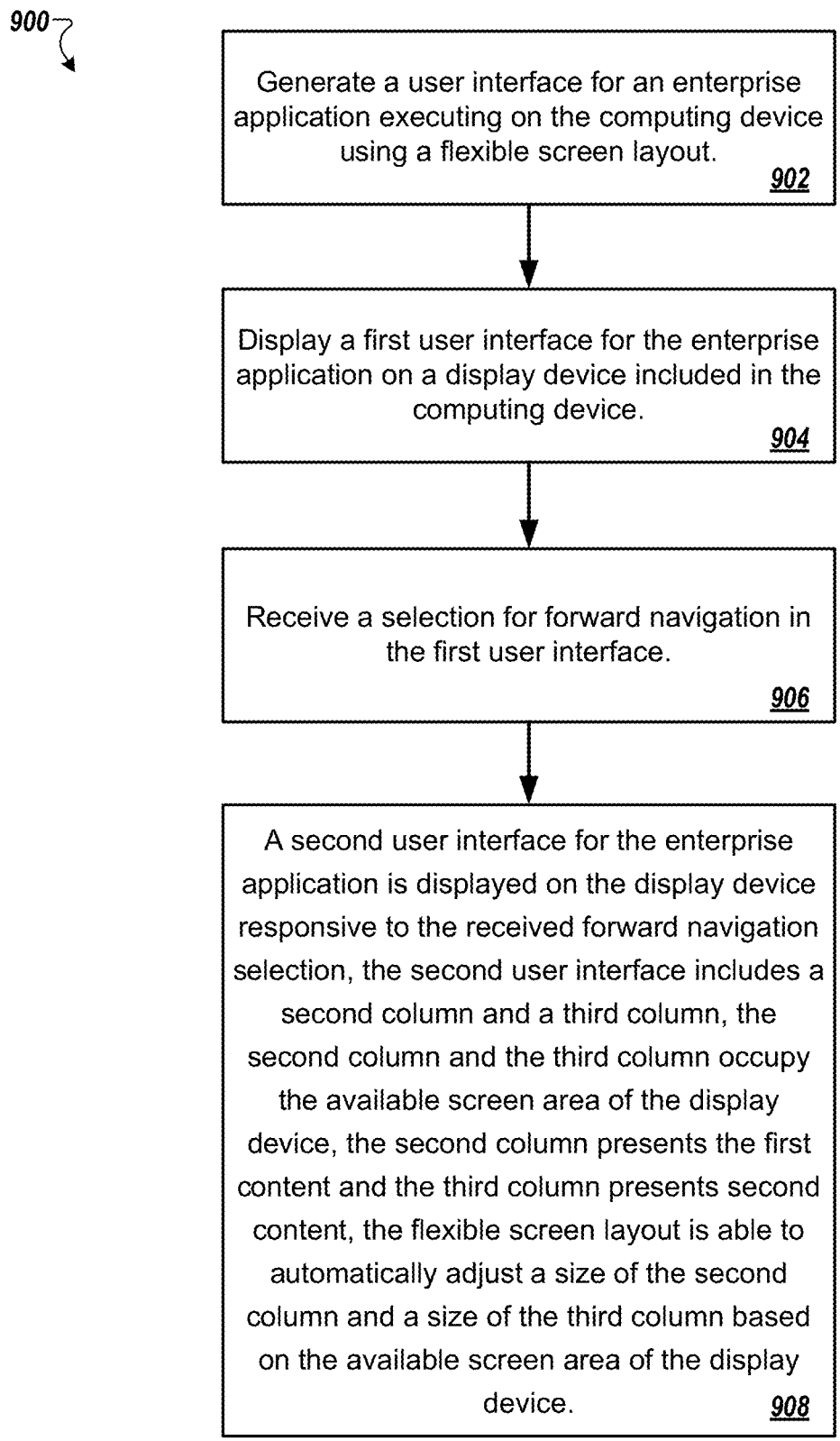
FIG. 9 is a block diagram of a flowchart showing an example method for implementing flexible screen layouts in a user interface for an enterprise application.

FIG. 9 is a block diagram of a flowchart showing an example method 900 for implementing flexible screen layouts in a user interface for an enterprise application. In some implementations, the systems and processes described herein can implement the method 900.

A user interface for an enterprise application executing on the computing device using a flexible screen layout is generated (block 902). A first user interface for the enterprise application is displayed on a display device included in the computing device (block 904). The first user interface can include a first column that occupies an available screen area of the display device and that presents first content. A selection for forward navigation is received in the first user interface (block 906). A second user interface for the enterprise application is displayed on the display device responsive to the received forward navigation (block 908). The second user interface can include a second column and a third column. The second column and the third column can occupy the available screen area of the display device. The second column can present the first content. The third column can present second content. The flexible screen layout can automatically adjust a size of the second column and a size of the third column based on the available screen area of the display device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
generating, by at least one processor in a computing device, a user interface for an enterprise application executing on the computing device using a flexible screen layout, the generating including:
displaying, on a display device included in the computing device, a first user interface for the enterprise application, the first user interface including a first column that occupies an available screen area of the display device and that presents first content;
receiving, in the first user interface, a selection for forward navigation;
responsive to the received forward navigation selection, displaying, on the display device, a second user interface for the enterprise application, the second user interface including a second column and a third column, the second column and the third column occupying the available screen area of the display device, the second column presenting the first content and the third column presenting second content, the flexible screen layout being able to automatically adjust a size of the second column and a size of the third column based on the available screen area of the display device;
receiving, in the second user interface, another selection for forward navigation; and
responsive to the received forward navigation selection, displaying, on the display device, a third user interface including a fourth column, a fifth column, and a sixth column, the fourth column, the fifth column, and the sixth column occupying the available screen area of the display device, the fourth column presenting the first content, the fifth column presenting the second content, and the sixth column presenting third content, the flexible screen layout being able to automatically adjust a size of the fourth column, a size of the fifth column, and a size of the sixth column based on the available screen area of the display device.

2. The method of claim 1, wherein the second content is associated with the first content.

3. The method of claim 1, wherein the enterprise application is a web application executing in a web browser.

4. The method of claim 1, wherein the first content is presented in the second column included in the second user interface in a manner that occupies less of the available screen area than when presented in the first column of the first user interface.

5. The method of claim 1, further comprising:
receiving, in the second user interface, another selection for forward navigation; and
responsive to the received forward navigation selection, displaying, on the display device, the third user interface including the fourth column, the fifth column, and a sixth column, the fourth column, the fifth column, and the sixth column occupying the available screen area of the display device, the fourth column presenting the first content, the fifth column presenting the second content, and the sixth column presenting third content, the flexible screen layout being able to automatically adjust a size of the fourth column, a size of the fifth column, and a size of the sixth column based on the available screen area of the display device.

6. The method of claim 1, further comprising:
receiving, in the second user interface, a layout selection; and
responsive to the received layout selection, displaying, on the display device, a fourth user interface for the enterprise application, the fourth user interface being displayed in a full screen layout including a single column occupying the available screen area of the display device, the single column presenting the second content.

7. A non-transitory, machine-readable medium having instructions stored thereon, the instructions, when executed by a processor, cause a computing device to generate a user interface for an enterprise application executing on the computing device using a flexible screen layout, the generating including:
displaying, on a display device included in the computing device, a first user interface for the enterprise application, the first user interface including a first column that occupies an available screen area of the display device and that presents first content;
receiving, in the first user interface, a selection for forward navigation;
responsive to the received forward navigation selection, displaying, on the display device, a second user interface for the enterprise application, the second user interface including a second column and a third column, the second column and the third column occupying the available screen area of the display device, the second column presenting the first content and the third column presenting second content, the flexible screen layout being able to automatically adjust a size of the second column and a size of the third column based on the available screen area of the display device;
receiving, in the second user interface, another selection for forward navigation; and
responsive to the received forward navigation selection, displaying, on the display device, a third user interface including a fourth column, a fifth column, and a sixth column, the fourth column, the fifth column, and the sixth column occupying the available screen area of the display device, the fourth column presenting the first content, the fifth column presenting the second content, and the sixth column presenting third content, the flexible screen layout being able to automatically adjust a size of the fourth column, a size of the fifth column, and a size of the sixth column based on the available screen area of the display device.

8. The medium of claim 7, wherein the second content is associated with the first content.

9. The medium of claim 7, wherein the enterprise application is a web application executing in a web browser.

10. The medium of claim 7, wherein the first content is presented in the second column included in the second user interface in a manner that occupies less of the available screen area than when presented in the first column of the first user interface.

11. The medium of claim 7, wherein the generating further includes:
receiving, in the second user interface, another selection for forward navigation; and
responsive to the received forward navigation selection, displaying, on the display device, the third user interface including the fourth column, the fifth column, and a sixth column, the fourth column, the fifth column, and the sixth column occupying the available screen area of the display device, the fourth column presenting the first content, the fifth column presenting the second content, and the sixth column presenting third content, the flexible screen layout being able to automatically adjust a size of the fourth column, a size of the fifth column, and a size of the sixth column based on the available screen area of the display device.

12. The medium of claim 7, wherein the generating further includes:
receiving, in the second user interface, a layout selection; and
responsive to the received layout selection, displaying, on the display device, a fourth user interface for the enterprise application, the fourth user interface being displayed in a full screen layout including a single column occupying the available screen area of the display device, the single column presenting the second content.

13. A system comprising:
at least one memory including instructions on a computing device; and
at least one processor on the computing device, wherein the processor is operably coupled to the at least one memory and is arranged and configured to execute the instructions that, when executed, cause the processor to implement:
generating, by the computing device, a user interface for an enterprise application executing on the computing device using a flexible screen layout, the generating including:
displaying, on a display device included in the computing device, a first user interface for the enterprise application, the first user interface including a first column that occupies an available screen area of the display device and that presents first content;
receiving, in the first user interface, a selection for forward navigation;
responsive to the received forward navigation selection, displaying, on the display device, a second user interface for the enterprise application, the second user interface including a second column and a third column, the second column and the third column occupying the available screen area of the display device, the second column presenting the first content and the third column presenting second content, the flexible screen layout being able to automatically adjust a size of the second column and a size of the third column based on the available screen area of the display device;

receiving, in the second user interface, another selection for forward navigation; and responsive to the received forward navigation selection, displaying, on the display device, a third user interface including a fourth column, a fifth column, and a sixth column, the fourth column, the fifth column, and the sixth column occupying the available screen area of the display device, the fourth column presenting the first content, the fifth column presenting the second content, and the sixth column presenting third content, the flexible screen layout being able to automatically adjust a size of the fourth column, a size of the fifth column, and a size of the sixth column based on the available screen area of the display device.

14. The system of claim 13, wherein the enterprise application is a web application executing in a web browser.

15. The system of claim 13, wherein the first content is presented in the second column included in the second user interface in a manner that occupies less of the available screen area than when presented in the first column of the first user interface; and wherein the second content is associated with the first content.

16. The system of claim 13, wherein the instructions, when executed, further cause the processor to implement:

receiving, in the second user interface, another selection for forward navigation; and responsive to the received forward navigation selection, displaying, on the display device, the third user interface including the fourth column, the fifth column, and a sixth column, the fourth column, the fifth column, and the sixth column occupying the available screen area of the display device, the fourth column presenting the first content, the fifth column presenting the second content, and the sixth column presenting third content, the flexible screen layout being able to automatically adjust a size of the fourth column, a size of the fifth column, and a size of the sixth column based on the available screen area of the display device.

17. The system of claim 13, wherein the instructions, when executed, further cause the processor to implement:

receiving, in the second user interface, a layout selection; and responsive to the received layout selection, displaying, on the display device, a fourth user interface for the enterprise application, the fourth user interface being displayed in a full screen layout including a single column occupying the available screen area of the display device, the single column presenting the second content.

\* \* \* \* \*